US012598343B2

(12) United States Patent
Gong et al.

(10) Patent No.: US 12,598,343 B2
(45) Date of Patent: Apr. 7, 2026

(54) DISPLAY APPARATUS AND DATA PROCESSING METHOD

(71) Applicant: VIDAA (NETHERLANDS) INTERNATIONAL HOLDINGS B.V., Duiven (NL)

(72) Inventors: Weiquan Gong, Duiven (NL); Jun Huang, Duiven (NL); Xiaoling Hong, Duiven (NL); Tuyin Mai, Duiven (NL); Mengyuan Li, Duiven (NL)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 0 days.

(21) Appl. No.: 18/975,961

(22) Filed: Dec. 10, 2024

(65) Prior Publication Data

US 2025/0106463 A1      Mar. 27, 2025

Related U.S. Application Data

(63) Continuation of application No. PCT/EP2024/063178, filed on May 14, 2024.

(30) Foreign Application Priority Data

May 16, 2023    (CN) .......................... 202310553868.3
Jul. 5, 2023    (CN) .......................... 202310820466.5
Jul. 31, 2023    (CN) .......................... 202310952622.3

(51) Int. Cl.
*H04N 21/43*          (2011.01)
*H04N 21/438*          (2011.01)
(Continued)

(52) U.S. Cl.
CPC ......... *H04N 21/43* (2013.01); *H04N 21/4383* (2013.01); *H04N 21/47217* (2013.01); *H04N 21/4825* (2013.01)

(58) Field of Classification Search
CPC .............. H04N 21/43; H04N 21/4383; H04N 21/47217; H04N 21/4825; H04N 21/4334; H04N 21/4622; H04N 21/482
See application file for complete search history.

(56) References Cited

U.S. PATENT DOCUMENTS

2002/0166123 A1    11/2002    Schrader et al.
2008/0168503 A1    7/2008    Sparrell
(Continued)

FOREIGN PATENT DOCUMENTS

EP          3300355 A1      3/2018

OTHER PUBLICATIONS

The World Intellectual Property Organization (WIPO) International Search Report for PCT/EP2024/063178 Sep. 13, 2024 3 Pages.

*Primary Examiner* — Anthony Bantamoi
(74) *Attorney, Agent, or Firm* — ANOVA LAW GROUP, PLLC

(57) ABSTRACT

The disclosure provides a display apparatus and a data processing method. The display apparatus detects a media resource type of a target program in response to a recording command for the target program. The media resource type includes a network media resource and a non-network media resource. Based on that the media resource type is the network media resource, the display apparatus downloads media resource data of the target program according to the resource locator address and writes the media resource data onto a memory; and based on that the media resource type is the non-network media resource, the display apparatus searches for a target network media resource corresponding to the target program, and downloads media resource data of the target program according to the resource locator address (Continued)

and writes the media resource data onto the memory based on that the target program has the target network media resource.

20 Claims, 45 Drawing Sheets

(51) Int. Cl.
*H04N 21/472* (2011.01)
*H04N 21/482* (2011.01)

(56) References Cited

U.S. PATENT DOCUMENTS

| | | |
|---|---|---|
| 2008/0271081 A1 | 10/2008 | Yuzawa |
| 2009/0288125 A1 | 11/2009 | Morioka |
| 2010/0115553 A1 | 5/2010 | Van Flandern et al. |

| TWO | Program 1 | Program 2 | Program 3 | Program 4 |
|---|---|---|---|---|
| ABC TWO | 8:00PM-8:30PM | 8:30PM-9:00PM | 9:00PM-9:30PM | 9:30PM- |

Media resource 1  Media resource 2  Media resource3  Media resource 4

《Program 2》

8：30PM-9:00PM

| AAA | BBB | CCC | DDD |
|---|---|---|---|

Record  Prompt

Program instruction：

×××××××××××××××××××××××××××××…

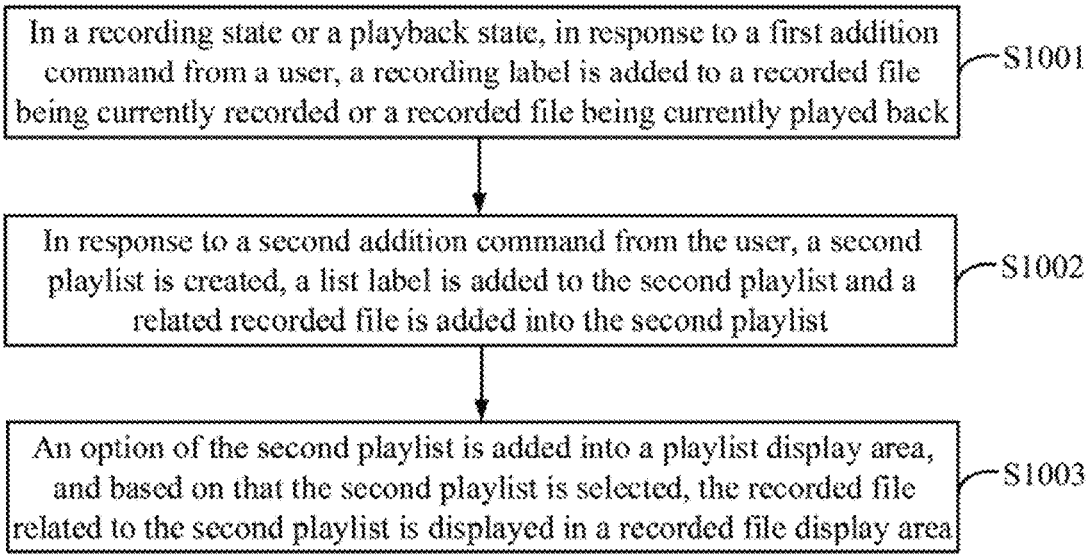

In a recording state or a playback state, in response to a first addition command from a user, a recording label is added to a recorded file being currently recorded or a recorded file being currently played back —S1001

In response to a second addition command from the user, a second playlist is created, a list label is added to the second playlist and a related recorded file is added into the second playlist —S1002

An option of the second playlist is added into a playlist display area, and based on that the second playlist is selected, the recorded file related to the second playlist is displayed in a recorded file display area —S1003

Fig. 30

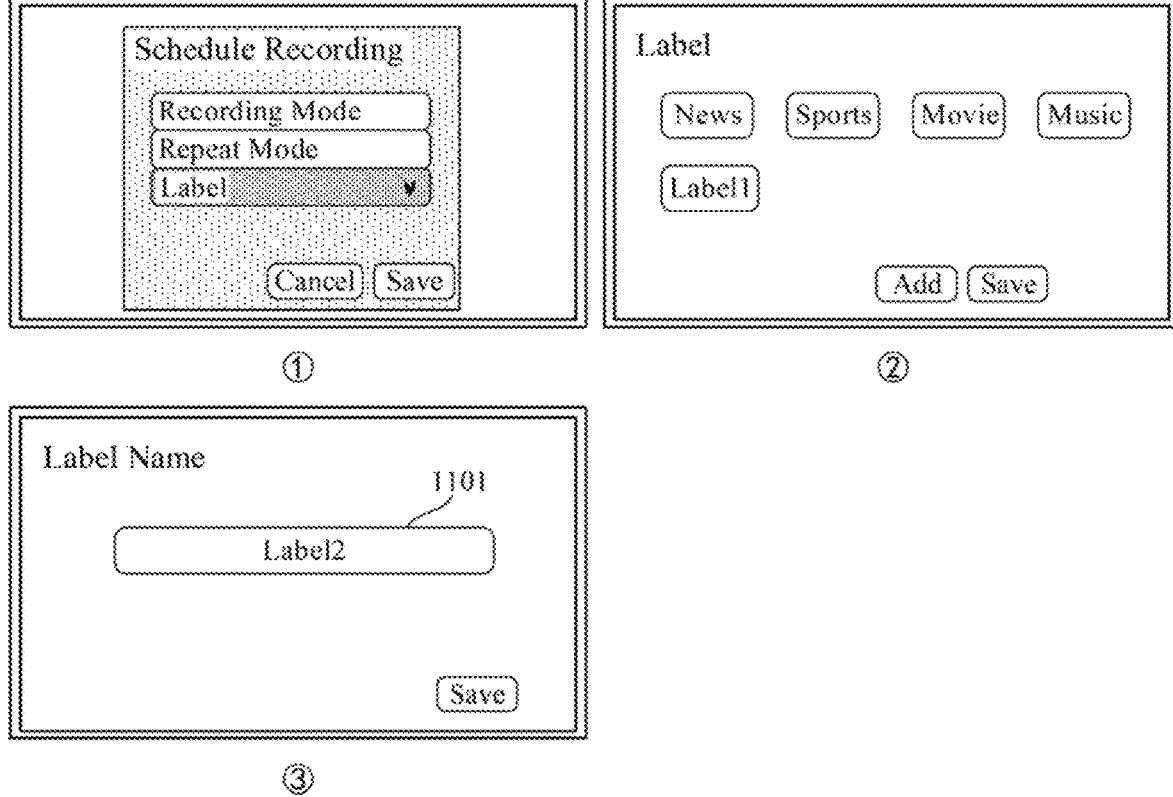

Fig. 31

Start

<User operation>
Delete a Playlist0001 by a user — S3901

Does the Playlist0001 exist? — S3902

No

Yes

Delete all user data corresponding to the Playlist0001 — S3903

Notify the UI module of deletion of the Playlist0001 — S3904

The UI updates an interface, and no longer displays the Playlist0001 — S3905

End

In a live broadcasting state, in response to a fourth addition command from a user, a favorite identifier is added to a live broadcasting program —— S4201

In response to a recording command from the user, the live broadcasting program is recorded, and the favorite identifier is added to a recorded file of the live broadcasting program after obtaining the recorded file of the live broadcasting program —— S4202

The recorded file of the live broadcasting program is added to a favorite playlist —— S4203

Fig. 62

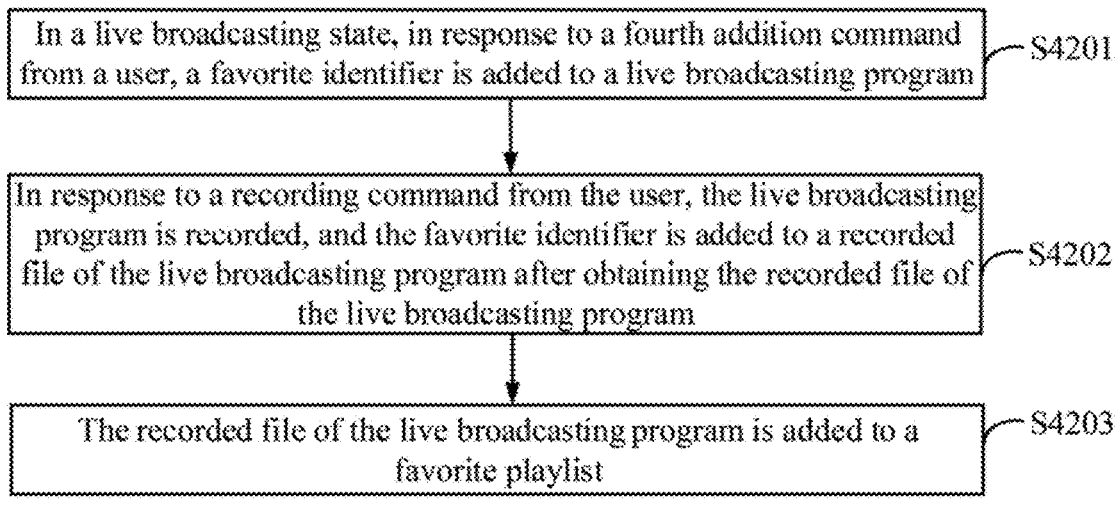
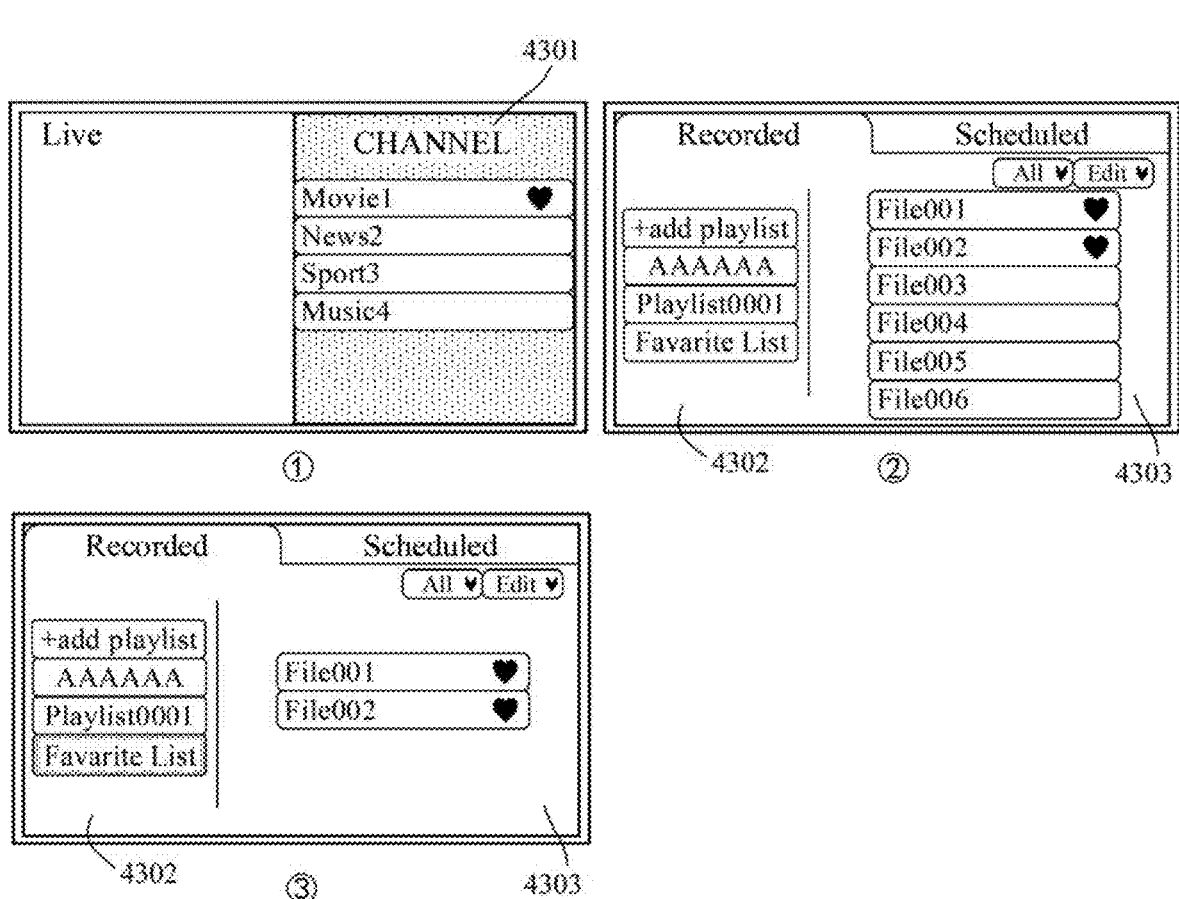

Fig. 63

DISPLAY APPARATUS AND DATA PROCESSING METHOD

CROSS REFERENCE TO RELATED APPLICATIONS

This application is a continuation of International Application No. PCT/EP2024/063178, filed on May 14, 2024, which claims the priority to Chinese Patent Application No. 202310553868.3, filed on May 16, 2023, Chinese Patent Application No. 202310820466.5, filed on Jul. 5, 2023, and Chinese Patent Application No. 202310952622.3, filed on Jul. 31, 2023, the entire contents of all of which are incorporated herein by reference.

TECHNICAL FIELD

The disclosure relates to the field of data processing and, in particular, to a display apparatus and a data processing method.

BACKGROUND

A display apparatus is an apparatus capable of outputting specific pictures, and has various forms such as a smart television, a communication terminal, a smart advertising screen and a projector. For example, the smart television is equipped with an open operating system and chip, as well as an open application platform based on the Internet application technology, which can achieve functions of two-way human-machine interaction, and integrate audio and video, entertainment, data, and other functions, to satisfy diverse and customized demand of users.

The display apparatus can broadcast a variety of broadcast programs based on a protocol stack, and can also record broadcast programs for users to play back and watch. When recording the broadcast program, the display apparatus needs to collect the signal of the broadcast program, and perform operations such as tuning, demodulation, and decoding on the signal to achieve transmission of program data. Then the transmitted program data is saved as a local file, which is played for playing back the broadcast program.

The signal is tuned by a tuner module of the display apparatus, but one tuner module can exclusively tune the signal of one broadcast program within one period. Thus, numerous tuner modules are required for the user to simultaneously record numerous broadcast programs. The display apparatus cannot record multi-channel broadcast programs based on that the number of broadcast programs recorded by the user is greater than the number of tuner modules of the display apparatus. Hence, the efficiency of recording the broadcast programs by the display apparatus is reduced, and the user experience is degraded.

SUMMARY

Some embodiments of the disclosure provide a display apparatus. The display apparatus may include a display, a memory and at least one processor. The display is configured to display an image and/or a user interface; the memory is configured to store computer instructions and media resource data; and the at least one processor is configured to execute the computer instructions to cause the display apparatus to perform: in response to a recording command for a target program, detecting a media resource type of the target program; where the media resource type includes a network media resource and a non-network media resource, the network media resource includes Internet protocol information, and the Internet protocol information includes resource locator addresses of programs; based on that the media resource type is the network media resource, downloading media resource data of the target program according to the resource locator address and writing the media resource data onto the memory; and based on that the media resource type is the non-network media resource, searching for a target network media resource corresponding to the target program, and based on that the target program has the target network media resource, downloading media resource data of the target program according to the resource locator address and writing the media resource data onto the memory.

Some embodiments of the disclosure further provide a data processing method. The method may include: in response to a recording command for a target program, detecting a media resource type of the target program, where the media resource type includes a network media resource and a non-network media resource, the network media resource includes Internet protocol information, and the Internet protocol information includes resource locator addresses of programs; based on that the media resource type is the network media resource, downloading media resource data of the target program according to the resource locator address and writing the media resource data onto the memory; and based on that the media resource type is the non-network media resource, searching for a target network media resource corresponding to the target program, and based on that the target program has the target network media resource, downloading media resource data of the target program according to the resource locator address and writing the media resource data onto the memory.

In some embodiments of the disclosure, the at least one processor is further configured to execute the computer instructions to cause the display apparatus to perform: in response to a playing command for playing a recorded file, obtaining the recorded file, where the recorded file is a file generated by recording a media resource played by the display apparatus; obtaining program information of the recorded file by parsing the recorded file, where the program information includes playing start time information of the program, program duration information, and total duration information of the recorded file; determining a duration progress of the program relative to the recorded file according to the playing start time information, the program duration information and the total duration information; placing program identifiers on a progress bar of the recorded file according to the duration progress; and determining a quantity of programs comprised in the recorded file, a playing progress of the target program, and playing start time and playing end time of the target program according to the program identifiers, and locating the target program according to the playing start time.

In some embodiments of the disclosure, the at least one processor is further configured to execute the computer instructions to cause the display apparatus to perform: in response to a command from a user, controlling the display to display a first recording management page in a first playback mode; where the first recording management page includes a playlist display area and a recorded file display area, the playlist display area is configured to display options of playlists, and the recorded file display area is configured to display a recorded file; where all recorded files that have been recorded are displayed in the recorded file display area based on that a focus does not land on a playlist, and a recorded file related to a playlist is displayed based on that the focus lands on the playlist; and in response to a first playback command based on a first recorded file in a first playlist, playing, from a first recorded file, recorded files related to a first playlist.

BRIEF DESCRIPTION OF FIGURES

FIG. 30 is a flowchart of creating a playlist by a display apparatus according to some embodiments of the disclosure.

FIG. 31 is a flowchart of adding a recording label to a recorded file by a television according to some embodiments of the disclosure.

FIG. 62 is a flowchart of adding a recorded file of a favorite program by a display apparatus according to some embodiments of the disclosure.

FIG. 63 is a flowchart of setting a favorite program and a favorite playlist by a television according to some embodiments of the disclosure.

DETAILED DESCRIPTION

In order to make objectives, implementations and advantages of the disclosure clearer, the implementations of the disclosure will be described clearly and completely below with reference to accompanying drawings in exemplary embodiments of the disclosure. Apparently, the described exemplary embodiments are merely some embodiments rather than all embodiments of the disclosure.

Based on the exemplary embodiments described in the disclosure, all other embodiments derived by those of ordinary skill in the art without making creative efforts shall fall within the protection scope of the disclosure. In addition, although contents of the disclosure are described in the form of one or more illustrative examples, it should be understood that various aspects of these contents can be separately constitute a complete implementation.

Figure 1:
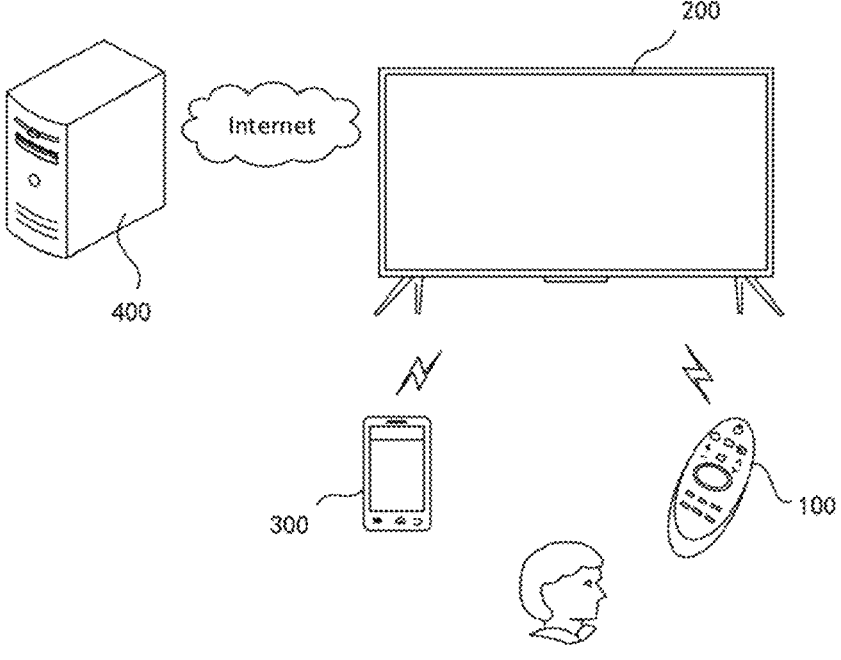
FIG. 1 is a schematic diagram of an operation scenario between a display apparatus and a control device according to some embodiments of the disclosure.
Figure 2:
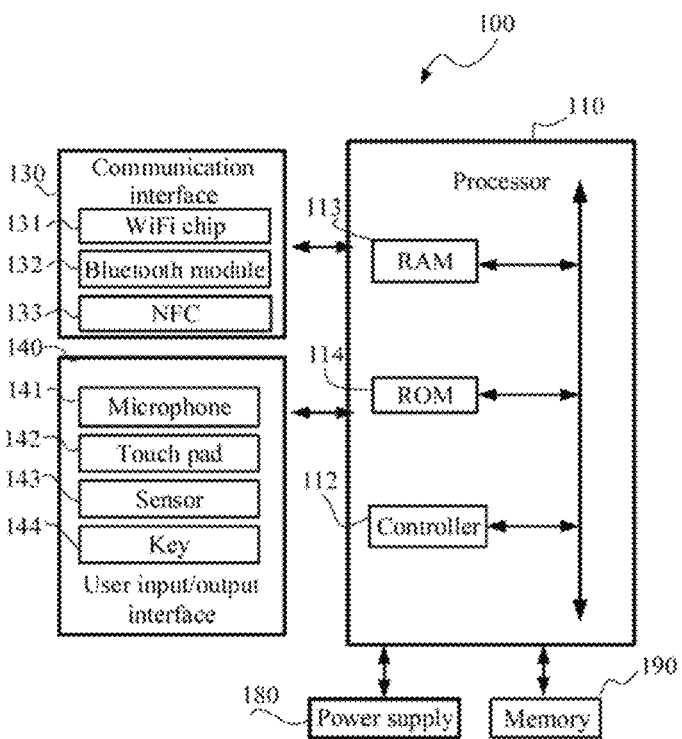
FIG. 2 is a schematic diagram of hardware configuration of a display apparatus according to some embodiments of the disclosure.

A display apparatus according to the implementation of the disclosure may have various implementation forms, for example, a television, a smart television, a laser projection device, a monitor, an electronic bulletin board and an electronic table. FIGS. 1 and 2 are specific implementations of a display apparatus of the disclosure.

FIG. 1 is a schematic diagram of an operation scenario between a display apparatus and a control device according to some embodiments of the disclosure. As shown in FIG. 1, a user may operate the display apparatus 200 through a smart device 300 or the control device 100.

In some embodiments, the control device 100 may be a remote control. Communication between the remote control and the display apparatus may include infrared protocol communication or Bluetooth protocol communication, and other short-distance communication modes; and the display apparatus is controlled in a wireless or wired mode. The user may control the display apparatus by inputting a user command through keys on the remote control, voice input, control panel input, etc.

In some embodiments, the display apparatus may be further controlled by the smart device 300 (such as a mobile terminal, a tablet computer, a computer and a notebook computer). For example, the display apparatus is controlled with an application running on the smart device.

In some embodiments, the display apparatus may not receive the command through the smart device or the control device described above, but receive user control through a touch, a gesture, etc.

In some embodiments, the display apparatus may further be controlled in a mode besides the control device 100 and the smart device 300, for example, by directly receiving voice command control from the user through a voice instruction obtaining module configured inside the display apparatus, or by receiving voice command control from the user through a voice control device configured outside the display apparatus.

In some embodiments, the display apparatus further communicates data with a server 400. The display apparatus may be allowed to be in communication connection through a local area network (LAN), a wireless local area network (WLAN) and other networks. The server 400 may provide all types of contents and interactions for the display apparatus. The server 400 may be one or more clusters, and may include one or more types of servers.

FIG. 2 illustrates a block diagram of configuration of a control device 100 according to exemplary embodiments. As shown in FIG. 2, the control device 100 may include at least one processor 110, a communication interface 130, a user input/output interface 140, a memory and a power supply. The control device 100 may receive an operation command input by a user, and convert the operation command into an identifiable command to which the display apparatus may respond, so as to play an interactive intermediary role between the user and the display apparatus.

In some embodiments, the control device 100 may be a smart device. For example, the control device 100 may be equipped with various applications for controlling the terminal device 200 according to demand of the user.

In some embodiments, as shown in FIG. 1, the smart device 300 may play the role of the control device 100 after an application for controlling the terminal device 200 is installed.

At least one processor 110 may include a controller 112, a random-access memory (RAM) 113, a read-only memory (ROM) 114, a communication interface 130, and a communication bus. The processor 110 may be used for controlling running and operation, communication cooperation between internal components as well as external and internal data processing functions of the control device 100.

The communication interface 130 may implement communication of control signals and data signals with the terminal device under control by the processor. The communication interface 130 may include at least one of a WiFi chip 131, a Bluetooth module 132, a near field communication (NFC) module 133 and other near-field communication modules.

For the user input/output interface 140, the input interface may include at least one of a microphone 141, a touch pad 142, a sensor 143, a key 144 and other input interfaces.

In some embodiments, the control device 100 may include at least one of the communication interface 130 and an input/output interface 140. The communication interface 130, such as a module of WiFi, Bluetooth or NFC, is configured in the control device 100; and the control device 100 may encode a command input by the user according to a WiFi protocol or a Bluetooth protocol or an NFC protocol, and then send it to the terminal device 200.

The memory 190 may store various running programs, data and applications for driving and controlling the control device 100 under the control by the processor. The memory 190 may store various control signal commands input by user.

The power supply 180 may provide running power support for each component of the control device 100 under the control by the processor.

Figure 3:
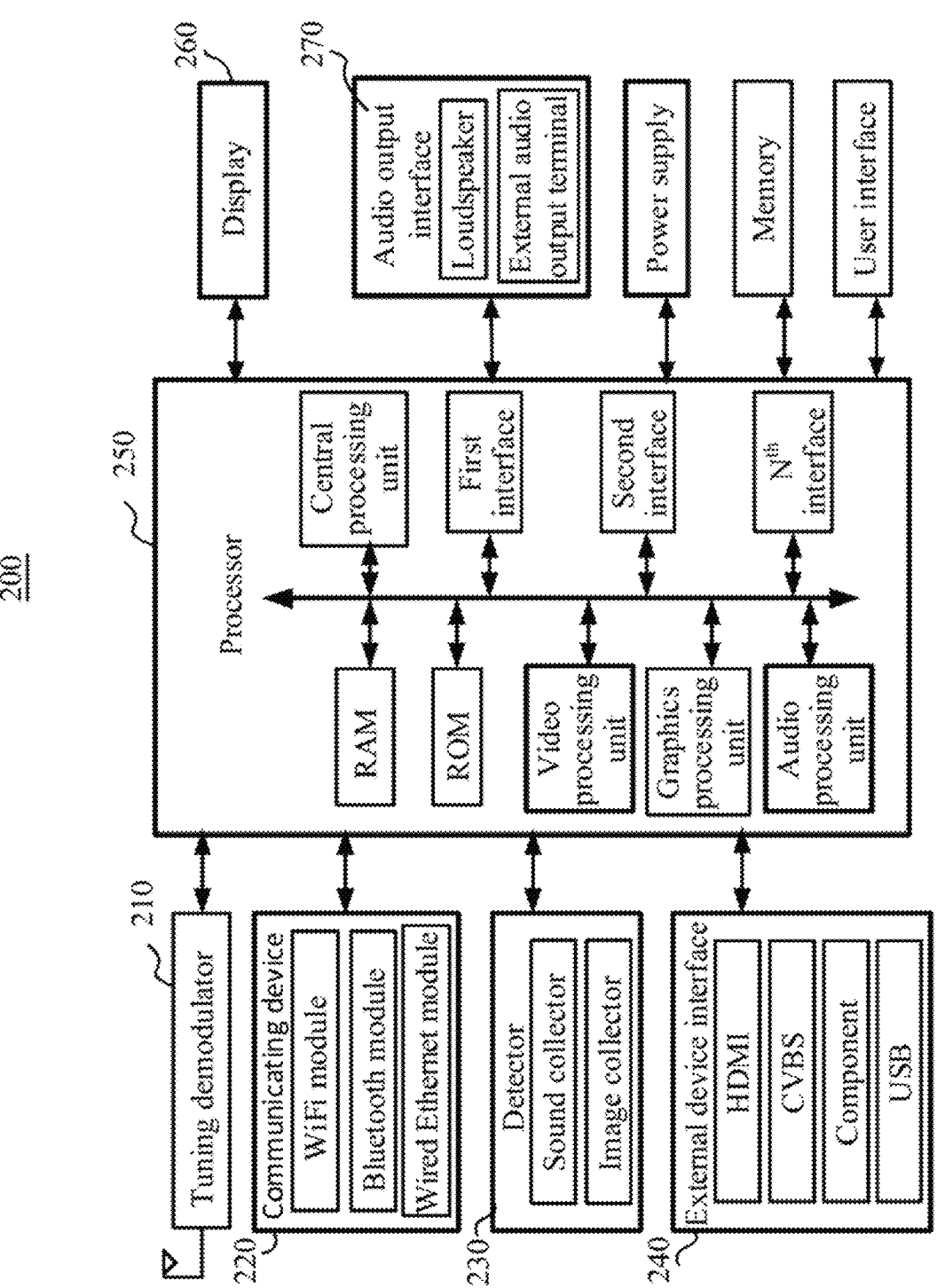
FIG. 3 is a schematic diagram of hardware configuration of a control device according to some embodiments of the disclosure.

As shown in FIG. 3, the display apparatus may include at least one of a tuning demodulator 210, a communicating device 220, a detector 230, an external device interface 240, at least one processor 250, a display 260, an audio output interface 270, a memory, a power supply, and a user interface.

The display 260 may include a display screen component for displaying a picture, and a drive component for driving an image to be displayed, a component for receiving an image signal output by the at least one processor and displaying video content, image content and a menu control interface, and a control user interface (UI).

The display 260 may be a liquid crystal display, an organic light-emitting diode (OLED) display, and a projection display, and may further be a projection device or a projection screen.

The communicating device 220 may be a component for communicating with an external device or a server according to various types of communication protocols. For example, the communicating device may include at least one of a WiFi module, a Bluetooth module and a wired Ethernet module and other network communication protocol chips or near-field communication protocol chips, as well as an infrared receiver. The display apparatus may establish transmission and reception of the control signal and the data signal with the control device 100 or the server 400 through the communicating device 220.

The user interface may be used for receiving the control signal from the control device 100 (such as an infrared remote control).

The detector 230 may be configured to collect signals of external environment or interaction with the outside. For example, the detector 230 may include an optical receiver, a sensor for collecting an ambient light intensity. Alternatively, the detector 230 may include an image collector, such as a camera, and may be configured to collect an external environment scenario, an attribute of the user or an interaction gesture of the user. Alternatively, the detector 230 may include a sound collector, such as a microphone, for receiving external sounds.

The external device interface 240 may include, but is not limited to, one or more of a high-definition multimedia interface (HDMI), an analog or data high-definition component input interface (component), a composite video broadcast signal (CVBS) input interface, a universal serial bus (USB) input interface, an RGB port, etc., or a composite input/output interface formed by the above interfaces.

The tuning demodulator 210 may receive a broadcast television signal in a wired or wireless reception mode, and obtain audio and video signals, such as electronic program guide (EPG) data signals, by demodulating a plurality of wireless or wired broadcast television signals.

In some embodiments, the processor and the tuning demodulator 210 may be located in different split devices, that is, the tuning demodulator 210 may also be located in an external device of a main device of the processor, such as an external set-top box.

The processor may control working of the display apparatus and respond to an operation of the user through various software control programs stored in the memory. The processor controls an overall operation of the display apparatus. For example, in response to receiving a user command for selecting an UI object displayed on the display, the processor may perform an operation related to the object selected according to the user command.

In some embodiments, at least one processor may include at least one of a central processing unit (CPU), a video processing unit, an audio processing unit, a graphics processing unit (GPU), a random access memory (RAM), a read-only memory (ROM), a first interface to an $n^{th}$ interface for input/output, and a communication bus.

The user may input the user command on a graphical user interface (GUI) displayed on the display 260, and a user input interface receives the user input command through the GUI. Alternatively, the user may input the user command by inputting a specific sound or gesture, and the user input interface identifies the sound or gesture through a sensor, so as to receive the user input command.

Figure 4:
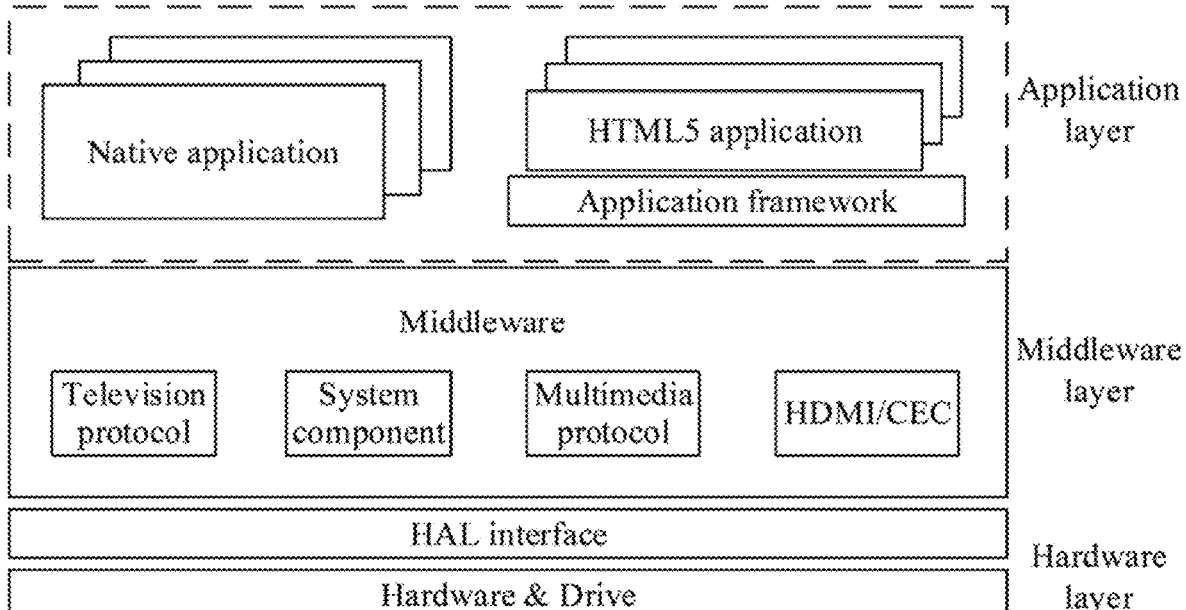
FIG. 4 is a schematic diagram of software configuration of a display apparatus according to some embodiments of the disclosure.

FIG. 4 shows a software configuration diagram of a display apparatus according to some embodiments. In some embodiments, as shown in FIG. 4, a system of the display apparatus may include a kernel, a command parser (shell), a file system and an application. The kernel, the shell and the file system together constitute a basic operation system structure, and allow the user to manage files, run programs and use the system. After being energized, the kernel is booted, space of the kernel is activated, hardware is abstracted, and hardware parameters are initialized. A virtual memory, a scheduler, a signal and inter-process communication (IPC) are run and maintained. After the kernel is booted, the shell and user applications are loaded. After being started, the application is compiled into machine codes to form a process.

As shown in FIG. 4, a system of the display apparatus may be divided into three layers, namely, an application layer, a middleware layer and a hardware layer from top to bottom. In some embodiments, the system of the display apparatus may further include a UI layer (not shown in the figure). The UI layer is located above the application layer. The UI layer receives data transmission from the application layer to implement picture display of the display 260.

The application layer may mainly include common applications on a television and an application framework. The common applications are mainly applications developed based on a browser, such as HTML5 APPs and native APPs.

The application framework may be a complete program model, and has all the basic functions, such as file access and data exchange, required by standard application software, and use interfaces (a toolbar, a status bar, a menu and a dialog box) for these functions.

The native APPs may support online or offline, message push or local resource access.

The middleware layer may include various television protocols, multimedia protocols and middleware such as a system component. The middleware may use basic services (functions) provided by the system software to connect all parts of an application system or different applications on a network, and may achieve the purpose of resource sharing and function sharing.

The hardware layer may include a hardware abstraction layer (HAL) interface, hardware and drivers. The HAL interface functions as a unified interface for docking of all television chips, and specific logics are implemented by the chips. The drivers mainly include an audio driver, a display driver, a Bluetooth driver, a camera driver, a WiFi driver, a USB driver, an HDMI driver, a sensor driver (such as a fingerprint sensor, a temperature sensor and a pressure sensor), a power driver, etc.

Figure 5:
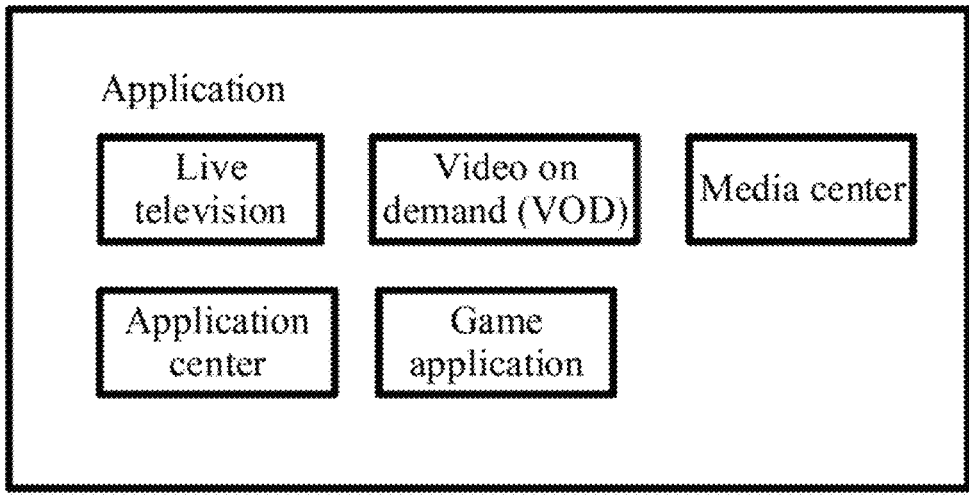
FIG. 5 is a schematic diagram of an icon control interface of an application of a display apparatus according to some embodiments of the disclosure.

In some embodiments, the application layer of the display apparatus may include at least one application. For example, as shown in FIG. 5, an icon control interface of the application in the display apparatus may include a live television application icon control, a video-on-demand application icon control, a media center application icon control, an application center icon control and a game application icon control.

In some embodiments, the live television application may provide live television and broadcast television through different signal sources. For example, a live television application may provide television signals by the input from a cable television, radio broadcasting, a satellite service or other types of live television services. The live television application may display media resource data of a live television signal on the display apparatus.

In some embodiments, the video-on-demand application may provide videos from different storage sources. Unlike live television applications, the video on demand (VOD) provides media resource data from some storage sources. For example, the video on demand may come from a server of cloud storage or from a local hard disk memory on which video programs are stored.

In some embodiments, a media center application may provide various multimedia content playing applications. For example, a media center may be different from the live television or the video on demand. The user may access various images or audios through the media center application.

In some embodiments, the application center may provide and store various applications. The application may be a game application, or a different application that is related to a computer system or other devices but may run in a smart television. The application center may obtain these applications from different sources, store the applications in a local memory, and then run applications on the display apparatus.

The display apparatus may play a variety of programs, such as the live television application and the video-on-demand application based on the applications described above. In some embodiments, different programs may correspond to different media resource types. Media resource data of programs with different media resource types are transmitted based on different transmission modes. For example, resource types may include a network media resource and a non-network media resource, and the network media resource may include Internet protocol information. The Internet protocol information may include uniform resource locator (URL) addresses of the programs. The display apparatus may obtain the media resource data of the program by accessing the URL address.

Figure 26:
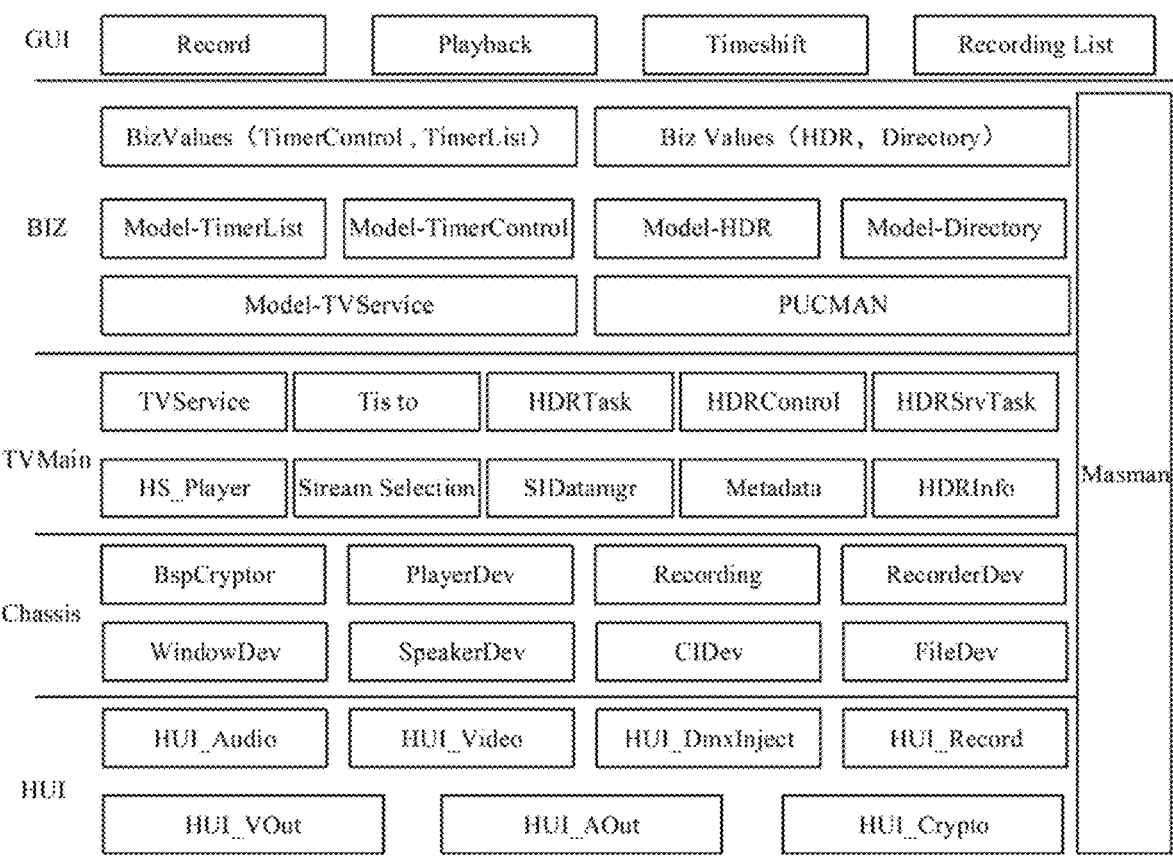
FIG. 26 is a schematic diagram of a system architecture for performing a personal video recorder (PVR) function by a display apparatus according to some embodiments of the disclosure.

In some embodiments, the display apparatus may perform a personal video recorder (PVR) function based on a system architecture as shown in FIG. 26. The system architecture may include: a graphical user interface (GUI), business interface of middleware (BIZ), a digital television middleware main process (TVMain), plug-ins (chassis), a hisense universal interface (HUI) and a mass storage manager (Masman).

The GUI may include a record module, a playback module, a timeshift module and a recording list module.

The BIZ may include a Biz Values (TimerControl, TimerList) module, a Biz Values (high-dynamic range (HDR) rendering, Directory) module, a timer list model (Model-TimerList), a timer control model (Model-TimerControl), Model-HDR, Model-Directory, Model-TVService, and a software package manager (PUCMAN).

The Main may include: a service of a display apparatus (TVService), a backup (Tis to) module, an HDR Task, HDRControl, a HDR port (Srv) Task, HS_Player, Stream Selection, SIDatamgr, Metadata and an HDR parameter (Info).

The Chassis may include: a board support package (BspCryptor), a player device (PlayerDev), recording, a recorder (RecorderDev), a window (WindowDev), a voice (SpeakerDev), continuous integration (CIDev) and a file (FileDev).

The HUI may include: an audio (HUI_Audio), a video (HUI_Video), demultiplexing (HUI_DmxInject), recording (HUI_Record), video output (HUI_VOut), audio output (HUI_AOut) and encryption (HUI_Crypto).

Here, the record module, the Biz Values (HDR, Directory) module, Model-HDR, HDRTask, HDRControl, and RecorderDev are modules mainly involved in the embodiments of the disclosure.

The playback module, the timeshift module, the recording list module, the Biz Values (TimerControl, TimerList) module, Model-TimerControl, Model-TimerList, Model-Directory, HDRSrvTask, SIDatamgr, Metadata, HDRInfo, Recording, HUI_DmxInject and the HUI_Record are internal modules of the PVR.

Model-TVService, PUCMAN, TVService, Tis to, HS_Player, Stream Selection, BspCryptor, PlayerDev, WindowDev, SpeakerDev, CIDev, FileDev, HUI_Audio, HUI_Video, HUI_VOut, HUI_AOut, HUI_Crypto are modules related to the PVR.

Figure 6:
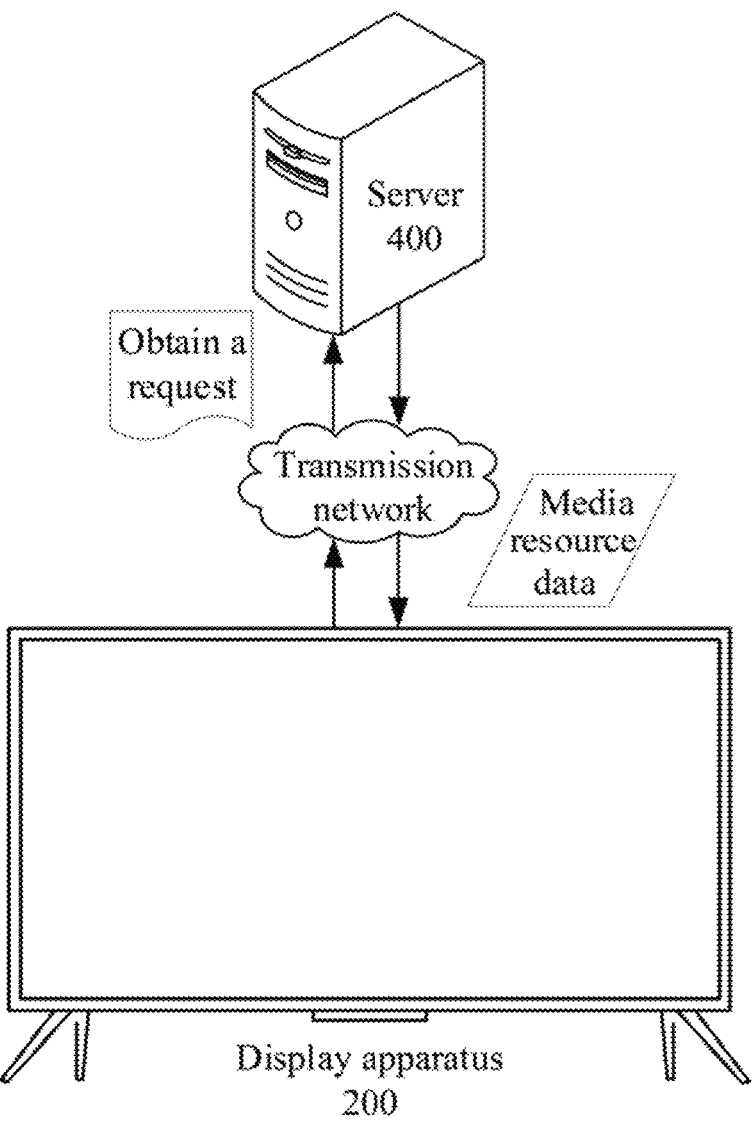
FIG. 6 is a schematic diagram of a connection relation between a display apparatus and a server according to some embodiments of the disclosure.

In order to cause the display apparatus to obtain corresponding media resource data based on the application, as shown in FIG. 6, in some embodiments, the display apparatus may communicate with the server 400 to implement data interaction. For example, the display apparatus may send a request for obtaining the media resource data to the server 400 in response to an interactive command from the user. The display apparatus then controls the display 260 to display a corresponding media resource picture according to media resource data fed back by the server 400.

In order to facilitate data interaction between the display apparatus and the server, in some embodiments, the display apparatus needs to establish the communication connection with the server, and then perform data interaction with the server through the communication connection established. For example, the display apparatus and the server may be in the communication connection through transmission networks with different transmission protocols, and interaction data are transmitted between the display apparatus and the server through the transmission networks.

In some embodiments, components for establishing the communication connection need to be provided on the display apparatus and the server respectively. That is, as shown in FIG. 5, a communicating device 220 may be provided in the display apparatus and a communication module may be provided in the server. The communicating device 220 and the communication module may simultaneously support at least one same communication mode to establish a communication connection relation. For example, the communicating device 220 in the display apparatus may include an optical fiber interface, and the display apparatus may be connected to a network through the optical fiber interface accordingly. At the same time, the communication module of the server may also include an optical fiber interface, and may be connected to the network through the optical fiber interface. Thus, the communication connection between the display apparatus and the server is established.

It should be noted that the display apparatus and the server may also establish a communication connection through other connection modes. For example, other connection modes may include wired broadband, a wireless local area network, a cellular network, Bluetooth, infrared and radio frequency communication.

The connection between the display apparatus and the server may be "many-to-one". That is, a plurality of display apparatuses may establish a communication connection with the same server, such that the server can provide services for the plurality of display apparatuses. The connection between the display apparatus and the server may also be "many-to-many". That is, a plurality of display apparatuses may establish communication connections with a plurality of servers, such that the plurality of servers can provide different services for the display apparatuses respectively. Apparently, in an individual application scenario, a connection between the display apparatus and the server may also be "one-to-one". That is, one server specifically provides services for one display apparatus.

In order to provide services for the display apparatus, the server may also include a storage module. The storage module may store various resource data, information files and control programs. In response to an interaction process of the user, the display apparatus may obtain different data from the storage module of the server. For example, in the case of a media resource item on demand by the display apparatus, the display apparatus may send a request for obtaining playing data to the server. After receiving the request, the server may extract the media resource data to be played from the storage module and transmit the media resource data to the display apparatus. Thus, the display apparatus may decode and display the media resource data. The control program stored in the storage module may be run by a control module of the server. Thus, the control module may execute corresponding functions according to the control program.

Based on the display apparatus and the server, the display apparatus may establish a communication connection with the server based on different protocols when transmitting data, so as to transmit the media resource data.

Thus, in some embodiments, the network media resource may be programs of a digital video broadcasting-Internet protocol (DVB-I). The DVB-I protocol is a protocol specified by the Digital Video Broadcasting Project, and is a television protocol based on an Internet protocol (IP) network. That is, the DVB-I protocol is an IP network protocol based on digital video broadcasting (DVB). The DVB is a series of internationally identified digital television public standards maintained by the Digital Video Broadcasting Project, and may include digital video broadcasting-terrestrial (DVB-T), digital video broadcasting-cable (DVB-C) and digital video broadcasting-satellite (DVB-S). The display apparatus may transmit the media resource data of the program based on IP network according to an URL address in a program of a DVB-I protocol.

When the media resource type is not the network media resource, the display apparatus may obtain the media resource data corresponding to the program by receiving the broadcast signal of the program. In some embodiments, the display apparatus may include a tuner module (tuner), a demodulation module (Demod), a demultiplexing module (Demux), and a decoding module (Decod). When a program of a non-network media resource is watched, the display apparatus tunes the broadcast signal of the display apparatus through the tuner module and demodulates the signal through the demodulation module. In addition, by combining the above two modules with the demultiplexing module and the decoding module, the display apparatus may receive the broadcast signal of the program and perform operations such as decoding, so as to play a corresponding program.

Figure 7:
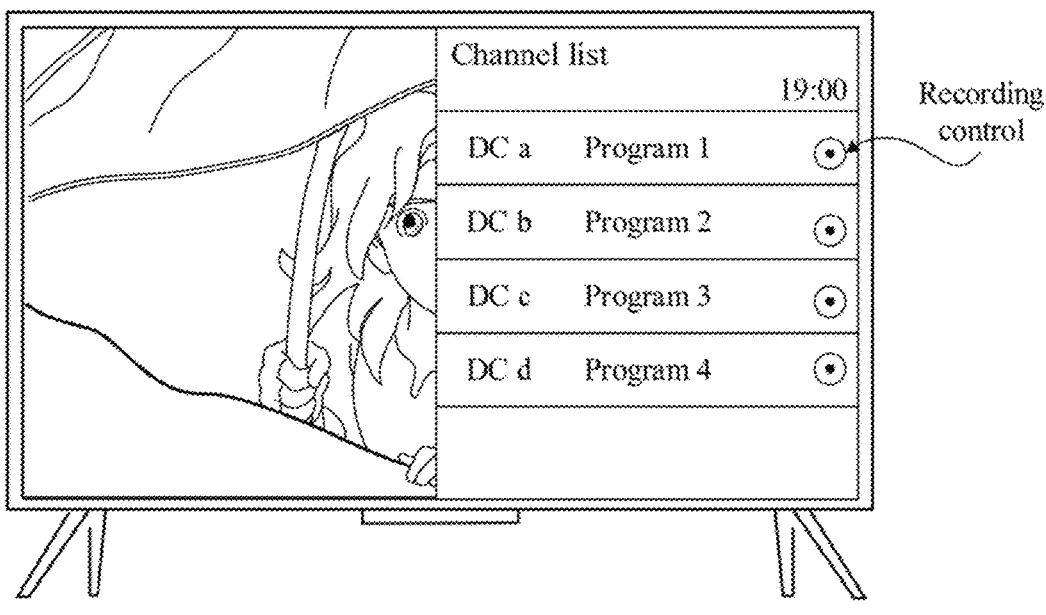
FIG. 7 is a schematic effect diagram of a channel list interface according to some embodiments of the disclosure.

In order to facilitate the user's selection of the corresponding program to be played in the display apparatus, in some embodiments, the display apparatus may also generate a program list according to media resource items included in the display apparatus, and display the program list in the display 260, to provide a program navigation mechanism for the display apparatus. For example, the program list may be an electronic program guide (EPG) page, a media resource recommendation page on a homepage interface, or a channel list as shown in FIG. 7.

In some embodiments, the display apparatus may obtain various commands from the user. Some commands are configured to control the display apparatus to display the program list, and are referred to as display commands for the program list. The user may input a program list search command in different interactive modes or based on different user interfaces. The display apparatus controls the display to display the program list in response to the display command. The program list may include tabs of the programs, and one tab corresponds to one media resource item. The user may generate a playing command for the program by performing a selection operation on the tab. The display apparatus responds to the playing command and plays the program corresponding to the tab.

Since some programs are merely broadcast at fixed time points, the program is missed once the time point when the program is broadcast is over. Thus, in order to satisfy the watch demand of the user, in some embodiments, the display apparatus may also record the program and store the media resource data of the program in the display apparatus for the user to play back and watch the program. Caching media data is achieved by saving the media data in the memory 280 of the display apparatus. The memory 280 may be memory hardware such as a local disk.

The display apparatus starts a recording flow of the program according to the recording command for recording the program. The recording command may be input based on the program list of the display apparatus. Thus, in some embodiments, the display apparatus receives the display command for displaying the program list and controls the display to display the program list in response to the display command. The program list may include the tabs of the programs. The tab may include a recording control. The recording control is a program control that triggers the recording command. The user may select the recording control to generate the recording command corresponding to the program. Thus, when the recording control is in a selected state, the recording command is generated.

For example, at 19:00, the user inputs a display command for the channel list into the display apparatus through a remote control supporting the display apparatus. The display apparatus controls the display to display the channel list as shown in FIG. 7 in response to the display command for the channel list. The channel list may include program tabs of channels at 19:00, and the tab may include the recording control of the program. The user may perform the selection operation on the recording control to generate the recording command corresponding to the program. Thus, the display apparatus may execute a corresponding recording program according to the recording command.

It should be noted that the channel list according to some embodiments of the disclosure is merely illustrative description of the program list. The programs of the disclosure may also adopt a list of another form, such as a homepage list and a media resource recommendation list of applications, which is not limited in the disclosure.

In order to facilitate program recording by the user, in some embodiments, before the recording command is generated the display apparatus also controls the display to display a recording setting interface in response to the selection operation of the recording control. The recording setting interface may include a program option control and a recording duration control. The recording duration control may include child controls of recording start time and recording end time. The program option controls refer to all program options on this channel after a current time point. The user may record a complete video under the program option by selecting the program option control. After the user selects the recording duration control, the display apparatus displays the child controls of recording start time and recording end time. The user may customize a recording duration of the program through the two child controls.

For example, as shown in FIG. 7, after the user selects a recording control of a channel DC d in FIG. 7, the display apparatus displays a recording setting interface of the channel DC d. The time in FIG. 7 is 19:00, and the recording setting interface displays the program option controls of the channel DC d after 19:00, and may include an option control of a program 4 currently played. In this case, the user may directly click the option control of the program 4, to generate a recording command for the program 4. The display apparatus may automatically complete recording of the program 4 according to playing time of the program 4.

In some embodiments, when the display apparatus records the program, a broadcast signal of the program is tuned by the built-in tuner module of the display apparatus. Thus, the display apparatus may receive the broadcast signal of the program. The broadcast signal is decoded to form a media resource data stream of a target program. The media resource data stream is then written onto the memory 280 of the display apparatus. When the user wants to re-watch the program, the user may re-watch the program through the data stored in the memory 280.

However, one tuner module may exclusively tune signals of one broadcast program within one period. Thus, numerous tuner modules are required for the user to simultaneously record numerous broadcast programs. For example, based on that the user wants to record programs broadcast by channels DC a and DC b during a period of 19:00-19:45, two tuner modules are needed to tune signals. The display apparatus cannot record multicast broadcast programs based on that the number of broadcast programs recorded by the user is greater than the number of tuner modules of the display device. For example, when one tuner module is built in the display apparatus, the user cannot record two programs in the same time period. Thus, recording efficiency of the programs in the display apparatus is reduced and user experience is degraded.

Figure 8:
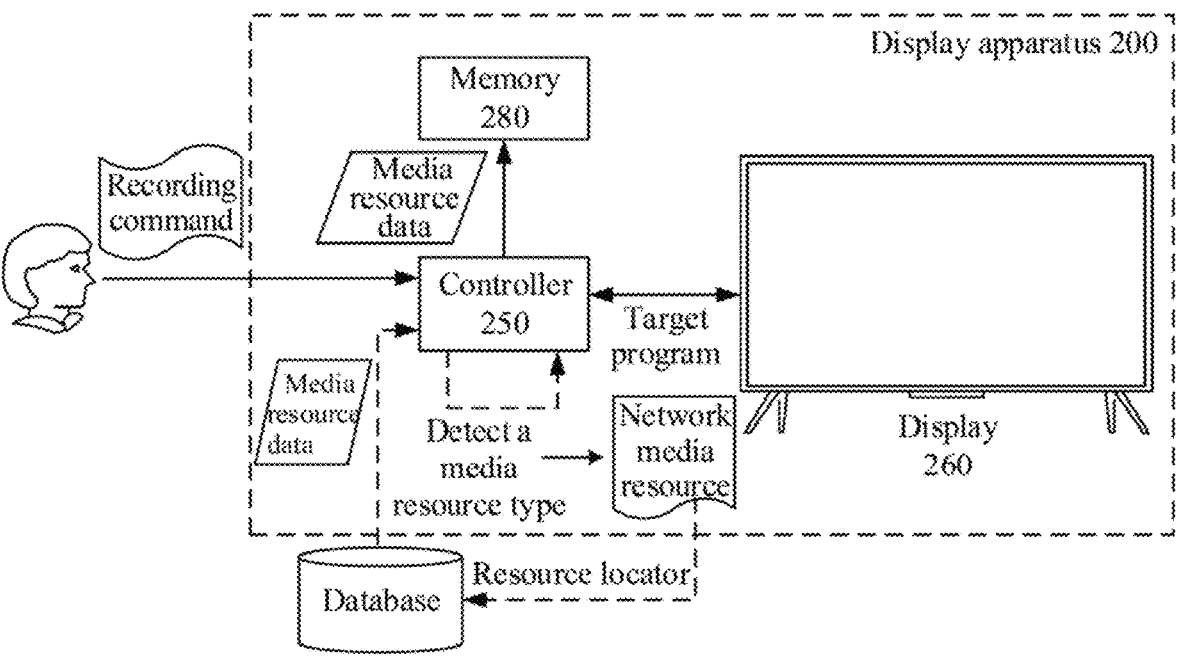
FIG. 8 is a schematic flowchart of executing a multi-channel media resource recording method by a display apparatus according to some embodiments of the disclosure.
Figure 9:
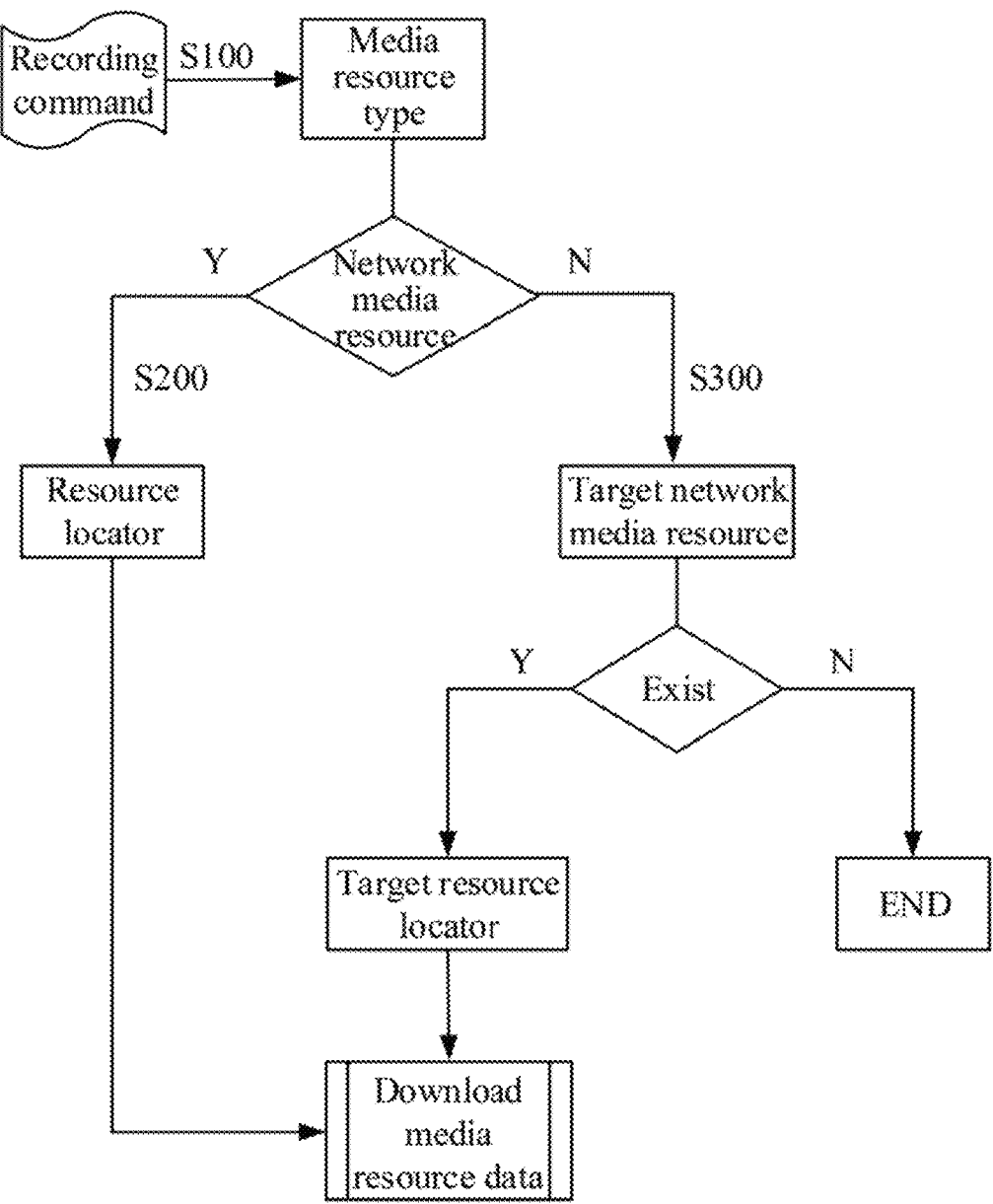
FIG. 9 is a flowchart of a multi-channel media resource recording method according to some embodiments of the disclosure.

Based on the above scenario, in order to solve the problem of low recording efficiency of the programs in the display apparatus, some embodiments of the disclosure provide a display apparatus. As shown in FIG. 8, the display apparatus may include a display, a memory 280 and at least one processor 250. The display is configured to display an image and/or a user interface. The memory 280 is configured to store media resource data. The memory 280 may be a disk or storage hardware built in the display apparatus or an external storage device. As shown in FIG. 9, at least one processor 250 is configured to execute computer instructions to cause the display apparatus to execute operations as follows.

S100: In response to a recording command for the target program, a media resource type of a target program is detected.

The display apparatus may detect the media resource type of the target program in response to the recording command after receiving the recording command for the target program. The media resource type may include a network media resource and a non-network media resource, the network media resource may include Internet protocol information, and the Internet protocol information may include resource locator addresses of programs. Since the programs in the display apparatus may have various media resource types, the media resource type of the target program is detected before the target program is recorded, so as to determine a method of obtaining media resource data corresponding to the target program.

Figure 10:
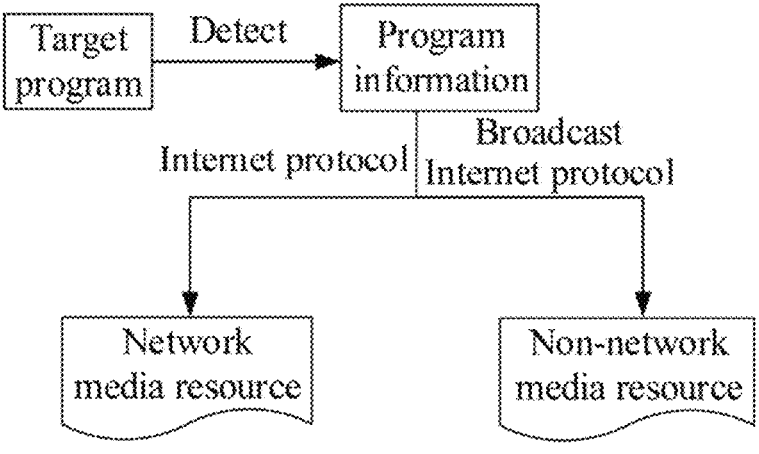
FIG. 10 is a schematic structural diagram of detecting a media resource type of a target program according to some embodiments of the disclosure.

Thus, in some embodiments, as shown in FIG. 10, when the display apparatus detects the media resource type of the target program, program information of the target program may be detected. The program information may include a transmission protocol of the media resource data, and the transmission protocol may include an Internet protocol and a broadcast network protocol. For example, the Internet protocol may be a transmission protocol of DVB-I, and the broadcast network protocol may be a transmission protocol of DVB. Since the Internet protocol is based on IP network transmission, corresponding Internet protocol information may include a resource locator of the program. Thus, the media resource type is marked as the network media resource based on that the transmission protocol is the Internet protocol. On the country, the media resource type is marked as the non-network media resource based on that the transmission protocol is the broadcast network protocol.

For example, when the display apparatus detects the media resource type of the target program, the display apparatus may obtain the program information of the target program and detect data contents included in the program information, to determine the transmission protocol of the media resource data. Based on that the channel information includes an IP address and an URL address of the target program, the media resource type is marked as the network media resource. Based on that the channel information does not include an IP address and an URL address of the target program, the media resource type is marked as the non-network media resource.

Moreover, in some embodiments, when detecting the media resource type of the target program, the display apparatus may also determine a target media resource type of the target program according to the channel information corresponding to the target program. That is, when detecting the media resource type of the target program, the display apparatus searches for the channel information corresponding to the target program. Based on that the channel information includes an Internet application service, the media resource type is marked as the network media resource. For example, with a DVB-I channel as an example, a channel corresponding to DVB-I programs may include the Internet application services, such as video on demand, an application store and social media, etc.

S200: Based on that the media resource type is the network media resource, media resource data of the target program are downloaded according to the resource locator address and the media resource data is written onto a memory.

After detecting the media resource type of the target program, the display apparatus may obtain the media resource data of the target program according to a transmission mode of the media resource type, to record the target program. Based on that the media resource type is the network media resource, the media resource data of the target program may be downloaded directly according to the resource locator address of the target program. In addition, since the media resource data is downloaded based on the network, the display apparatus may record simultaneously multi-channel programs without the tuner module. After downloading the media resource data, the display apparatus writes the media resource data onto the local memory 280. In this way, the user may re-watch the target program through the media resource data stored in the memory 280.

In some embodiments, a process of downloading the media resource data by the display apparatus according to the resource locator may be based on a browser of the display apparatus. That is, based on that the media resource type is the network media resource, the display apparatus may create a browser process of downloading the media resource data, and access a webpage address corresponding to the resource locator through the browser process, to download the media resource data of the target program.

S300: Based on that the media resource type is the non-network media resource, a target network media resource corresponding to the target program is searched for, and based on that the target program has the target network media resource, media resource data of the target program are downloaded according to the resource locator address and the media resource data are written onto the memory.

In some embodiments, when downloading the media resource data of the target program according to the resource locator address, the display apparatus accesses the webpage address corresponding to the resource locator, obtains resource data of the webpage address, and loads the resource data. The resource data may include the media resource data of the target program. That is to say, the display apparatus may store and download the media resource data by accessing the corresponding webpage address and loading the resource data of the target program.

It can be seen from the above embodiments that since the network media resources do not need signal demodulation with the tuner, the non-network media resources and the network media resources may be simultaneously recorded, thus recording the multi-channel programs.

Based on that the display apparatus detects that the media resource type of the target program is the non-network media resource, it indicates that a current program is a traditional broadcast program. In this case, the display apparatus searches for the target network media resource corresponding to the target program from a database. For example, based on that the target program is the DVB program, the display apparatus searches for DVB-I program information corresponding to the program from the database, and obtains the target network media resource through the DVB-I program information searched.

Thus, when finding the target network media of the target program, the display apparatus downloads the media resource data according to the resource locator corresponding to the target network media resource, and writes the media resource data downloaded onto the local memory 280 of the display apparatus. In this case, the display apparatus still records the target program through network-based downloading, thus removing limitation of the number of tuner modules during program recording and further improving the program recording efficiency of the display apparatus.

After the display apparatus searches for the target network media resource corresponding to the target program, the program is recorded through the broadcast signal of the target program based on that the target network media resource does not exist. That is, in some embodiments, the display apparatus is switched to a signal source corresponding to the target program based on that the target program does not have the target network media resource. Then, the broadcast signal of the target program provided by the signal source is received, and the broadcast signal is decoded to form the media resource data stream of the target program. After obtaining the media resource data stream of the target program, the display apparatus copies the media resource data stream and writes the media resource data stream copied onto the memory 280.

Figure 11:
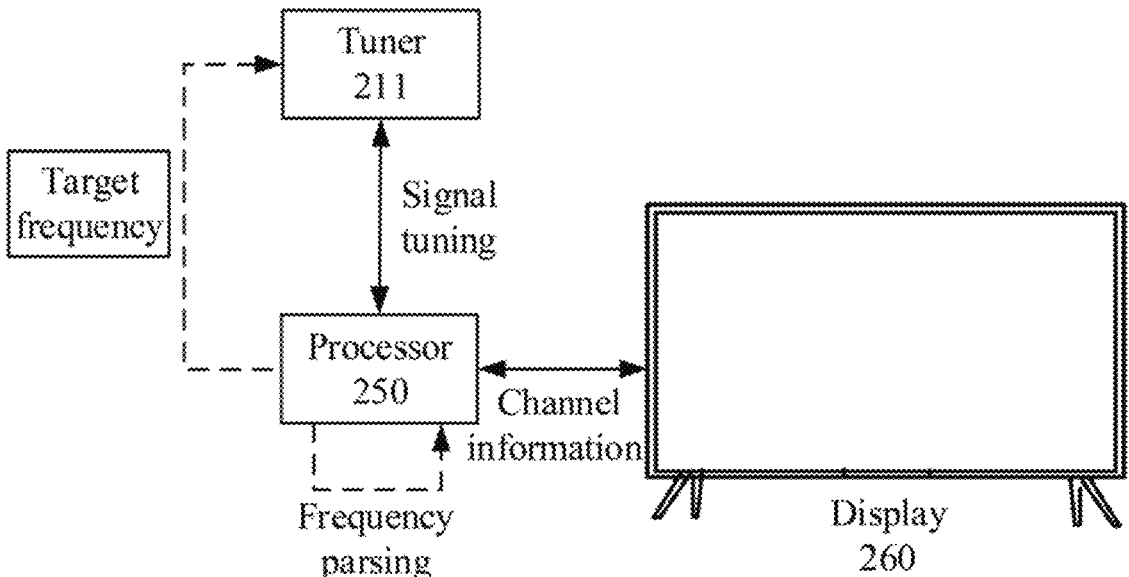
FIG. 11 is a schematic flowchart of switching a signal source of a target program according to some embodiments of the disclosure.

As shown in FIG. 11, in some embodiments, the display apparatus may further include a tuner 211. The tuner 211 may be a sub-module integrated into the tuning demodulator 210 or an independent tuner module. The tuner 211 is configured to tune a frequency of the display apparatus. When switched to the signal source of the target program, the display apparatus also obtains the channel information of the target program. The channel information may include a target frequency of the target program. After obtaining the channel information, the display apparatus parses the target frequency of the target program in the channel information, and tunes the signal source to the target frequency through the tuner 211.

Figures 12, 13:
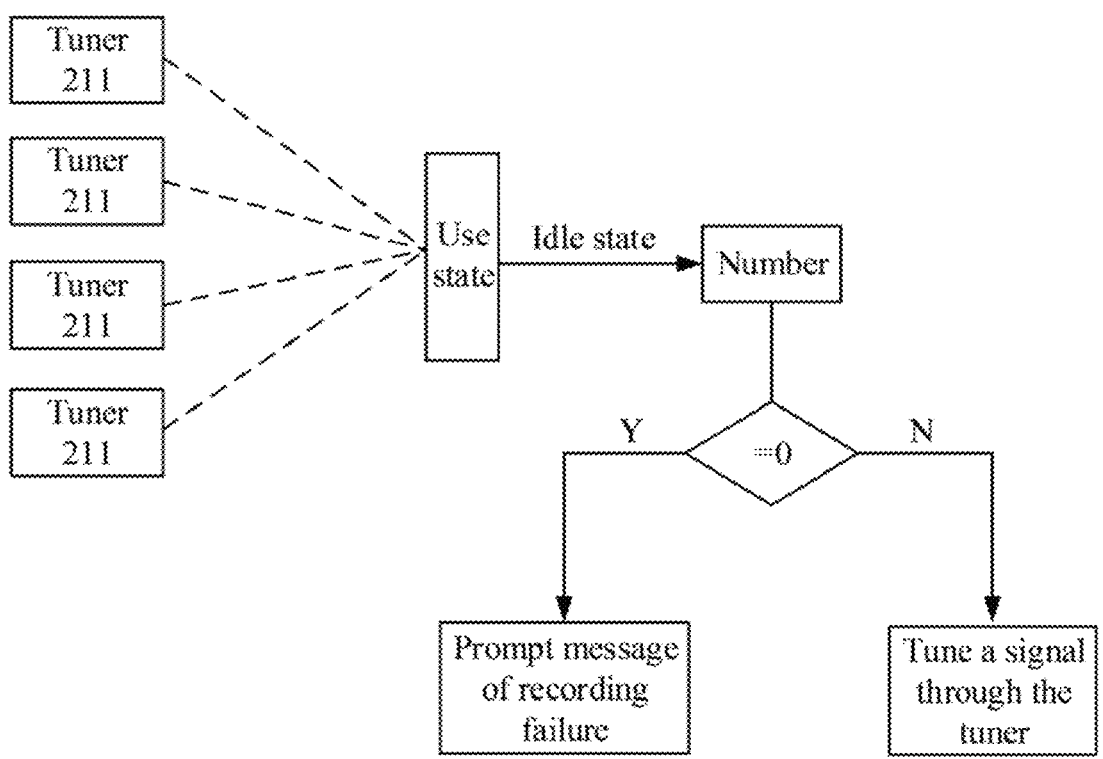
FIG. 12 is a schematic flowchart of detecting the number of tuners according to some embodiments of the disclosure.
FIG. 13 is a schematic flowchart of encrypting media resource data according to some embodiments of the disclosure.

Since one tuner 211 may merely support signal tuning of one program within one period, in some embodiments, as shown in FIG. 12, the display apparatus also detects a use state of the tuner 211 before being switched to the signal source of the target program, and obtains the number of tuners in an idle state. The use state may include a working state and an idle state. Based on that the number of tuners in the idle state is equal to 0, it means that there is no idle tuner 211 currently in the display apparatus to tune the broadcast signal of the target program. In this case, the display apparatus controls the display to display a prompt message of recording failure. Based on that the number of tuners in the idle state is greater than or equal to 1, it means that there is an idle tuner 211 currently in the display apparatus to tune the broadcast signal of the target program. The display apparatus tunes the signal source to the target frequency through the tuner 211 in the idle state.

For example, one tuner 211 is built in the display apparatus, and the tuner 211 is executing recording of a program 1 in a channel DC a. In this case, the user sends a recording command for a program 2 in a channel DC b to the display apparatus through a remote control device supporting the display apparatus. After receiving the recording command, the display apparatus traverses use states of the tuner 211 in response to the recording command. There is merely one tuner 211 in the display apparatus, and the tuner 211 is in a working state. Thus, the number of tuners in an idle state learned by the display apparatus is 0, and the display apparatus controls the display to display a prompt window of the recording failure. The prompt window displays prompt words "Recording of the program 1 is being performed, and recording of the program 2 fails".

Based on the embodiments described above, the display apparatus may obtain the media resource data through the tuner 211 and network download at the same time, and write the media resource data onto the memory 280, to record the program. Since the network download does not depend on signal tuning by the tuner 211, the user may simultaneously record programs that have media resource types of the network media resource and the non-network media resource, thus recording multi-channel programs.

For example, with the DVB program and the DVB-I program as an example, a program type of the DVB program is the non-network media resource, and a program type of the DVB-I program is the network media resource. The user wants to record a program 1 and a program 3 simultaneously in the display apparatus. The program 1 is the DVB program and the program 3 is the DVB-I program. The user may first input a recording command for the program 1 to the display apparatus, and the display apparatus searches for DVB-I program information of the program 1 from the database in response to the recording command for the program 1. After finding absence of the DVB-I program information in the database, the display apparatus tunes a signal source to a frequency of the program 1 through the tuner 211, to record the program 1. In this case, the user inputs a recording command of the program 3 to the display apparatus, and the display apparatus downloads media resource data of the program 3 according to an URL address of the DVB-I program information corresponding to the program 3. Thus, the display apparatus may simultaneously record the program 1 and the program 3.

In order to record multi-channel programs advantageously, in some embodiments, the program list may include a check mode. In the check mode, a selection operation may be performed on recording controls of a plurality of programs. The user may adjust the program list to the check mode through the control device 100, and simultaneously input the recording commands for the plurality of programs in the check mode.

In some embodiments, the memory 280 may also be an external memory connected to the display apparatus, and the display apparatus may write the media resource data onto the external memory through a connection relation with the external memory. Since the program may merely be played on an authorized device, it is necessary to encrypt and protect the media resource data when recording the media resource data.

Thus, in order to protect the media resource data of the program and limit playing of the media resource data to the authorized device, in some embodiments, the display apparatus also encrypts and protects the media resource data when recording the program, and the media resource data may be merely decoded and played in the authorized display apparatus.

In some embodiments, as shown in FIG. 13, the display apparatus further detects a characteristic value of the display apparatus when writing the media resource data onto the memory 280. The characteristic value may include identifier information configured to characterize the display apparatus, such as a media access control (mac) address, a serial number (SN) and other unique identifiers. After detecting the characteristic value of the display apparatus, the display apparatus sets a key according to the characteristic value, encrypts the media resource data based on an encryption algorithm, and forms encrypted recording data of the target program. Then, the encrypted recording data are written into the memory 280, and thus, the media resource data of the target program is protected.

The encryption algorithm is used for encrypting plaintext media resource data and enabling the media resource data to be an unreadable piece of code, to form the encrypted recording data. The encrypted recording data may merely display original plaintext data after a corresponding key is input. That is, the encrypted recording data may be merely decrypted with the characteristic value of the display apparatus, and the encoding information encrypted may be converted into an initial form of the media resource data.

Thus, the display apparatus may decrypt the media resource data with the characteristic value. That is, in some embodiments, the display apparatus also extracts the media resource data from the memory 280 in response to a playback command for the target program, decrypts the media resource data with the characteristic value, and controls the display to display an image from the media resource data. In this way, the media resource data in the memory 280 may be merely played in the authorized display apparatus, through which the media resource data of the program can be protected and security of the media resource data is improved.

In some embodiments, a playback list is configured in the display apparatus. The playback list is configured to display a playback option control of a recorded program. That is, the display apparatus may generate the playback list of the program according to the media resource data stored in the memory 280. The user may perform a selection operation on the playback option control to generate the playback command.

Based on the display apparatus described above, some embodiments of the disclosure further provide a data processing method. As shown in FIG. 9, the data processing method may include:

S100: in response to a recording command for the target program, detecting a media resource type of a target program, where the media resource type includes a network media resource and a non-network media resource, the network media resource includes Internet protocol information, and the Internet protocol information includes resource locator addresses of programs;

S200: based on that the media resource type is the network media resource, downloading media resource data of the target program according to the resource locator address and writing the media resource data onto a memory; and S300: based on that the media resource type is the non-network media resource, searching for a target network media resource corresponding to the target program, and based on that the target program has the target network media resource, downloading media resource data of the target program according to the resource locator address and writing the media resource data onto the memory.

It can be seen from the implementations that some embodiments of the disclosure provide the display apparatus and the data processing method, and the display apparatus may detect the media resource type of the target program in response to the recording command for the target program. The media resource type may include the network media resource and the non-network media resource, the network media resource may include the Internet protocol information, and the Internet protocol information may include the resource locator address of the program. Based on that the media resource type is the network media resource, the media resource data of the target program is downloaded according to the resource locator address and the media resource data is written onto the memory of the display apparatus. Based on that the media resource type is the non-network media resource, the target network media resource corresponding to the target program is searched for, and the media resource data of the target program is downloaded according to the resource locator address and the media resource data is written onto the memory based on that the target program has the target network media resource. The method can simultaneously record multi-channel programs, thus improving the program recording efficiency of the display apparatus and improving user experience.

Based on the display apparatus, specific images may be output, such as a media resource image including an audio and a video. The user may watch live or on-demand media resources through a display apparatus such as a television. For example, it is impossible for the user to watch the live media resource uninterruptedly for a long time. Thus, in order to re-watch a live media resource advantageously, the live broadcasting program may be recorded as a file and then saved in a memory device such as a hard disk. After the media resource is recorded and stored as the recorded file, the recorded file may be re-watched.

When re-watching the recorded file, the user may perform operations, such as pause, fast forward and fast rewind, on the recorded file to control a playing progress. Recording time of the recorded file may be long, and one recorded file may include a plurality of clips of programs. When the user plays the recorded file, it is impossible for the user to know in detail specific programs included in the recorded file. When the user wants to watch a program of the recorded file instead of the overall recorded file, the user may merely locate the program by dragging the progress bar, such as fast forward or fast rewind. However, since start time of the target program which the user wants to watch may not be known, the user may merely fast forward for a while and then observe whether the target program is located. The user continues fast-forwarding the recorded file based on that the progress bar does not reach the target program, or fast-rewinding the recorded file based on that the progress bar reaches beyond the target program, and repeats such operations until the target program is located. It can be seen that a process of locating the target program by simply dragging the progress bar, such as fast forward or fast rewind, is extremely cumbersome and inconvenient in operation.

In order to locate a target program, in some embodiments, an image thumbnail may be displayed when the progress bar is dragged, such as fast forward or fast rewind. In this way, the user may determine whether the target program is located based on the image thumbnail during fast-forwarding. However, in this method, the operation of fast forward or fast rewind is still required to be executed uninterruptedly, and it is difficult to locate a playing start time point of the target program during fast-forwarding or fast-rewinding. In addition, the user cannot accurately determine whether it is the target program based on the image thumbnail. Thus, the target program in the recorded file cannot be accurately located by dragging the progress bar, such as fast forward or fast rewind, or by displaying the image thumbnail, the operation is cumbersome, and the user experience is degraded.

In order to solve the problem that the target program in the recorded file cannot be accurately located, some embodiments of the disclosure provide a display apparatus. The display apparatus may include a display and at least one processor 250. The at least one processor is configured to execute computer instructions to cause the display apparatus to execute a method for controlling playing of a recorded file. The display apparatus may parse and display program information such as the playing start time, the playing end time and program names of all programs included in the recorded file in the process of playing the recorded file, and identify the program information on the progress bar. In this way, the user can directly skip to the target program to watch the same based on the program information, and can accurately locate the target program without frequently dragging the progress bar. Thus, the operation by the user is simplified, and the problem that the target program in the recorded file cannot be accurately located is then solved.

Figure 14:
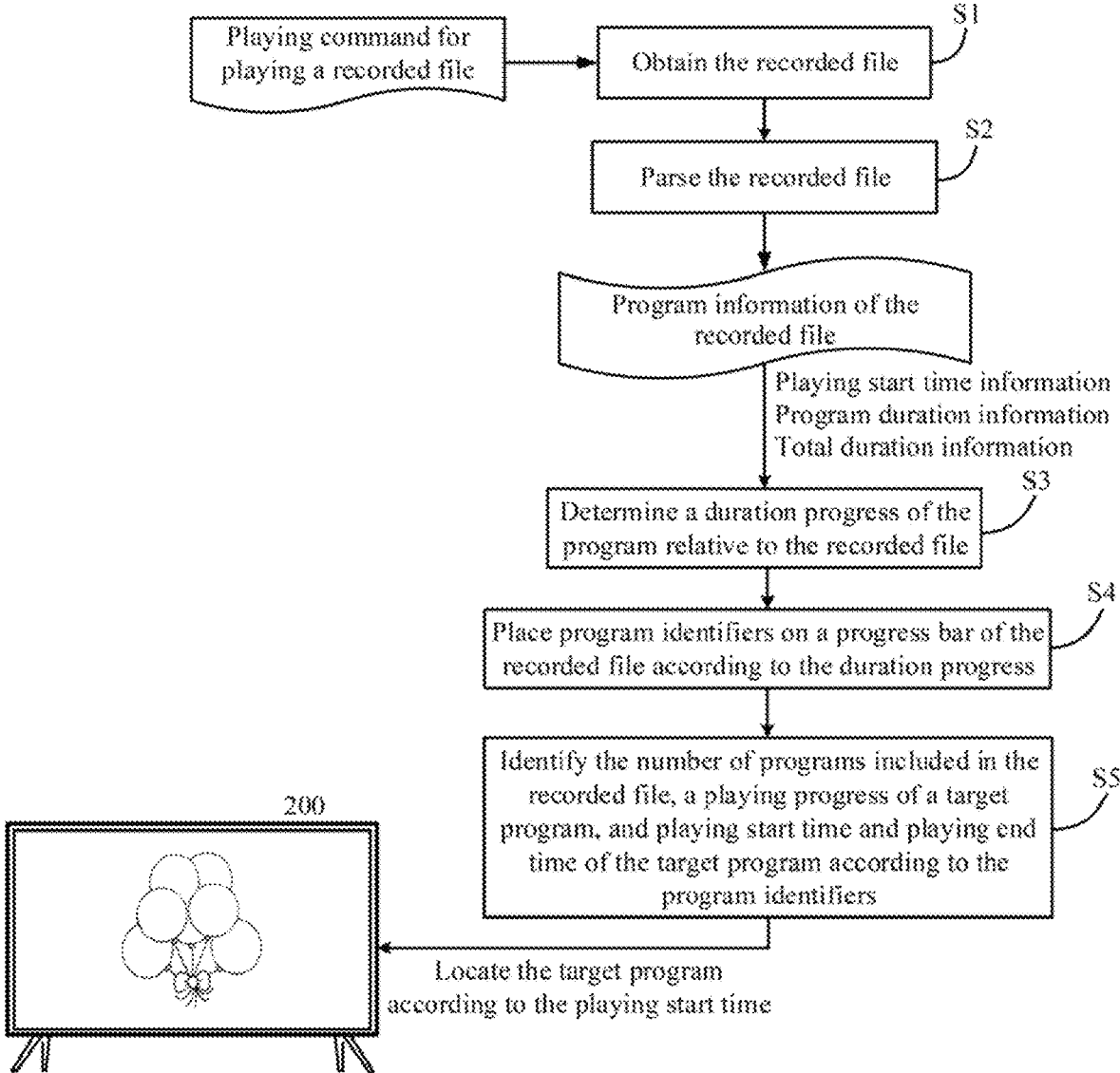
FIG. 14 is a schematic flowchart of executing a method for controlling playing of a recorded file by a display apparatus according to some embodiments of the disclosure.

In order to understand some embodiments of the disclosure advantageously, steps will be described in detail in conjunction with some specific embodiments and accompanying drawings. FIG. 14 is a schematic flowchart of executing a method for controlling playing of a recorded file on a display apparatus according to some embodiments of the disclosure. As shown in FIG. 14, in some embodiments, when executing the method for controlling playing of a recorded file, the display apparatus may execute the following steps S1-S5.

S1: In response to a playing command for playing the recorded file, the display apparatus obtains a recorded file.

In some embodiments, the recorded file is a file generated by recording a media resource played on the display apparatus. When re-watching a live media resource by playing the recorded file, the user may watch a recorded file that is stored in the memory device or record a new clip of recorded file through a recording device. The process of recording and generating the recorded file is described below through examples.

Figure 15:
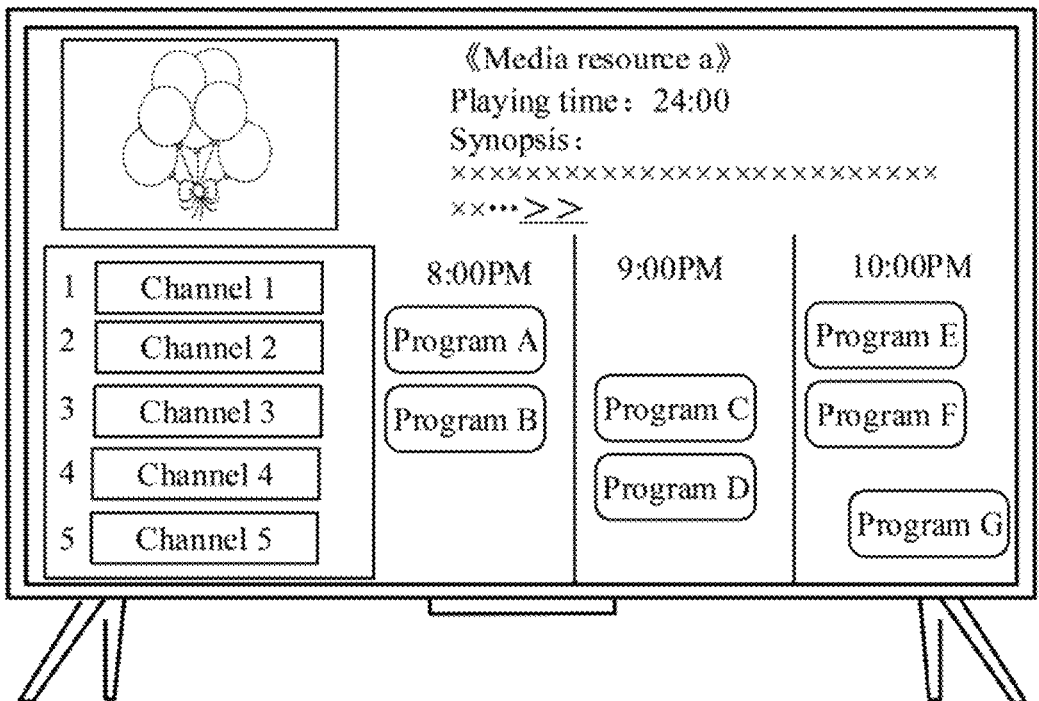
FIG. 15 is a schematic diagram of a scenario of recording a file through an electronic program guide interface according to some embodiments of the disclosure.
Figure 16:
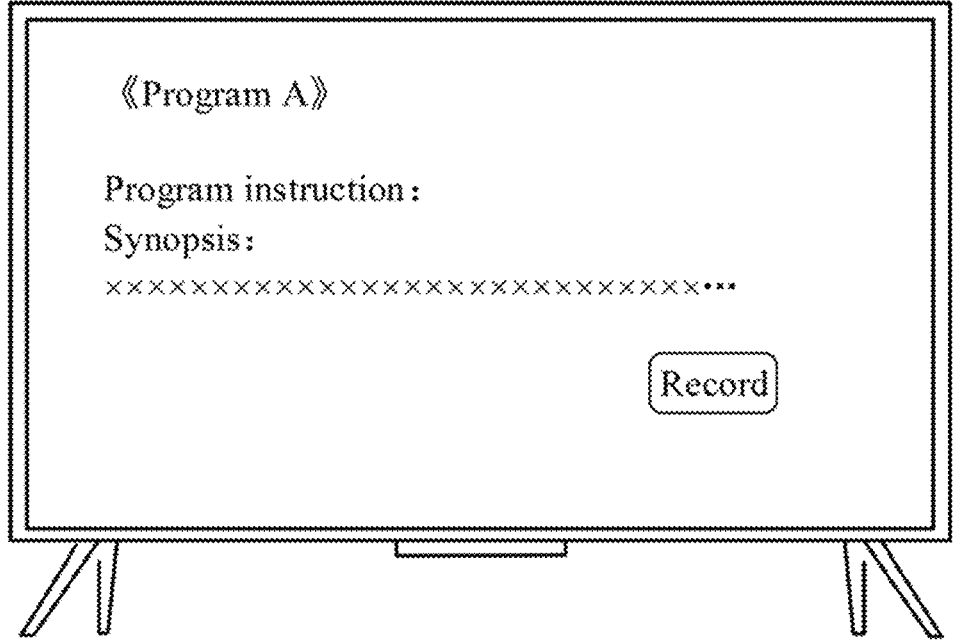
FIG. 16 is a schematic effect diagram of a program detail page according to some embodiments of the disclosure.

In order to record the live media resource as the recorded file, the following several recording entry interfaces may be used. FIG. 15 is a schematic diagram of a scenario of recording a file through an electronic program guide interface according to some embodiments of the disclosure. As shown in FIG. 15, on the electronic program guide interface, a program list played by current five channels within three hours is displayed, and when the user selects a program, a program detail page may be entered. FIG. 16 is a schematic effect diagram of a program detail page according to some embodiments of the disclosure. As shown in FIG. 16, when the user selects a program A, a detail page of the program A may be entered, and there is a recording function key in the detail page. When the user selects the recording key, a recording flow of the program A may be started and a recorded file is generated.

In some embodiments, when playing the live media resource through the display apparatus, the user may also open a menu through a remote control, and then select the recording function in the menu, to record the media resource and generate a recorded file in this way. Similarly, the user may also search for the program that they want to record in the display apparatus. After searching is completed, the program detail page may be entered by clicking the program. Similarly, a recording function key may be set in the detail page, and then the program may be recorded by selecting the recording function key.

Figures 17, 18:
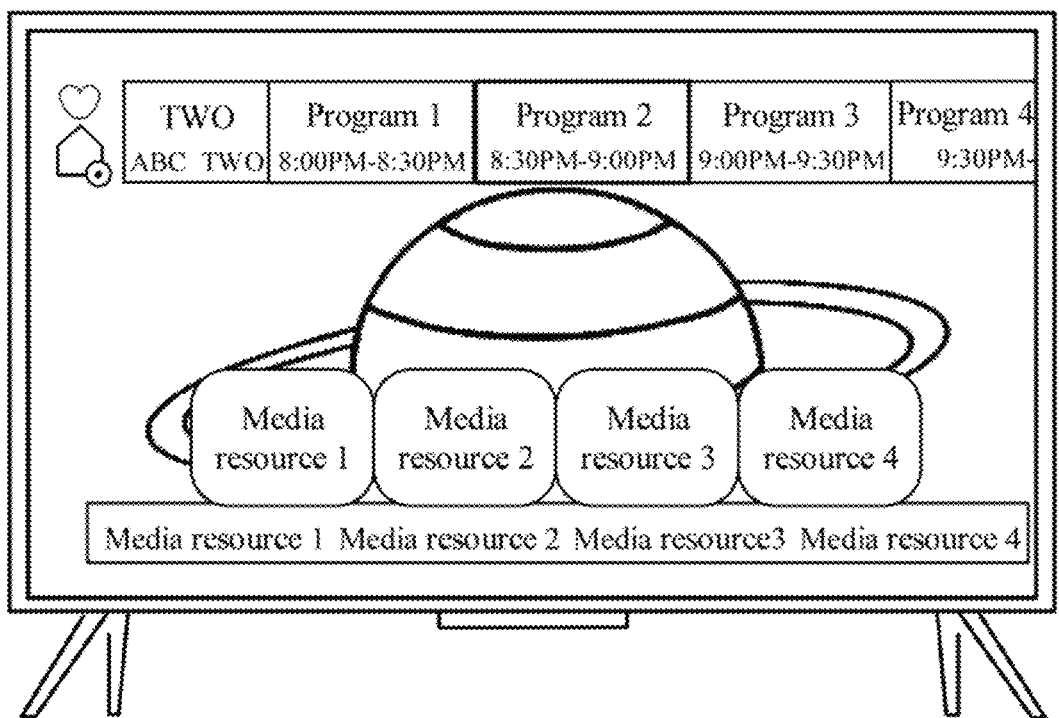
FIG. 17 is a schematic diagram of a scenario of recording a file through an information bar interface according to some embodiments of the disclosure.
FIG. 18 is a schematic effect diagram of entering a detail page after selecting a program from an information bar according to some embodiments of the disclosure.

In some embodiments, the file may also be recorded through an information bar interface. FIG. 17 is a schematic diagram of a scenario of recording a file through an information bar interface according to some embodiments of the disclosure. As shown in FIG. 17, on the information bar interface, that is, on the infoBar interface, a program list of a channel within several hours, such as a program list within eight hours, may be displayed. Programs in the program list may include a program 1, a program 2, a program 3 and the like. When the user selects a program, for example, the program 2, the program detail page of the program 2 may be entered. FIG. 18 is a schematic effect diagram of entering a detail page after selecting a program from an information bar according to some embodiments of the disclosure. As shown in FIG. 18, details of the program 2 may be displayed in the detail page interface, and in addition, a recording key may be set in the detail page. When the user selects the recording key, a recording flow of the program 2 may be started, and a recorded file may be generated. It can be understood that there are other ways to start the recording function of the media resource, which may be selected according to demands in an actual use scenario, and is not limited in the disclosure.

In some embodiments, in the process of recording the media resource, different recording modes may be selected according to the demand of the user. For example, recording may be started at the beginning of the program and stopped at the end of the program. The display apparatus may also provide the user with the custom recording time. Illustratively, the display apparatus may be provided with a time selection interface for recording the recorded file. The user may manually set the recording start time and the recording end time through this interface. After the setting is completed, the display apparatus may execute a recording flow according to the set time.

Figure 19:
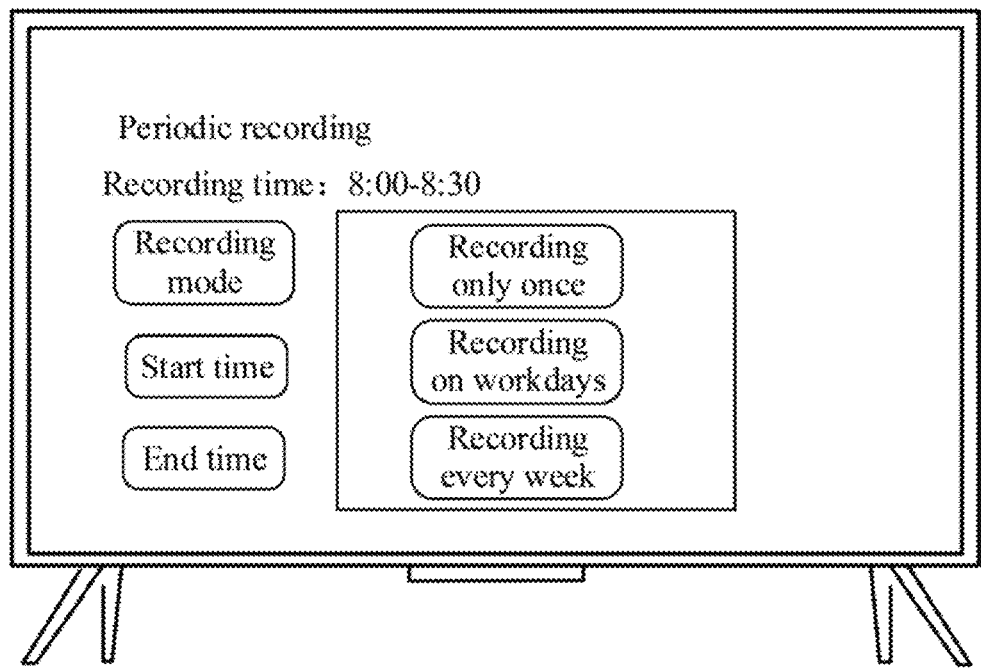
FIG. 19 is a schematic effect diagram of a periodic recording interface according to some embodiments of the disclosure.

In order to facilitate periodic recording of the media resource by the user, the display apparatus may also provide the user with a periodic recording function. FIG. 19 is a schematic effect diagram of a periodic recording interface according to some embodiments of the disclosure. As shown in FIG. 19, the user may select different periodic recording modes through the periodic recording interface, such as recording only once, recording every week and recording on workdays. In this way, the display apparatus may perform a periodic recording function according to a period set by the user.

No matter which recording entry interface and which recording mode are adopted, after recording is completed, the recorded file may be generated and may be stored in the memory device such as a USB flash disk and a hard disk. In this way, the recorded file may be obtained, and the following step S2 may be executed after step S1.

S2: The display apparatus obtains program information of the recorded file by parsing the recorded file.

In order to know the program information included in the recorded file, in some embodiments, the display apparatus may parse the recorded file after obtaining the recorded file. Illustratively, when the user plays one recorded file, the display apparatus may synchronously parse the recorded file, to obtain all program information in the recorded file. The program information may at least include playing start time information and program duration information of the programs, and total duration information of the recorded file, and may also include other related information. For example, the program information may also include a program name, program details, an age rating for the program, etc. The following step S3 may be executed after step S2.

S3: The display apparatus determines a duration progress of the program relative to the recorded file according to the playing start time information, the program duration information and the total duration information.

In order to make it easier for the user to identify programs included in the recorded file through the progress bar, in some embodiments, the display apparatus may determine the duration progress of the program relative to the recorded file according to the playing start time information and the total duration information after obtaining the program information of the recorded file. Illustratively, the total duration of the recorded file is 60 minutes, the playing start time of a program is the 20th minute, and playing duration information of the program is 20 minutes. Then, a duration progress of the program relative to the recorded file is one third of the total duration, and playing of the program is started from the 20th minute. In this way, a playing start time point of each program, a playing duration of each program, and a duration progress of the playing duration of each program relative to the total duration can be obtained. The following step S4 may be executed after step S3.

S4: The display apparatus places program identifiers on a progress bar of the recorded file according to the duration progress.

In order to add the program identifier to the program on the progress bar and make it easier for the user to intuitively obtain a position of the program advantageously, in some embodiments, the display apparatus may also place the program identifier on the progress bar of the recorded file according to the duration progress after determining the duration progress of each program relative to the recorded file.

Figure 20:
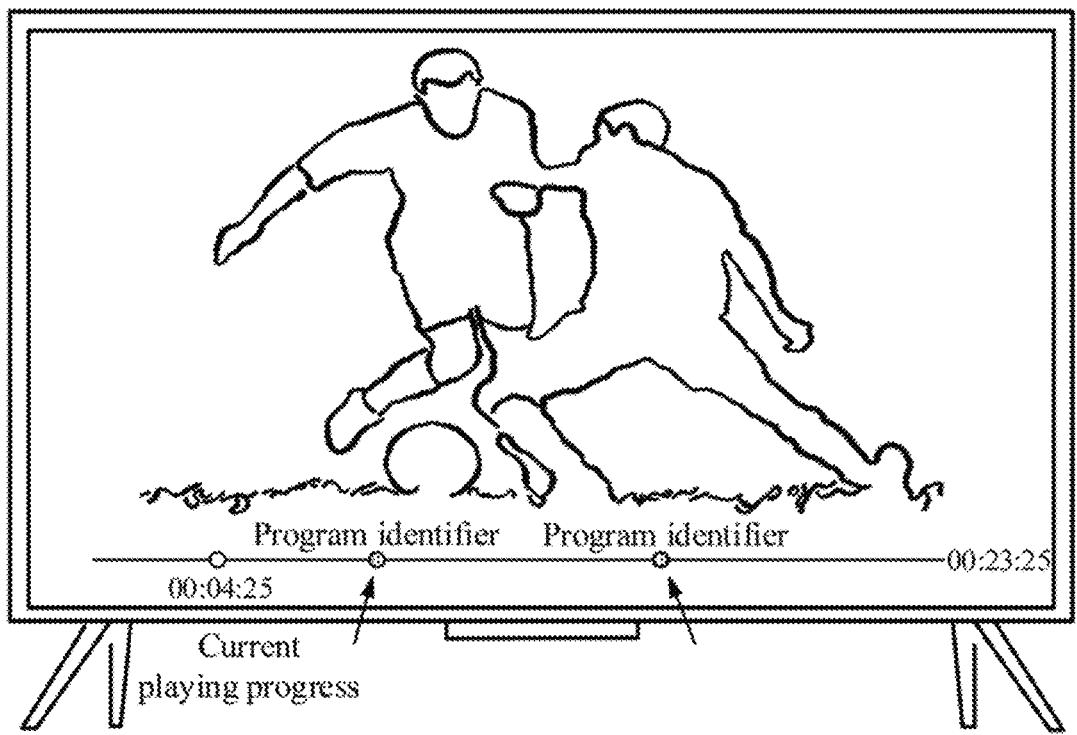
FIG. 20 is a schematic effect diagram of marking a program identifier on a progress bar of a recorded file by a display apparatus according to some embodiments of the disclosure.

FIG. 20 is a schematic effect diagram of marking a program identifier on a progress bar of a recorded file on a display apparatus according to some embodiments of the disclosure. As shown in FIG. 20, a first dot identifier denotes a current playing progress of the recorded file, and two subsequent dot identifiers denote the duration progress relative to the recorded file determined according to the playing start time information of each program, the duration information of each program and the total duration information. Illustratively, with the first program identifier as an example, when the progress bar reaches the first program identifier, it means that playing of a previous program is completed and a next program is about to be played. The duration between two program identifiers denotes the playing duration of the program. That is to say, the display apparatus may draw program identifiers for distinguishing different programs at corresponding time points on the progress bar. In this way, when the user watches the overall recorded file, the number of programs in the recorded file, the approximate playing duration of each program, and a playing progress of a current program may be clearly identified based on the progress bar.

In some embodiments, when the user wants to play other programs, the user may quickly distinguish different programs according to positions of the program identifiers, and just skip to a next program according to the program identifier without frequent fast-forwarding or fast-rewinding.

It should be noted that there is another way to generate the program identifier, that is, to generate the program identifier when recording of the recorded file is completed. During specific implementation, the generation mode of the recorded file has already been described in step S1. In some embodiments, the playing start time and the playing end time of each program and the total duration of the recorded file may be generated when recording of the recorded file is completed, and then the program identifiers may be identified and generated according to the playing start time, the playing end time and the total duration of the recorded file. Thus, the program identifiers may also be generated when recording of the recorded file is completed. In order to make it easier for the user to locate the target program, in some embodiments, the display apparatus may also obtain an identifier position of the program identifier on the progress bar, synchronously associate the program name with the identifier position, and display the program name at the identifier position in response to reaching to a time point for switching to another program in the recorded file.

Figure 21:
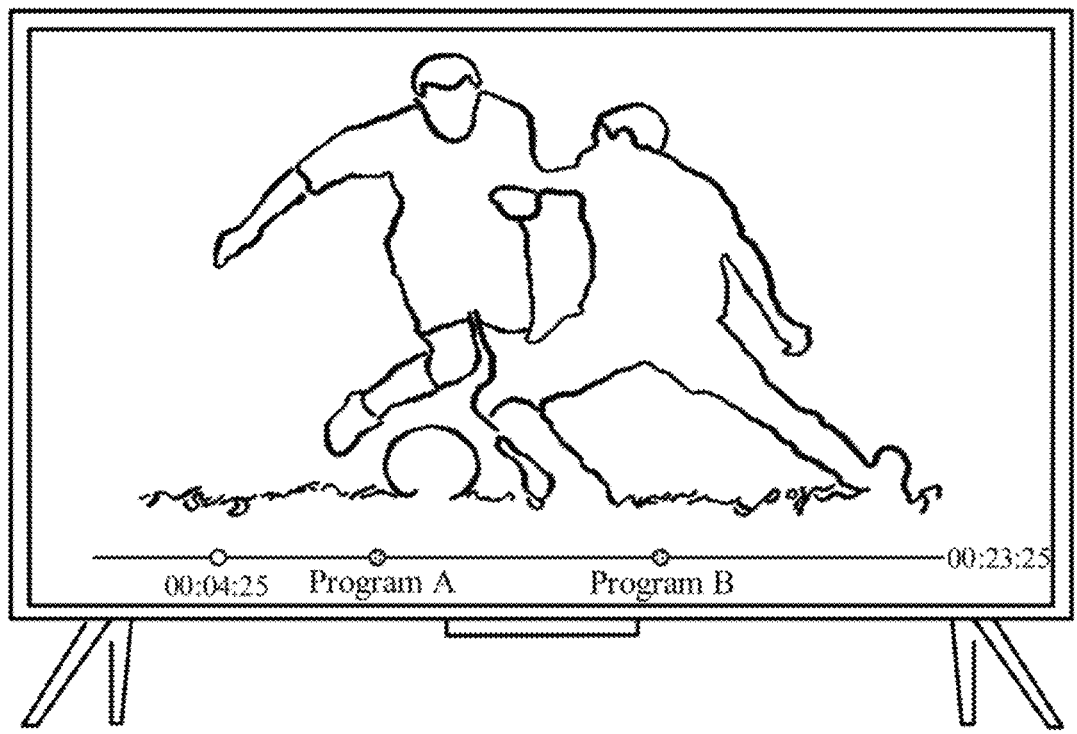
FIG. 21 is a schematic effect diagram of marking a program name by a display apparatus according to some embodiments of the disclosure.

Illustratively, FIG. 21 is a schematic effect diagram of marking a program name on a display apparatus according to some embodiments of the disclosure. In some embodiments, as shown in FIG. 21, the display apparatus may display playing time of the program synchronously on the playing progress bar. When the recorded file is played to the position of the time point for switching to another program, that is, the position of the program identifier, a name of a program to be played next may be displayed on the progress bar. In FIG. 21, a program name marked on the first program identifier position is a program A, and a program name marked on the second program identifier position is a program B. When the recorded file is played to the program identifier position, a corresponding program name may be displayed. In this way, the user can clearly perceive switching of playing programs and know the name of the program to be played next. In addition, when the user wants to view a target program, the user can move a mouse to the program identifier position, and the program name can be displayed on the progress bar. In this case, the user can determine whether to continue playing or skip to other programs according to the program name.

In order to present a display effect of the target program more intuitively, in some embodiments, the display apparatus may also generate an image thumbnail according to the program information, synchronously associate the image thumbnail with the identifier position, and display the image thumbnail at the identifier position in response to reaching to a time point for switching to another program in the recorded file.

For example, the display apparatus may generate the image thumbnail according to program information such as the program name, a program content, a key frame of the program and a program category, and then associate the image thumbnail with the identifier position. When the recorded file is played to the program switch position, that is, the program identifier position, the image thumbnail can be displayed at the program identifier synchronously. In this way, the user can intuitively get the program content to be played through the image thumbnail and determine whether the program is favorite, without the need to quickly browse the program content by dragging the progress bar. Thus, a display effect and user experience can be improved. The following step S5 may be executed after step S4.

S5: The display apparatus identifies the number of programs included in the recorded file, a playing progress of the target program, and playing start time and playing end time of the target program according to the program identifiers, and locates the target program according to the playing start time.

By combining FIG. 20 with FIG. 21, after marking the program identifiers on the progress bar of the recorded file according to the duration progress, the display apparatus may identify the number of programs included in the recorded file and the playing progress of the target program according to the program identifiers. For example, it can be seen from FIG. 20 that three programs are included in a current recorded file in total. A playing progress of a first program is about a half. Since the display apparatus synchronously displays the playing time of the program on the playing progress bar, the playing start time and the playing end time of the target program can be further obtained in the process of playing the recorded file, and the target program can be directly located according to the playing start time. In this way, when the user wants to play other programs, the user can quickly locate the target program according to the program identifiers and program names, without the need to frequently drag the progress bar. Thus, the problem that the target program in the recorded file cannot be accurately located is solved.

In order to make it easier for the user to view programs in the recorded file, in some embodiments, the display apparatus may further traverse the program names, generate a program list according to the program names, and display a program list display page in response to a view command for viewing the programs. The program list display page is configured to display the program list. In response to a selection command for the target program in the program list, the playing start time of the target program is obtained, and the progress bar is controlled to skip to the playing start time, to play the target program.

In order to make it easier for the user to clearly view the number of programs in the recorded file and program names, the display apparatus may further generate a program list according to all programs. In this way, when the user intends to view other programs, the user can call out the program list page by clicking the program list key. A setting position and a setting mode of the program list key may be set according to actual demand. For example, the program list key may be set on a side of a current screen in the form of a link, or may be suspended at a corner position, which is not limited in the disclosure.

Figure 22:
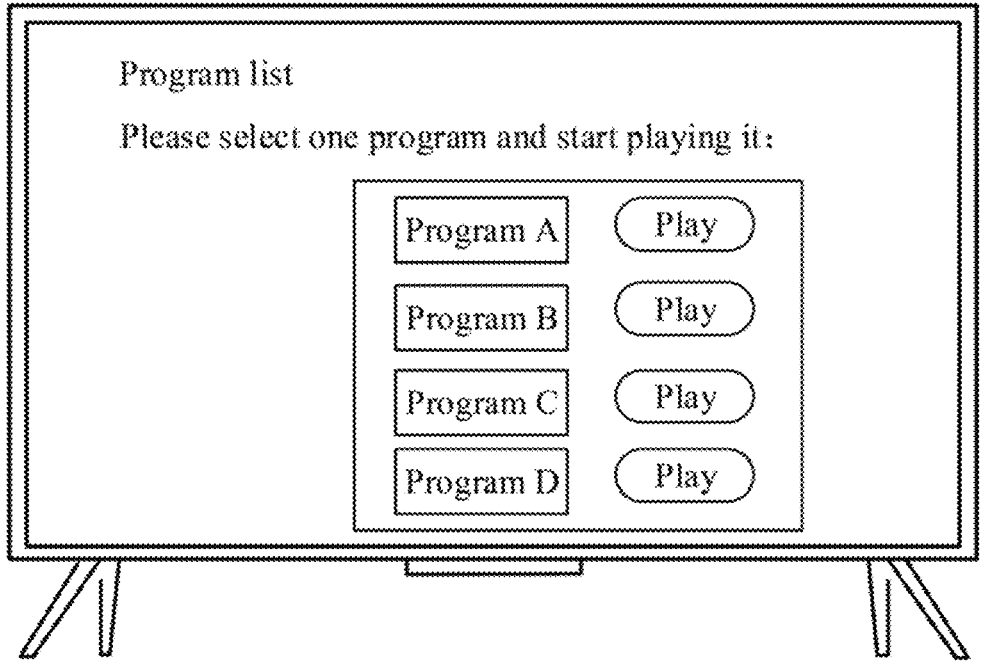
FIG. 22 is a schematic effect diagram of a program list display page according to some embodiments of the disclosure.

FIG. 22 is a schematic effect diagram of a program list display page according to some embodiments of the disclosure. In some embodiments, as shown in FIG. 22, the program list display page may be displayed by selecting the program list key, and all programs included in the recorded file may be browsed in the program list display page. When the user is interested in a program, the user may directly select this program. In addition, the display apparatus sets play keys in the program list display page. When the user selects a target program and starts a playing function, the display apparatus may obtain the playing start time of the target program and control the progress bar to skip directly to the playing start time, to play the target program. In this way, the user can more intuitively get the program information included in the recorded file, and can quickly locate the target program that the user wants to play.

In order to make it easier for the user to locate according to the playing start time of the target program, in some embodiments, the display apparatus may traverse the program list to identify all the programs included in the program list, then obtain playing start time and identifier positions of all the programs, and synchronously associate the playing start time with identifier positions. In this way, the playing start time of each program can be displayed at a position of the program identifier, that is, a position of the time point when the program is switched. The user can intuitively get playing start time points of the programs based on the playing start time displayed, and can skip to the target program based on the playing start time.

In some cases, the user may want to have a target program loop playback. In some embodiments, the display apparatus may obtain the target program selected by the user from the program list, then obtain the playing start time and the playing end time of the target program, and loop the target program based on the playing start time and the playing end time in response to a looping command for the target program.

Figure 23:
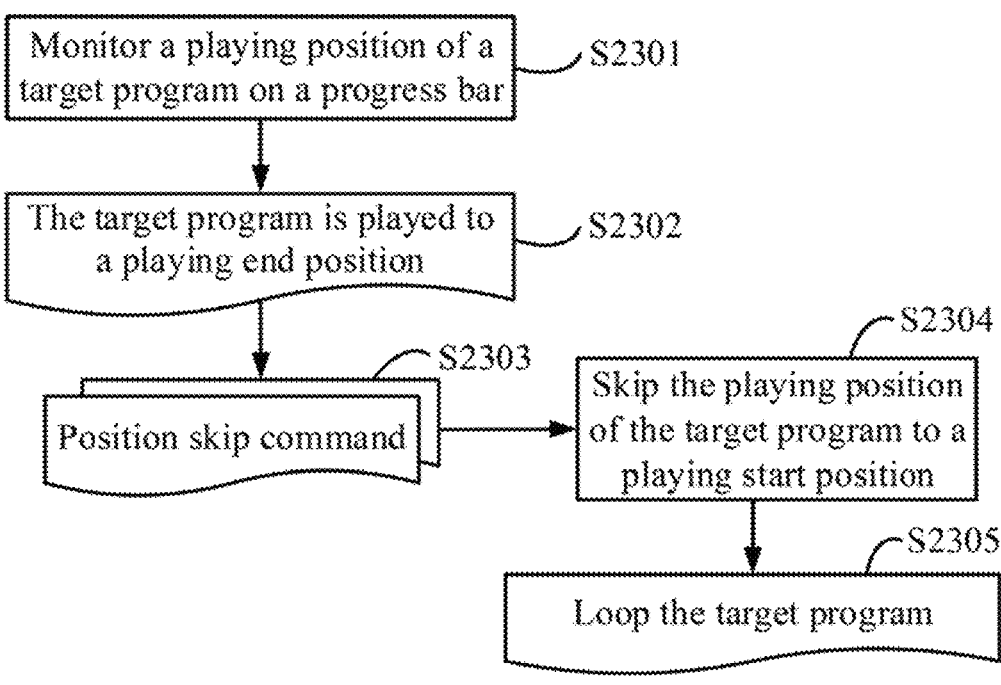
FIG. 23 is a schematic flowchart of looping a target program by a display apparatus according to some embodiments of the disclosure.

In order to realize looping the target program, the display apparatus may perform the following flow. FIG. 23 is a schematic flowchart of looping a target program on a display apparatus according to some embodiments of the disclosure. In some embodiments, as shown in FIG. 23, in order to loop the target program based on the playing start time and the playing end time, the display apparatus can perform steps S2301-S2305. S2301, a playing position of the target program on the progress bar is monitored, where the playing position may include a playing start position at the playing start time and a playing end position at the playing end time of the target program. S2302, based on that the target program is played to the playing end position, the flow goes to S2303. S2303, a position skip command is generated. S2304, in response to the position skip command, the display apparatus skips the playing position of the target program to the playing start position. S2305, the target program is looped.

After the user selects the target program to be looped, the display apparatus may obtain the playing start time and the playing end time of the target program. After playing is performed for the first time, a next program is to be played continuously according to a sequential playing flow, and however, the display apparatus continues playing the target program without skipping to the next program after receiving the looping command in a looping process. In this way, when the target program is looped, the user does not need to manually trigger the looping function, or frequently drag the progress bar for locating the playing start position and the playing end position of the target program. When playing of the target program is completed, the progress bar may automatically skip to the playing start position, thus looping the target program.

When numerous recorded files are stored in the memory device, it is a cumbersome operation for the user to search for a program. Thus, in order to make the user search for the program conveniently, in some embodiments, the display apparatus may further identify data categories of the recorded files by traversing the recorded files; obtain the category number of the data categories, and create category items based on the category number and the data categories; and finally divide programs in the recorded files into the category items according to the data categories, and display the programs in the recorded files according to different categories.

Figure 24:
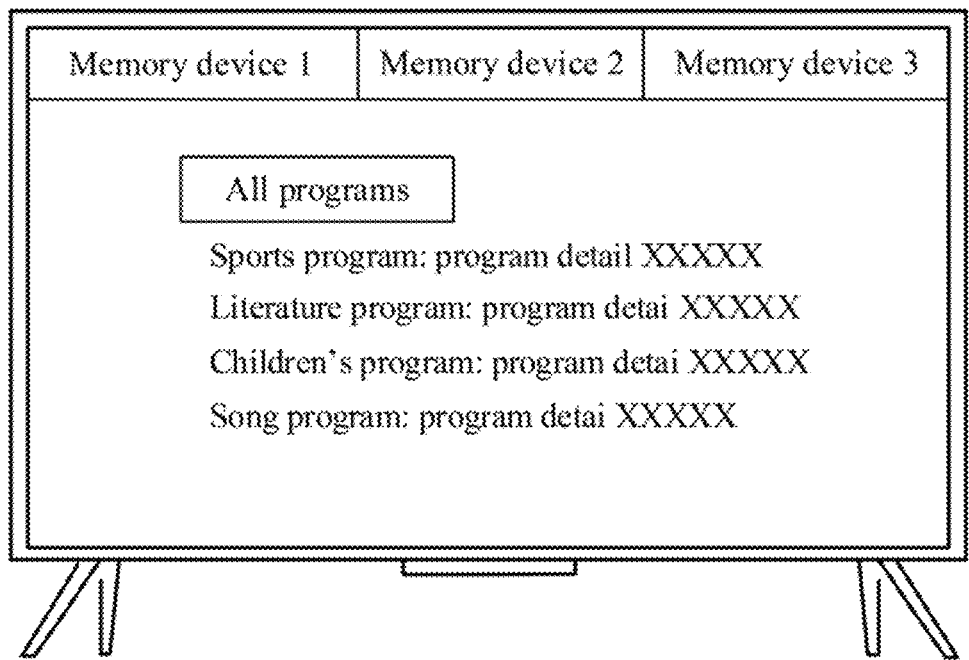
FIG. 24 is a schematic effect diagram of dividing programs by a display apparatus based on categories according to some embodiments of the disclosure.

FIG. 24 is a schematic effect diagram of dividing programs in a display apparatus based on categories according to some embodiments of the disclosure. As shown in FIG. 24, there are three memory devices, and each memory device stores recorded files. When there are a large number of recorded files and each recorded file includes numerous programs, the number of programs will be large, and it is difficult for the user to search for the target program. Thus, in this case, the display apparatus may also perform a filtering and screening function on the recorded files, for example, the programs in the recorded files may be classified according to categories. Thus, when the user searches for a program of a category, the user can search based on a corresponding category, thus improving searching efficiency.

It can be seen from the embodiments described above that the display apparatus according to the embodiments described above obtains the recorded file in response to the playing command for playing the recorded file; obtains the program information of the recorded file by parsing the recorded file; determines the duration progress of each program relative to the recorded file according to the playing start time information, the program duration information and the total duration information; marks the program identifiers on the progress bar of the recorded file according to the duration progress; then identifies the number of programs included by the recorded file, the playing progress of the target program, and the playing start time and the playing end time of the target program according to the program identifiers; and then locates the target program according to the playing start time. The display apparatus may parse and display program information such as playing start time, playing end time and program names of all programs included in the recorded file in the process of playing the recorded file, and identify the program information on the progress bar. In this way, the user can directly skip to the target program to watch the same based on the program information, and can accurately locate the target program without the need to frequently drag the progress bar. Thus, the operation by the user is simplified, and the problem that the target program in the recorded file cannot be accurately located is then solved.

With reference to FIG. 14, a method for controlling playing of a recorded file according to some embodiments of the disclosure may include the following steps S1-S5.

S1: In response to a playing command for playing the recorded file, the display apparatus obtains a recorded file.

In some embodiments, the recorded file is a file generated by recording a media resource played on the display apparatus. When re-watching a live media resource by playing the recorded file, the user may watch a recorded file that is stored in the memory device or record a new clip of recorded file through a recording device.

In some embodiments, in the process of recording the media resource, different recording modes may be selected according to the demand of the user. For example, recording may be started at the beginning of the program and stopped at the end of the program. The display apparatus may also provide the user with the custom recording time. The display apparatus may be provided with a time selection interface for recording the recorded file. The user may manually set the recording start time and the recording end time through this interface. After the setting is completed, the display apparatus may execute a recording flow according to the set time. For example, when playing the live media resource through the display apparatus, the user may open a menu through a remote control, and then select the recording function in the menu, record the media resource and generate a recorded file in this way. Similarly, the users may also search for the program that they want to record in the display apparatus. After searching is completed, the program detail page may be entered by clicking the program. Similarly, a recording function key may be set in the detail page, and then the program may be recorded by selecting the recording function key. It can be understood that there are other ways to start the recording function of the media resource, which may be selected according to demands in an actual use scenario, and is not limited in the disclosure.

S2: The display apparatus obtains program information of the recorded file by parsing the recorded file.

In order to know the program information included in the recorded file, in some embodiments, the display apparatus may parse the recorded file after obtaining the recorded file. Illustratively, when the user plays one recorded file, the display apparatus may synchronously parse the recorded file, to obtain all program information in the recorded file. The program information may at least include playing start time information and program duration information of the programs, and total duration information of the recorded file, and may also include other related information. For example, the program information may also include a program name, program details, an age rating for the program, etc. The following step S3 may be executed after step S2.

S3: The display apparatus determines a duration progress of the program relative to the recorded file according to the playing start time information, the program duration information and the total duration information.

In order to make it easier for the user to identify programs included in the recorded file through the progress bar, in some embodiments, the display apparatus may determine the duration progress of the program relative to the recorded file according to the playing start time information and the total duration information after obtaining the program information of the recorded file. Illustratively, the total duration of the recorded file is 60 minutes, the playing start time of a program is the 20th minute, and playing duration information of the program is 20 minutes. Then, a duration progress of the program relative to the recorded file is one third of the total duration, and playing of the program is started from the 20th minute. In this way, a playing start time point of each program, a playing duration of each program, and a duration progress of the playing duration of each program relative to the total duration can be obtained. The following step S4 may be executed after step S3.

S4: The display apparatus places program identifiers on a progress bar of the recorded file according to the duration progress.

In order to add the program identifier to the program on the progress bar and make it easier for the user to intuitively obtain a position of the program, in some embodiments, the display apparatus may also place the program identifier on the progress bar of the recorded file according to the duration progress after determining the duration progress of each program relative to the recorded file.

In order to make it easier for the user to locate the target program, in some embodiments, the display apparatus may also obtain an identifier position of the program identifier on the progress bar, synchronously associate the program name with the identifier position, and display the program name at the identifier position in response to reaching to a time point for switching to another program in the recorded file.

In some embodiments, the display apparatus may display playing time of the program synchronously on the playing progress bar. When the recorded file is played to the position of the time point when the program is switched, that is, the position of the program identifier, a name of a program to be played next may be displayed on the progress bar. For example, in FIG. 21, a program name marked on the first program identifier position is a program A, and a program name marked on the second program identifier position is a program B. When the recorded file is played to the program identifier position, a corresponding program name may be displayed. In this way, the user can clearly perceive switching of playing programs and know the name of the program to be played next. In addition, when the user wants to view a target program, the user can move a mouse to the program identifier position, and the program name can be displayed on the progress bar. In this case, the user can determine whether to continue playing or skip to other programs according to the program name. The following step S5 may be executed after step S4.

S5: The display apparatus identifies the number of programs included in the recorded file, a playing progress of the target program, and the playing start time and the playing end time of the target program according to the program identifiers, and locates the target program according to the playing start time.

By combining FIG. 20 with FIG. 21, after marking the program identifiers on the progress bar of the recorded file according to the duration progress, the display apparatus may identify the number of programs included in the recorded file and the playing progress of the target program according to the program identifiers. For example, it can be seen from FIG. 20 that three programs are included in a current recorded file in total. A playing progress of a first program is about a half. Since the display apparatus synchronously displays the playing time of the program on the playing progress bar, the playing start time and the playing end time of the target program can be further obtained in the process of playing the recorded file, and the target program can be directly located according to the playing start time. In this way, when the user wants to play other programs, the user can quickly locate the target program according to the program identifiers and program names, without the need to frequently drag the progress bar. Thus, the problem that the target program in the recorded file cannot be accurately located is solved.

In order to make it easier for the user to view programs in the recorded file, in some embodiments, the display apparatus may further traverse the program names, generate a program list according to the program names, and display a program list display page in response to a view command for viewing the program. The program list display page is configured to display the program list. In response to a selection command for the target program in the program list, the playing start time of the target program is obtained, and the progress bar is controlled to skip to the playing start time, to play the target program.

In order to make it easier for the user to locate according to the playing start time of the target program, in some embodiments, the display apparatus may traverse the program list to identify all the programs included in the program list, then obtain playing start time and identifier positions of all the programs, and synchronously associate the playing start time with identifier positions. In this way, the playing start time of each program can be displayed at a position of the program identifier, that is, a position of the time point when the program is switched. The user can intuitively get playing start time points of the programs based on the playing start time displayed, and can skip to the target program based on the playing start time.

It can be seen from the embodiments described above that according to the method for controlling playing of a recorded file according to the embodiments, program information such as playing start time, playing end time and program names of all programs included in the recorded file may be parsed and displayed in the process of playing the recorded file, and the program information is identified on the progress bar. In this way, the user can directly skip to the target program to watch the same based on the program information, and can accurately locate the target program without the need to frequently drag the progress bar. Thus, the operation by the user is simplified, and the problem that the target program in the recorded file cannot be accurately located is then solved.

Figure 25:
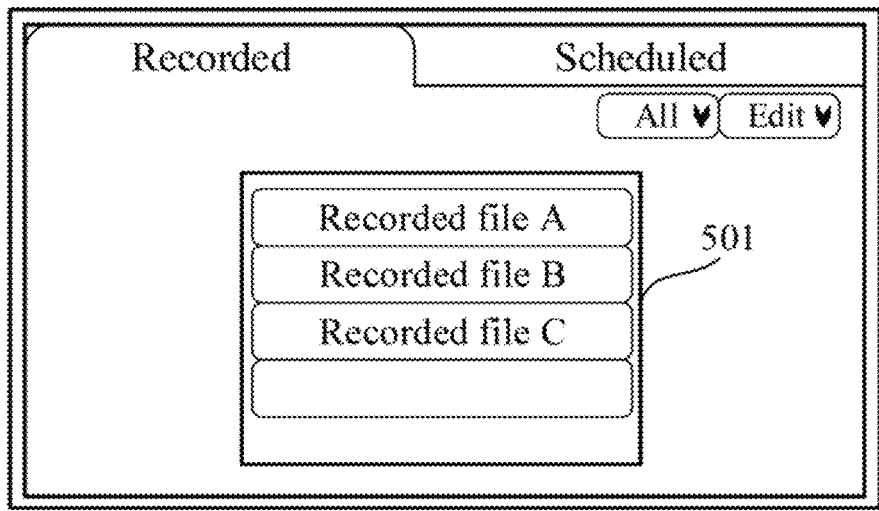
FIG. 25 shows a second recording management page according to some embodiments of the disclosure.

The display apparatus may be configured with a recording function, and a corresponding recorded file may be obtained by recording a program played. The display apparatus may be configured with a normal playback mode. In the normal playback mode, the user may watch the program repeatedly by playing back the recorded file at any time after the program is played. All recorded files that are recorded may be displayed in a recording list. Based on this recording list, the user can select the recorded file to be played back. For example, recorded files that are recorded may include a recorded file A, a recorded file B and a recorded file C. In a normal playback mode, the display apparatus may display a second recording management page as shown in FIG. 25 in response to a command from the user. A recording list 501 is displayed in the second recording management page, and the recording list 501 may include options of the recorded file A, the recorded file B and the recorded file C.

When the user wants to re-watch the recorded file A and the recorded file C in the normal playback mode, the user may play back the recorded file by three methods as follows.

In a first method, the user may first select the recorded file A to be played from the recording list 501. After playing of the recorded file A is completed, the display apparatus may re-display the second recording management page, and the user may select the recorded file B to be played from the recording list 501.

In a second method, the user may first select the recorded file A to be played from the recording list 501. Before playing of the recorded file A is completed, the user may control the display apparatus to display a play control menu. The play control menu may include a progress bar of the recorded file A, a key of a previous recorded file (Previous Chapter) and a key of a next recorded file (Next Chapter). The user may select the recorded file C through the key of a previous recorded file or the key of a next recorded file, and instruct the display apparatus to start to play the recorded file C.

In a third method, the user may first select the recorded file A to be played from the recording list 501. Before playing of the recorded file A is completed, the user may control the display apparatus to display a playlist menu. The playlist menu may include all recorded files that have been recorded, and is consistent with the recording list in content.

The user needs to find the recorded file C from the playlist menu and instructs the display apparatus to start to play the recorded file C.

It can be seen that in the normal playback mode, based on that the user wants to re-watch a plurality of recorded files, the user needs to select a next recorded file to be played back from all the recorded files during a playback process of the recorded file. In the playback process described above, the user needs to interact with the display apparatus repeatedly, and operations are cumbersome. In addition, a process of searching for the recorded file to be played back from all the recorded files is difficult and time-consuming, resulting in the poor user experience.

In order to solve the problem of playback of the recorded file in the normal playback mode, the display apparatus of the disclosure may be the display apparatus shown in FIG. 1, FIG. 3 or FIG. 4, or other display apparatuses, and the embodiments of the disclosure are described with the display apparatus shown in FIG. 1, FIG. 3 or FIG. 4 as an example. The display apparatus according to some embodiments of the disclosure is configured with a personal video recorder (PVR) function.

In order to solve the problem of the normal playback mode, the display apparatus of the embodiments of the disclosure may be configured with two playback modes, that is, the normal playback mode (referred to as a second playback mode for distinguishing) and an advanced playback mode (referred to as a first playback mode for distinguishing). In the advanced playback mode, the display apparatus may be user-defined to create a playlist of recorded files, and automatically and continuously play a plurality of recorded files in the same playlist.

Figure 27:
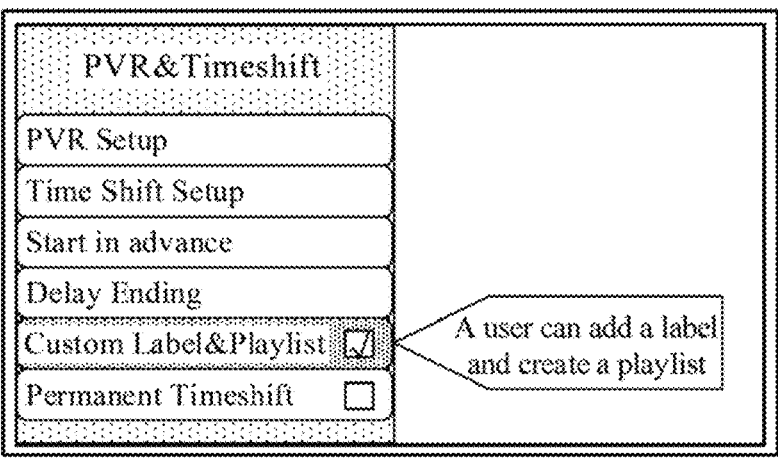
FIG. 27 is a schematic effect diagram of a PVR&Timeshift menu according to some embodiments of the disclosure.

The display apparatus may be configured to use the second playback mode as a default playback mode, that is, the second playback mode is preferentially used to play back the program. The user may enter a page for setting the first playback mode through an advanced setting menu. Illustratively, the advanced setting menu may include a television (TV) name, PVR&Timeshift, a power indicator, a screensaver, input Labels, custom PVR&Playback, fast power on, and power on mode. A PVR&Timeshift menu corresponding to PVR&Timeshift options may be configured as a menu for setting the first playback mode. With the PVR&Timeshift menu shown in FIG. 27 as an example, the PVR&Timeshift menu may include a Custom Label&Playlist switch. In a case that the Custom Label&Playlist switch is on, the display apparatus is in the first playback mode. In a case that the Custom Label&Playlist switch is off, the display apparatus is in the second playback mode. As shown in FIG. 27, when a focus (shown in gray base color) is on the Custom Label&Playlist option, a prompt may also be displayed to remind the user of a function of the option, for example, "a user may add a label and create a playlist". The user may input a selected command based on the Custom Label&Playlist option. The display apparatus adjusts the Custom Label&Playlist switch to an on state in response to the selected command. When the Custom Label&Playlist switch is in the on state, the "V" mark may be displayed on the Custom Label&Playlist switch as shown in FIG. 27. The PVR&Timeshift menu may also include PVR setup, time shift setup, start in advance, delay ending and permanent timeshift.

Figure 28:
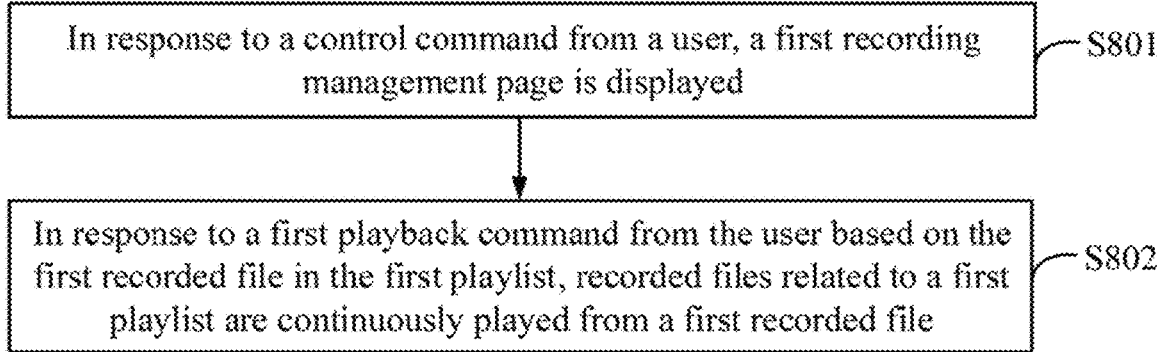
FIG. 28 is a flowchart of playing back a recorded file by a display apparatus according to some embodiments of the disclosure.

When the display apparatus is in the first playback mode, the display apparatus may play back the recorded file according to the flow shown in FIG. 28. The flow may include the following.

S801, in response to a command from a user, a first recording management page is displayed.

The first recording management page may include a playlist display area and a recorded file display area.

The playlist display area is configured to display options of the playlists. The playlist is a user-defined list, and the playlist is related to at least one recorded file. The at least one recorded file is derived from a recorded file that is recorded. The at least one recorded file in the same playlist is configured to be automatically and continuously played.

The recorded file display area is configured to display recorded files related to the playlist selected. In some embodiments, the display apparatus may be configured such that under the condition that the first recording management page is displayed in response to the command, a focus does not land on the playlist, and all recorded files that have been recorded are displayed in the recorded file display area by default. All the recorded files that are recorded are the same as recorded files in the recording list displayed by the display apparatus in the second playback mode. When the user moves the focus onto the option of the playlist, the recorded files related to the playlist are displayed in the recorded file display area.

S802, in response to a first playback command from the user based on the first recorded file in the first playlist, recorded files related to a first playlist are continuously played from a first recorded file.

The first playlist is a target playlist selected by the user from the playlists. The first recorded file is a target recorded file selected by the user from recorded files related to the first playlist. The user inputs the first playback command based on the first recorded file, and the display apparatus continuously plays the recorded files related to the first playlist from the first recorded file in response to the first playback command. For example, the first playlist may include M (M is a positive integer greater than 0) recorded files. Based on that the first recorded file is a $1^{st}$ recorded file among the M recorded files, 1-M recorded files are continuously played from the first recorded file. Based on that the first recorded file is an $i^{th}$ recorded file among the M recorded files, i-M recorded files are continuously played from the $i^{th}$ recorded file.

Example 1

Figure 29:
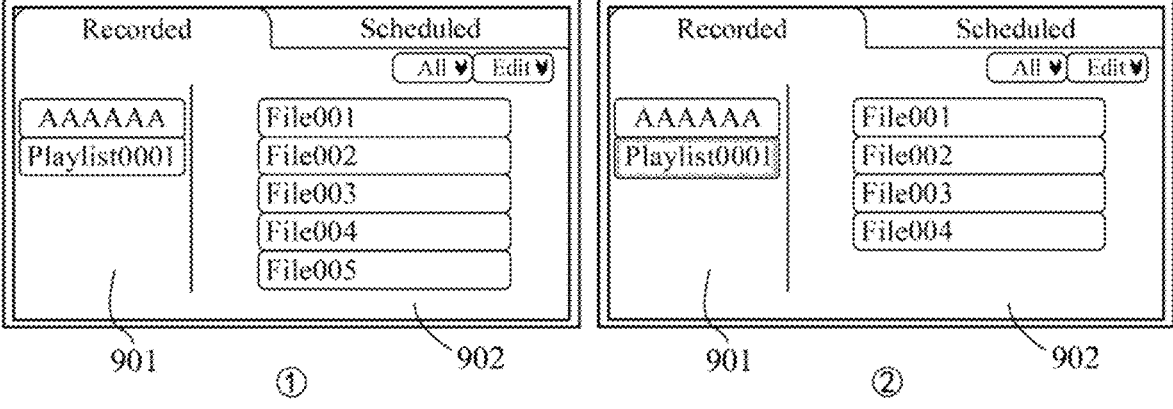
FIG. 29 is a flowchart of displaying a first recording management page on a television according to some embodiments of the disclosure.

With reference to FIG. 29, a process of displaying a first recording management page on a television is described by an example that the display apparatus is a television, a control device 100 is a remote control, and playlists that are created by a user may include AAAAAA and a Playlist0001.

In response to a command from the user, the television displays the first recording management page as shown in FIG. 29. The first recording management page may include a playlist display area 901 and a recorded file display area 902. Options of AAAAAA and the Playlist0001 are displayed in the playlist display area 901. When the display apparatus displays the first recording management page in response to the command, as shown in ① in FIG. 29, all recorded files that have been recorded, such as a File001, a File002, a File003, a File004 and a File005, are first displayed in the recorded file display area 902. For example, the user moves a focus (shown in gray base color) to the Playlist0001, and recorded files related to the Playlist0001 may include: a File001, a File002, a File003 and a File004 as shown in ② in FIG. 29. The television displays the File001, the File002, the File003 and the File004 in the recorded file display area 902. As shown in ② in FIG. 29, based on that the user inputs a first playback command based on the File002 in the Playlist0001, the display apparatus continuously plays the File002, the File003 and the File004.

Thus, the user can manage, through the playlist, a plurality of recorded files that need to be played continuously; and the plurality of recorded files in the playlist can be played continuously by inputting a command once based on the playlist. Thus, operations by the user can be effectively simplified, and playback experience of the user can be improved.

In the first playback mode, the display apparatus is configured with a function of creation by the user of the playlist of recorded files.

In some embodiments, the display apparatus may be configured with a playlist addition option on the first recording management page. The display apparatus creates a new playlist in response to an addition command from the user based on the playlist addition option. The user may add a recorded file to the new playlist from all recorded files that have been recorded displayed in the recorded file display area. For example, the user may add the recorded file into the new playlist in a dragging mode. For another example, the display apparatus may display a list of recorded files in response to the addition command, and recorded files in this list are recorded files that may be added to the new playlist. The user selects the recorded file to be added to the new playlist from the recorded files in the list.

In some embodiments, in order to simplify operations by the user, the display apparatus may be configured with a label addition function. The display apparatus may add a recording label to the recorded file and add a list label to the playlist, and quickly create the playlist based on the recording label and the list label.

The display apparatus may create the playlist according to a flow shown in FIG. 30. The flow may include the following.

S1001, in a recording state or a playback state, in response to a first addition command from a user, a recording label is added to a recorded file being currently recorded or a recorded file being currently played back.

In some embodiments, in the recording state, the display apparatus may add the recording label to the recorded file being currently recorded in response to the first addition command from the user.

In the recording state, the user may set the recording label for the recorded file to be recorded on a schedule recording page. The schedule recording page is configured to set recording parameters, such as a recording mode, a repeat mode and a recording label (Label). The user may input the first addition command based on an option of the recording label in the schedule recording page, to add the recording label to the recorded file being currently recorded.

In response to the first addition command, the display apparatus displays available recording labels. The available recording labels may include historical recording labels that have been set by the user, labels obtained from an event information table (EIT), etc. The available recording labels may specifically include a news label, a sports label, a movie label, a music label, and some user-defined recording labels. The user may input a selection command based on at least one available recording label, and the display apparatus adds the at least one available recording label selected to the recorded file being currently recorded in response to the selection command.

The display apparatus may further display a custom page of the recording label. Based on the custom page, the user may input a name of a custom recording label, to create a new recording label. The display apparatus adds the new recording label to the recorded file being currently recorded. The user may customize the name of the new recording label, or use default names provided by the display apparatus, such as a Label1 and a Label2. A serial number in the default names may be incremented.

The display apparatus may compare the new recording label with the available recording label. Based on that the two labels are consistent, the new recording label may be regarded as the available recording label by default. Base on that the two labels are inconsistent, the new recording label is stored, to expand the available recording label.

After recording is started, the display apparatus automatically saves the recording label set into the recorded file.

In some embodiments, in the playback state, the display apparatus adds the recording label to the recorded file being currently played back in response to the first addition command from the user.

In the playback state, the user may set the recording label to the recorded file being currently played back through a playback menu. The playback menu may include various playback parameters for playback of the recorded file, such as a subtitle, a recording label (Label), a zoom mode, audio only, a repeat mode, a playback start position, information, a playlist and setting. The user may input the first addition command based on the recording label option in the playback menu, to add the recording label to the recorded file being currently played back.

In response to the first addition command, the display apparatus displays a label addition entry. For example, the display apparatus displays the label addition entry on a label setting page. Reference can be made to a process of the user-defined recording label in the recording mode for a process of inputting, by the user, the label to be added based on the label addition entry, which is not repeated herein.

In some embodiments, the display apparatus displays all labels that have been already added to the recorded file being currently played back on the label setting page. The display apparatus may set a deletion button on the label setting page. The user may input a selection command based on at least one of all labels that have been already added to a current recorded file, and input a deletion command based on the deletion button. In response to the deletion command, the display apparatus identifies the at least one label selected and deletes the at least one label from the recorded file.

Example 2

Figure 32:
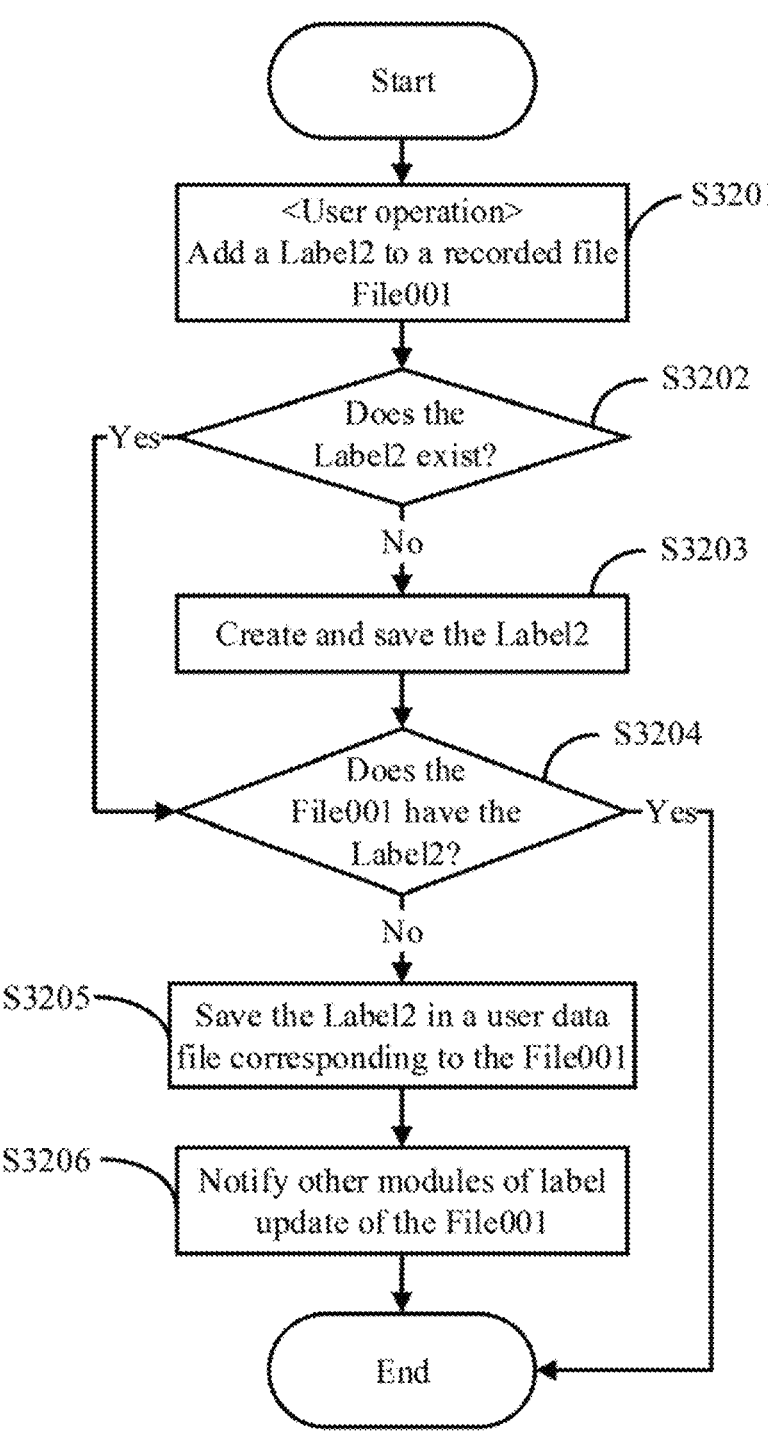
FIG. 32 shows a flow of saving a Label2 in a recorded file File001 of a television according to some embodiments of the disclosure.

With reference to FIGS. 31 and 32, a process of adding a recording label to a recorded file of a display apparatus in a recording mode is described by an example of the display apparatus being a television, a control device 100 being a remote control, and adding the recording label to a recorded file File001.

In the recording mode, the television displays a schedule recording page as shown in ① in FIG. 31. Based on this schedule recording page, the user sets recording parameters for the recorded file File001 being currently recorded. The user may control a focus to move on recording parameter options (such as a recording mode, a repeat mode and a label) through direction keys on the remote control. As shown in ① in FIG. 31, when the focus (shown in gray base color) moves onto the Label, the user may input a first addition command through an enter key on the remote control. In response to the first addition command, the television displays a label addition page as shown in ② in FIG. 31. The label addition page may include available recording labels such as News, Sports, Movie, Music and Label1. The News, the Sports, the Movie and the Music may be recording labels obtained by the television from the EIT table, and the Label1 may be a custom recording label added to other recorded files by the user. Based on that the user selects the News and the Sports, the television adds recording labels News and Sports to the recorded file File001. Based on that the user wants to customize the recording label for the recorded file File001, the user may input a custom command based on an addition option (Add) in the label addition page, and the television displays a label name page as shown in ③ in FIG. 31 in response to the custom command. The label name page may include a text input box 1101, and the user may input a custom label name based on the text input box 1101. The user may also use a default name provided by the television, such as a Label2 in the text input box 1101 in ③ in FIG. 31. The user may input a saving command based on a save button (Save) in the label name page, and the television automatically saves the Label2 into the recorded file File001 after starting recording in response to the saving command.

The television may save the Label2 into the recorded file File001 according to a flow as shown in FIG. 32. The flow may include the following.

In response to the saving command, the television determines whether the Label2 exists in the Recording list (the Recording list includes all the recorded files, there may be a case where other recorded files are marked as the Label2 but the recorded file File001 is not marked as the Label2, and the Label2 exists in this case). If there is no Label2, the Label2 is added. If the Label2 exists, or after the Label2 is added, whether the Label2 has been added to the recorded file File001 is determined. If the Label2 has been added, the flow ends. If the Label2 is not added, related data of the Label2 is saved in a user data file. The user data file refers to related data of the recorded file File001, and includes original data of the recorded file File001.

Other processing modules of the playlist are notified of a message of adding the recording Label2 to the recorded file File001. Thus, recording label information of the recorded file File001 in the playlist is updated through these modules.

In some embodiments, the flow of saving the Label2 in the recorded file File001 by the television as shown in FIG. 32 can include: S3201, a command for adding the Label2 to the recorded file File001 is received; S3202, whether the Label2 exists is determined, if so, the flow goes to S3204, otherwise, the flow goes to S3203; S3203, the Label2 is created and saved; S3204, whether the Label2 has been added to the File001 is determined, if so, the flow ends, otherwise, the flow goes to S3205; S3205, the Label2 is saved in the user data file corresponding to the File001; and S3206, other modules are notified of label update of the File001.

Example 3

Figure 33:
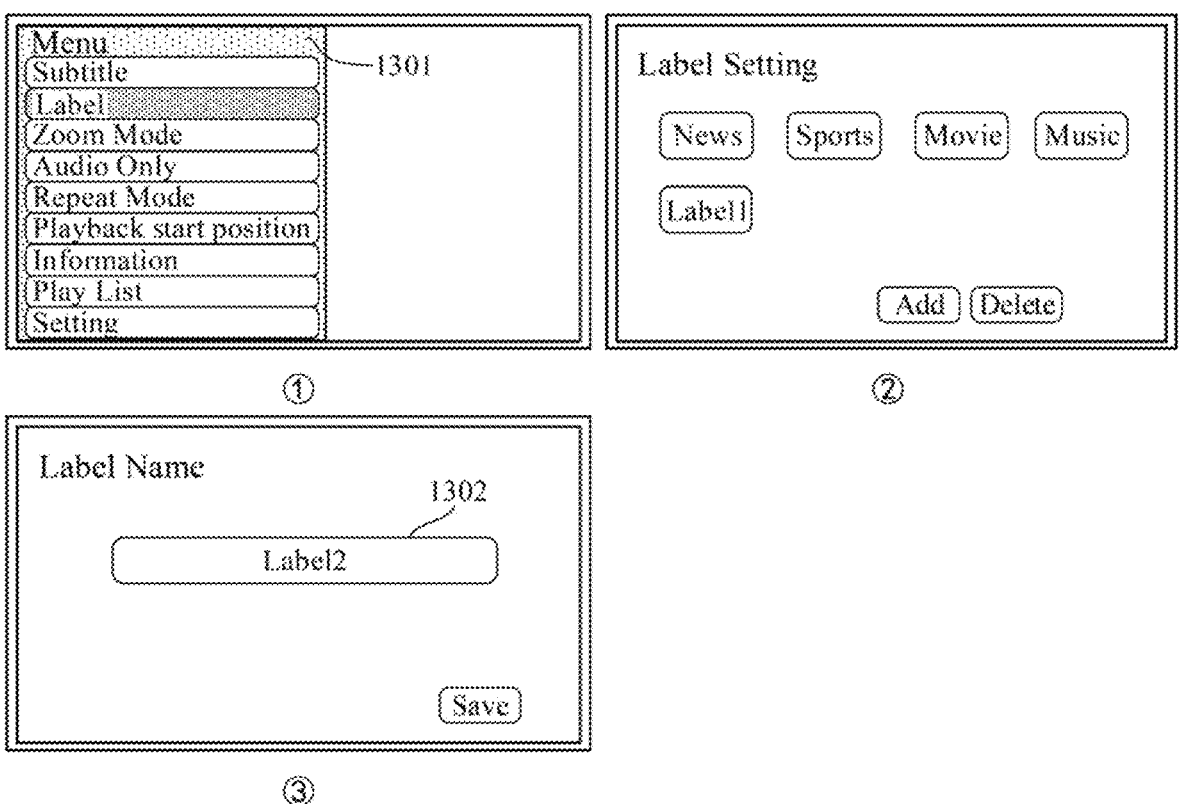
FIG. 33 is a flowchart of adding a recording label to a recorded file by a television according to some embodiments of the disclosure.
Figure 34:
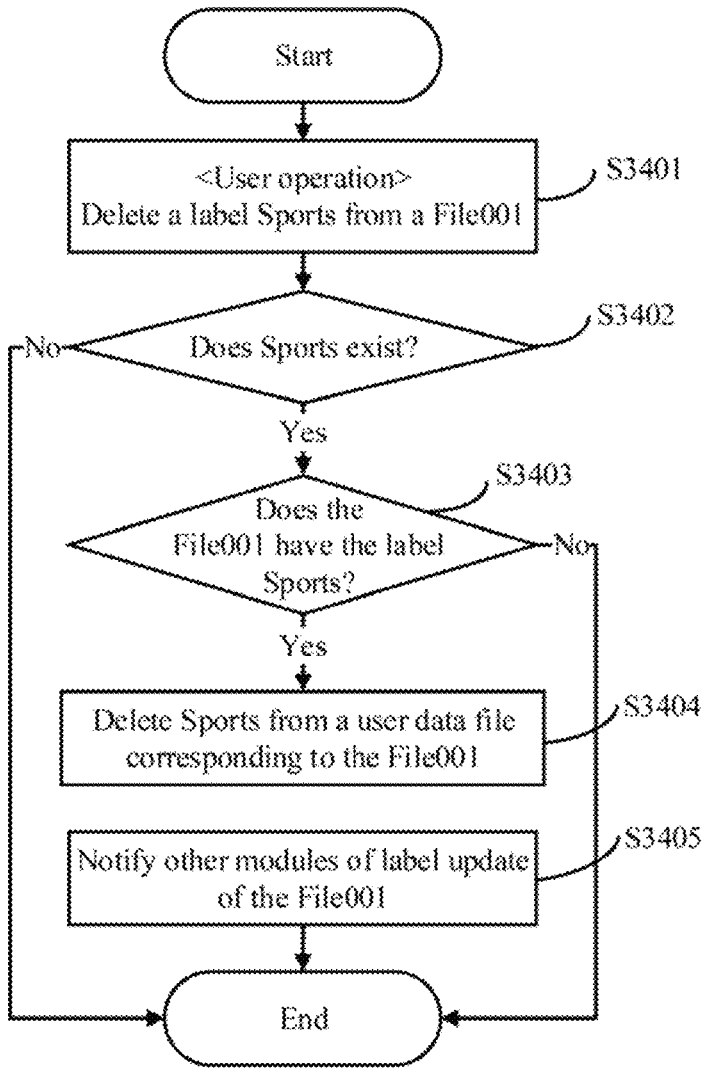
FIG. 34 shows a flow of deleting a recording label Sports from a recorded file File001 by a television according to some embodiments of the disclosure.

With reference to FIGS. 32, 33 and 34, a process of adding a recording label to a recorded file by a display apparatus in a playback mode is described by an example of the display apparatus being a television, a control device 100 being a remote control, and adding the recording label to a recorded file File001.

In the playback mode, the television displays a playback page of the recorded file File001 as shown in ① in FIG. 33, and a user may input a menu command based on a Menu key on the remote control. In response to this menu command, the television displays a playback menu 1301 on the playback page as shown in ① in FIG. 33. The user may control a focus to move onto options of various playback parameters (such as a Subtitle, a Label, a Zoom Mode, Audio Only, a Repeat Mode, a Playback start position, Information, a Play List and Setting) through direction keys on the remote control. As shown in ① in FIG. 33, when the focus (shown in gray base color) moves onto the Label, the user may input a first addition command through an enter key on the remote control. In response to the first addition command, the television displays a Label Setting page as shown in ② in FIG. 33. The Label Setting page may include an Add option. The user may input a custom command based on the Add option in the Label Setting page. In response to the custom command, the television displays a Label Name page as shown in ③ in FIG. 33. The Label Name page may include a text input box 1302, and the user may input a custom label name based on the text input box 1302. Reference can be made to contents related to ③ in FIG. 31 in Example 2 for a process of adding, by the user, the Label2 to the recorded file File001 through the text input box 1302, which will not repeated herein. Reference can be made to FIG. 32 for the flow of saving the Label2 in the recorded file File001 by the television, which will not be repeated herein.

As shown in ② in FIG. 33, the Label Setting page may further include: recording labels added to the recorded file File001, such as the News, the Sports and the Label1, and a Delete option. If the user wants to delete a recording label that has been added, such as the Sports, the user inputs a selection command based on the Sports and a deletion command based on a Delete option. In response to the deletion command, the television identifies that Sports is selected (the recording label selected may have an identifier, and the television may identify the recording label selected based on the identifier), and deletes the recording label Sports from the recorded file File001.

The television may delete the recording label Sports from the recorded file File001 according to a flow as shown in FIG. 34. The flow may include the following.

The television determines whether there is the Sports in the Recording list in response to the deletion command, and if not, the flow ends; if so, whether the Sports has been added to the File001 is determined, and if so, the Sports is deleted from a user data file corresponding to the recorded file File001; and if not, the flow ends.

Other processing modules of the playlist are notified of a message of deleting the recording label Sports from the recorded file File001. Thus, recording label information of the recorded file File001 in the playlist is updated through these modules.

In some embodiments, the flow of deleting the recording label Sports from the recorded file File001 by the television shown in FIG. 34 can include: S3401, a command for deleting the label Sports from the File001 is received; S3402, whether the Sports exists is determined, if the Sports does not exist, the flow ends, and if Sports exists, the flow goes to S3403; S3403, whether the label Sports has been added to the File001 is determined, if yes, the flow goes to S3404, otherwise, the flow ends; S3404, the Sports is deleted from the user data file corresponding to the File001; and S3405, other modules are notified of label update of the File001.

S1002, in response to a second addition command from the user, a second playlist is created, a list label is added to the second playlist and a related recorded file is added into the second playlist.

A creation entry of the playlist may be configured in the first recording management page. When displaying the first recording management page, the display apparatus creates a new playlist, such as a second playlist, in response to a second addition command from the user based on the creation entry of the playlist. A name of the second playlist may be user-defined, or adopt a default name. A serial number in the default name is incremented.

The list label is added to the second playlist by the user. The display apparatus may display available list labels. Reference can be made to recording labels (such as the News, the Sports, the Movie and the Music) and some user-defined list labels for the available list labels. The user selects at least one list label from the available list labels, and the display apparatus adds the at least one list label to the second playlist. The display apparatus may be configured to automatically add the related recorded file to the second playlist according to the list label after identifying that the user adds the list label to the second playlist. The recorded file related to the second playlist may include at least one recording label same as the list label. For example, the recorded file is marked with recording labels of the News and the Sports, and the second playlist created by the user is marked with list labels of the News and Music; and the recorded file is related to the second playlist and added to the second playlist.

Thus, the user can quickly add the related recorded file to the playlist by setting the list labels.

S1003, an option of the second playlist is added into a playlist display area, and based on that the second playlist is selected, the recorded file related to the second playlist is displayed in a recorded file display area.

After the second playlist is created, the display apparatus adds the option of the second playlist into the playlist display area. When the user controls a focus to point to this option, the display apparatus displays the recorded file related to the second playlist in the recorded file display area.

The user can delete any playlist created. When the display apparatus displays the first recording management page, the user may control the focus to move in the playlist display area to the option of the playlist to be deleted, and input the deletion command. In response to the deletion command, the display apparatus deletes the playlist to be deleted, for example, deletes user data corresponding to the playlist to be deleted, and does not display the option of the playlist to be deleted in the playlist display area.

Figure 35:
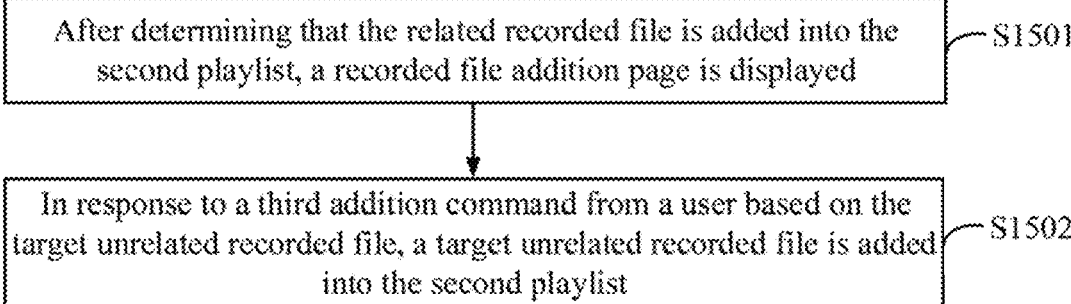
FIG. 35 is a flowchart of adding an unrelated recorded file into a second playlist by a display apparatus according to some embodiments of the disclosure.

The user may also add an unrelated recorded file into the second playlist when the second playlist is created. A recording label of the unrelated recorded file is different from the list label of the second playlist. The display apparatus may add the unrelated recorded file into the second playlist according to a flow shown in FIG. 35. The flow may include the following.

S1501, after determining that the related recorded file is added into the second playlist, a recorded file addition page is displayed.

According to the list label of the second playlist and the recording label of the recorded file, the display apparatus determines the related recorded file to be added to the second playlist, and then displays the recorded file addition page. The recorded file addition page may include the recorded file unrelated to the second playlist. The unrelated recorded file is not currently added to the second playlist and is available for the user to add to the second playlist.

S1502, in response to a third addition command from a user based on the target unrelated recorded file, a target unrelated recorded file is added into the second playlist.

The target unrelated recorded file is an unrelated recorded file added to the second playlist as instructed by the user.

After the display apparatus adds the target unrelated recorded file to the second playlist, the recorded files in the second playlist may include the related recorded file with the same label and this target unrelated recorded file.

Example 4

With reference to FIGS. 36, 37, 38 and 39, processes of creating a playlist and deleting a playlist in a display apparatus are described with the display apparatus being a television and a control device 100 being a remote control as an example.

Figure 36:
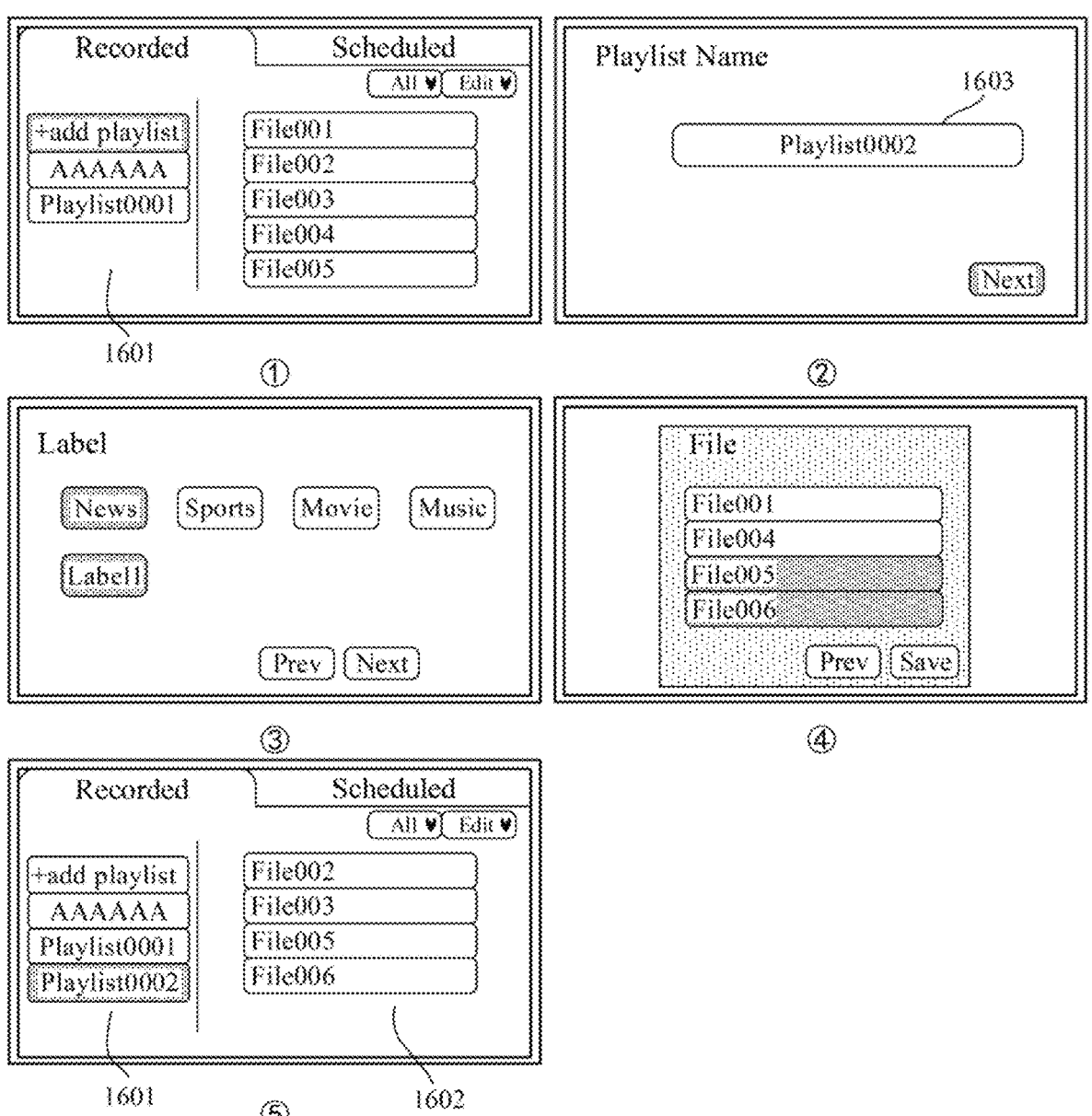
FIG. 36 is a flowchart of creating a playlist by a television according to some embodiments of the disclosure.

The television displays a first recording management page as shown in ① in FIG. 36. A playlist display area 1601 of the first recording management page may include playlists that have been created, such as AAAAAA and a Playlist0001. A creation entry, for example a +add playlist option, of the playlist is also configured in the playlist display area 1601. A user may input a second addition command based on the +add playlist option through the remote control, and the television displays a Playlist Name page as shown in ② in FIG. 36 in response to the second addition command. The Playlist Name page may include a text input box 1602. The television may name the created second playlist a name entered by the user through the text input box 1602. The television may also name the created second playlist a default name. If the user does not input a name when inputting a next command based on a Next option in the Playlist Name page, the television will name the second playlist a default name Playlist0002. The second playlist newly created is the Playlist0002. In response to the next command, the television displays a label addition page as shown in ③ in FIG. 36. The label addition page may include available list labels such as News, Sports, Movie, Music and a Label1. The user may select a list label to be added to the Playlist0002 from these list labels, as shown in ③ in FIG. 36. If the user inputs a next command based on a Next button after selecting the News and the Label1, the television add the list labels News and Label1 to the Playlist0002 in response to the next command. According to the News and the Label1, the television identifies related recorded files marked with the News or the Label1 from the recorded files that are recorded. Based on that a recorded file File002 is marked with the News and a recorded file File003 is marked with the Label1 and the Movie, then the recorded files File002 and File003 are related recorded files. The television adds the recorded files File002 and File003 to the Playlist0002.

After determining the recorded files File002 and File003, the television may also display a recorded file addition page as shown in ④ in FIG. 36. The recorded file addition page may include unrelated recorded files, such as recorded files File001, File004, File005 and File006. As shown in ④ in FIG. 36, based on that the user inputs a saving command based on a Save button after selecting the File005 and the File006, the television adds the selected File005 and File006 to the Playlist0002 in response to the saving command. As shown in ③ and ④ in FIG. 36, a previous (Prev) button is also configured in the label addition page and the recorded file addition page, and this button may be used to go back to a previous page for a re-operation in the previous page.

When the television displays the first recording management page as shown in ⑤ in FIG. 36 in response to the saving command, the Playlist0002 option newly created is displayed in the playlist display area 1601. When a focus (shown in gray base color) lands on the Playlist0002, the television displays the File002, the File003, the File005 and the File006 in the recorded file display area 1602 as shown in ⑤ in FIG. 36.

Figure 37:
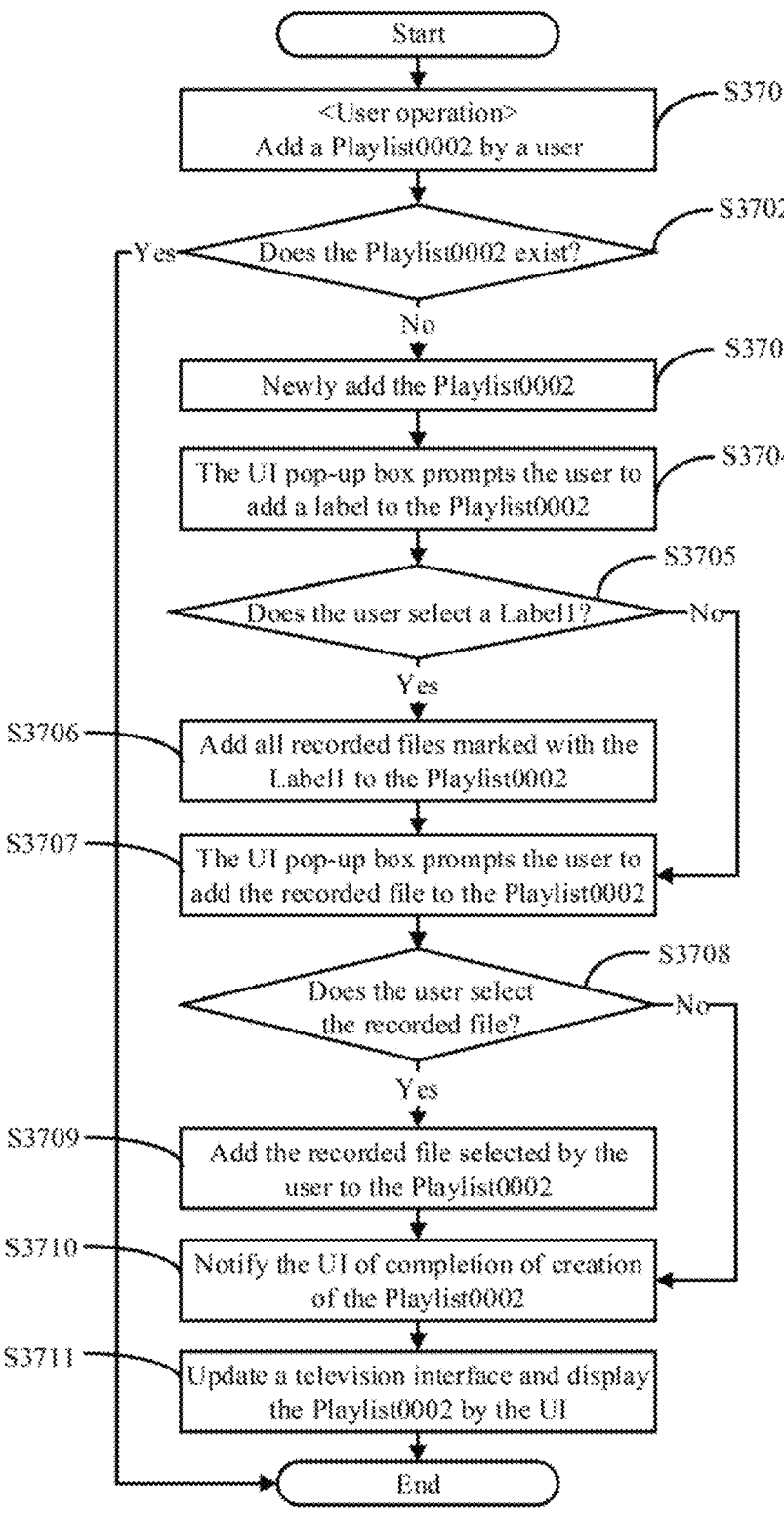
FIG. 37 shows a flow of creating a playlist Playlist0002 by a television according to some embodiments of the disclosure.

The television may create the Playlist0002 according to a flow as shown in FIG. 37. The flow may include the following.

In response to a next command for creation of the Playlist0002, the television determines whether the Playlist0002 exists in the Recording List, if so, the flow ends; and if not, the Playlist0002 is created. The user may be prompted to add a list label to the Playlist0002 through a UI pop-up box. Whether the user selects a label is determined. Based on that the labels (such as the News and the Label1) are selected, all related recorded files marked with the News or the Label1 are added to the Playlist0002. Based on that no selection is done, or after the related recorded files are added to the Playlist0002, the user may be prompted to add an unrelated recorded file to the Playlist0002 through a UI pop-up box. Whether the user selects a target unrelated recorded file is determined, if so, the target unrelated recorded file is added to the Playlist0002. If the user does not select a target unrelated recorded file, or after the target unrelated recorded file is added to the Playlist0002, the UI is notified of completion of creation of the new Playlist0002 (due to the fact that a change in a recording label of the recorded file is not involved, the UI only needed to be notified of display update, without the need to notify other processing modules of the playlist). The UI receives a completion message of creating the Playlist0002, updates the first recording management page, and displays the Playlist0002.

In some embodiments, the flow of creating the Playlist0002 by the television shown in FIG. 37 can include: S3701, a command for adding the Playlist0002 is received; S3702, whether the Playlist0002 exists is determined, if so, the flow ends, and if not, the flow goes to S3703; S3703, the Playlist0002 is newly added; S3704, the UI pop-up box prompts the user to add a label to the Playlist0002; S3705, whether the user selects the Label1 is determined, if so, the flow goes to S3706, otherwise, the flow goes to S3707; S3706, all the recorded files marked with the Label1 are added to the Playlist0002; S3707, the UI pop-up box prompts the user to add the recorded file to the Playlist0002; S3708, whether the user selects the recorded file is determined, if so, the flow goes to S3709, otherwise, the flow goes to S3710; S3709, the recorded file selected by the user is added to the Playlist0002; S3710, the UI is notified of completion of creation of the Playlist0002; and S3711, the UI updates an interface of the television and displays the Playlist0002.

Figures 38, 39:
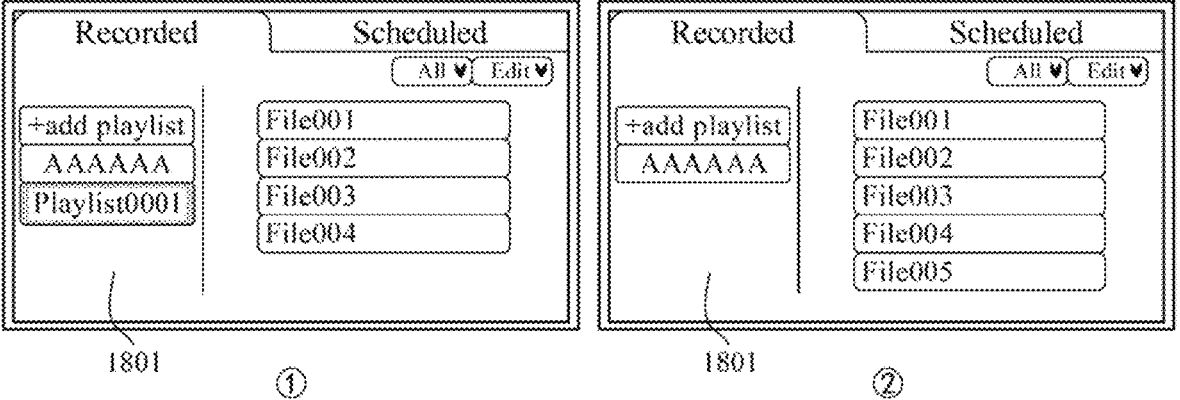
FIG. 38 is a flowchart of deleting a playlist by a television according to some embodiments of the disclosure.
FIG. 39 shows a flow of deleting a playlist Playlist0001 by a television according to some embodiments of the disclosure.

The television displays a first recording management page as shown in ① in FIG. 38. A playlist display area 1801 of the first recording management page may include created playlists such as AAAAAA and a Playlist0001. If the user wants to delete the Playlist0001, as shown in ① in FIG. 38, the user may move a focus (shown in gray base color) onto the Playlist0001 through the remote control, and may input a deletion command through a left key of the remote control. In response to the deletion command, the television deletes the Playlist0001. As shown in ② in FIG. 38, the Playlist0001 is no longer displayed in playlist display area 1801.

The television may delete the Playlist0001 according to a flow as shown in FIG. 39. The flow may include the following.

In response to a deletion command for deletion of the Playlist0001, the television determines whether the Playlist0001 exists in the Recording List, if not, the flow ends;

and if so, all user data related to the Playlist0001 is deleted. The UI is notified of completion of deletion of the Playlist0001, and the UI updates the first recording management page after receiving the message, and no longer displays the Playlist0001.

In some embodiments, the flow of deleting the Playlist0001 by the television shown in FIG. 39 can include: S3901, a command for deleting the Playlist0001 is received; S3902, whether the Playlist0001 exists, if not, the flow ends, and if so, the flow goes to S3903; S3903, all user data corresponding to the Playlist0001 is deleted; S3904, the UI module is notified of deletion of the Playlist0001; and S3905, the UI updates an interface, and no longer displays the Playlist0001.

On the first recording management page, an entry for switching display types of the recorded files, such as a switch button, is configured. The display types of the recorded files are classified according to the recording labels. The display apparatus displays a recorded file that has a designated recording label in the recorded file display area in response to a switch command from the user based on the switch button.

Based on that a playlist is not selected, all recorded files that have been recorded are displayed in the recorded file display area based on that the switch command indicates all the recorded files, and the recorded file that has the designated recording label from all recorded files that have been recorded is displayed in the recorded file display area based on that the switch command indicates the designated recording label.

Based on that a playlist, for example, a third playlist is selected, all recorded files in the third playlist are displayed in the recorded file display area based on that the switch command indicates all the recorded files, and the recorded file that has the designated recording label in the third playlist is displayed in the recorded file display area based on that the switch command indicates the designated recording label.

Example 5

Figure 40:
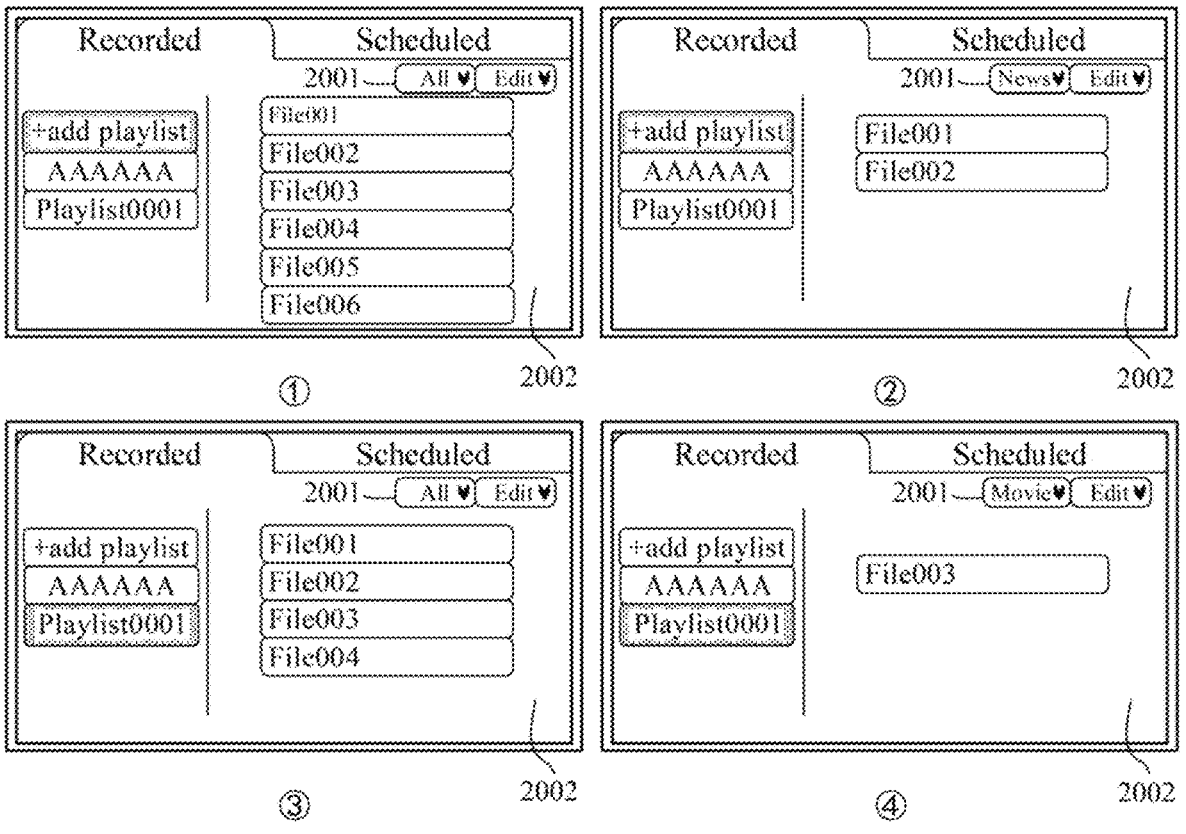
FIG. 40 is a flowchart of displaying recorded files of different types by a television according to some embodiments of the disclosure.

With reference to FIG. 40, a process of displaying recorded files of different types by a display apparatus is described by an example that the display apparatus is a television, a playlist created includes AAAAAA and a Playlist0001, and all recorded files include a File001, a File002, a File003, a File004, a File005 and a File006.

When the television displays a first recording management page as shown in ① in FIG. 40, based on that the playlist is not selected, for example, a focus (shown in gray base color) lands on an +add playlist option, the television displays all the recorded files that are recorded, that is, the File001, the File002, the File003, the File004, the File005 and the File006, in a recorded file display area 2002 based on that a user inputs a switch command (the switch command indicates all the recorded files) by switching a switch button 2001 to All.

When the television displays a first recording management page as shown in ② in FIG. 40, based on that the playlist is not selected, for example, a focus (shown in gray base color) lands on an +add playlist option, the television displays the File001 and the File002 in a recorded file display area 2002 based on that a user inputs a switch command (the switch command instructs to display a recorded file that is marked with News in all the recorded files, for example, the File001 and the File002 are marked with the News) by switching a switch button 2001 to the designated recording label, for example, the News.

When the television displays a first recording management page as shown in ③ in FIG. 40, and under the condition that a third playlist, for example, the Playlist0001, is selected, the television displays all recorded files of the Playlist0001 in a recorded file display area 2002 based on that a user inputs a switch command (the switch command indicates all the recorded files of the Playlist0001) by switching a switch button 2001 to All. For example, the recorded files of the Playlist0001 may include the File001, the File002, the File003 and the File004, and thus television displays the File001, the File002, the File003 and the File004 in a recorded file display area 2002.

When the television displays a first recording management page as shown in ④ in FIG. 40, and under the condition that a third playlist, for example, the Playlist0001, is selected, the television displays the File003 in a recorded file display area 2002 based on that a user inputs a switch command (the switch command instructs to display a recorded file that is marked with Movie in all the recorded files of the Playlist0001, for example, the File003 marked with the Movie) by switching a switch button 2001 to the designated recording label, for example, the Movie.

Figure 41:
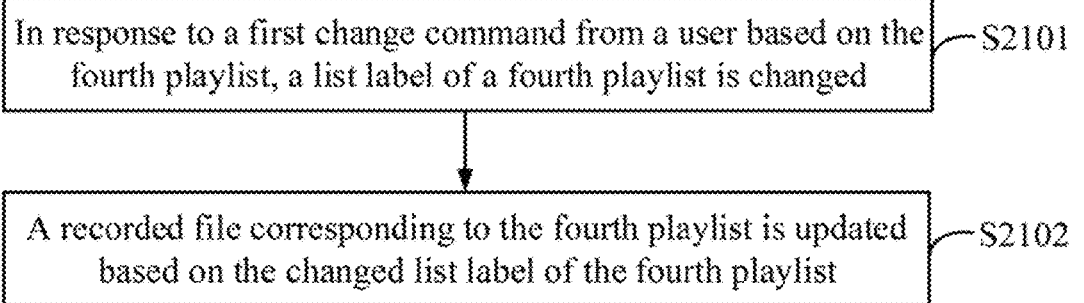
FIG. 41 is a flowchart of updating a recorded file in a playlist by a display apparatus based on a change in a list label according to some embodiments of the disclosure.

The user may change a list label of the playlist created, and the display apparatus updates internal recorded files based on the playlist with the list label changed. The display apparatus may update the recorded files in the playlist based on a change in the list label according to a flow shown in FIG. 41. The flow may include the following.

S2101, in response to a first change command from a user based on the fourth playlist, a list label of a fourth playlist is changed.

The fourth playlist is the playlist that has been created, and the fourth playlist is marked with the list label.

The first change command instructs to add a list label to the fourth playlist, delete the list label from the fourth playlist, or rename the list label of the fourth playlist.

S2102, a recorded file corresponding to the fourth playlist is updated based on the changed list label of the fourth playlist.

The recorded file updated has at least one recording label same as the changed list label. Thus, consistency between the recorded files in the playlist and the playlist is ensured.

In some embodiments, based on that the user adds recorded files unrelated to the fourth playlist into the fourth playlist, the display apparatus may first record these recorded files in response to the first change command, and keep these recorded files when updating recorded files, to keep special settings by the user on the recorded files in the fourth playlist.

Example 6

Figure 42:
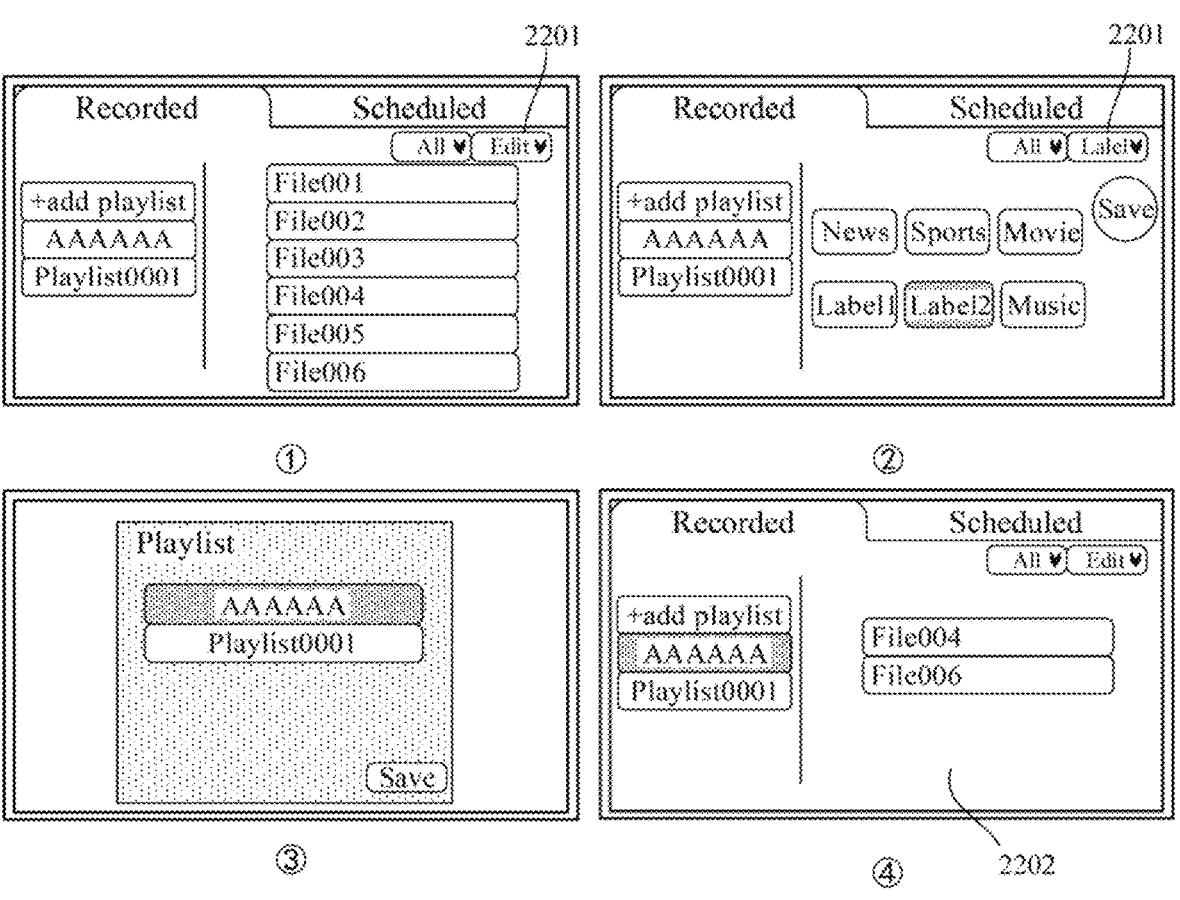
FIG. 42 is a flowchart of updating a recorded file in a playlist into which a list label is added by a television according to some embodiments of the disclosure.
Figure 43:
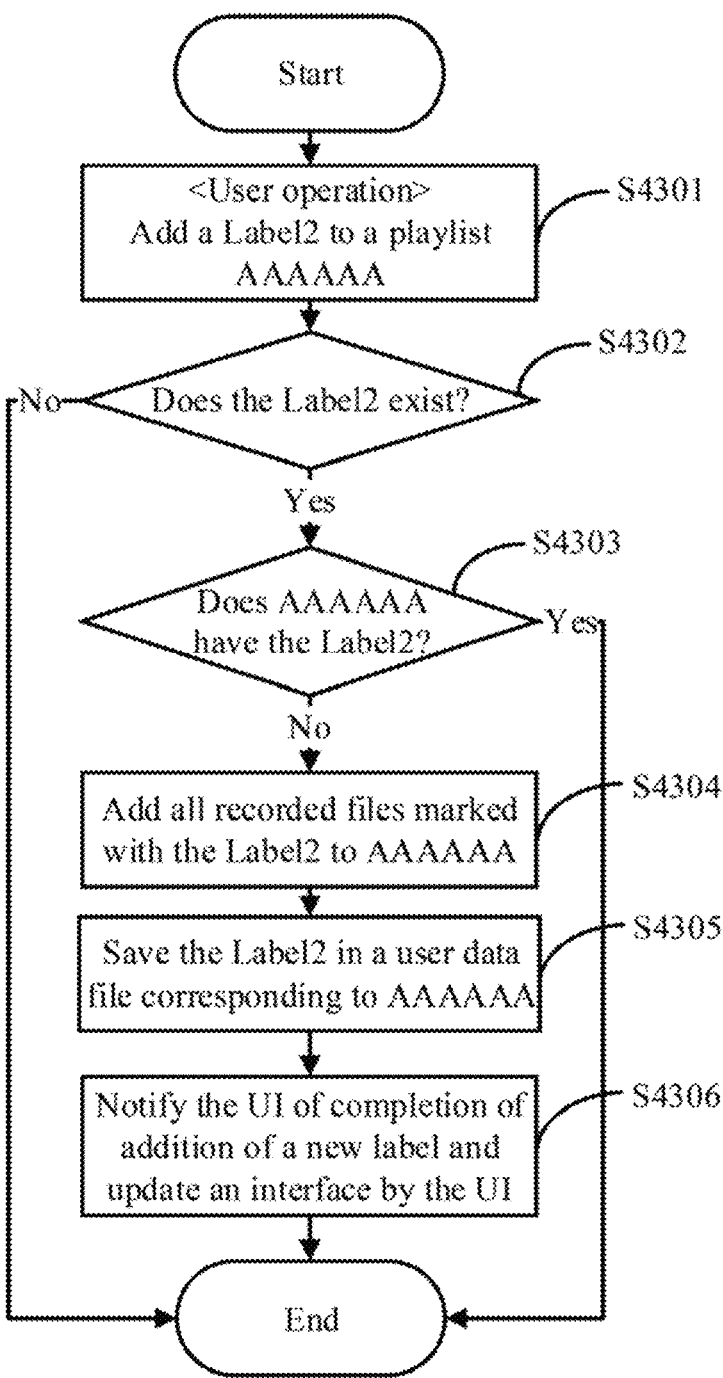
FIG. 43 shows a flow of adding a Label2 to AAAAAA by a television according to some embodiments of the disclosure.

With reference to FIGS. 42 and 43, a process of updating a recorded file in a playlist into which a list label is added by a display apparatus is described with the display apparatus being a television and a control device 100 being a remote control as an example.

As shown in ① in FIG. 42, a list label management entry is configured in a first recording management page, such as an edition button 2201. The edition button 2201 has a pull-down menu, and the pull-down menu may include a Label option. A user inputs an editing command by selecting the Label option from the pull-down menu. In response to the editing command as shown in ② in FIG. 42, the television displays available list labels, such as News, Sports, Movie, Music, a Label1 and a Label2, and an "Add to" option in a recorded file display area 2202. The user may select at least one of the list labels and input a selection command based on the "Add to" option, as shown in ② in FIG. 42. With the selection of Label2 by the user as an example, the television displays a playlist page as shown in ③ in FIG. 42 in response to the selection command. The playlist page may include playlist options to which list labels may be added, such as AAAAAA and a Playlist0001. With a case that the user selects AAAAAA and inputs a saving command based on a Save option as example, the television adds the Label2 to AAAAAA.

With AAAAAA that may include recorded files File001 and File006 as an example, based on that the recorded file File001 is not marked with the Label2 and the recorded file File004 is marked with the Label2, the television updates the recorded files of AAAAAA from the File001 and the File006 to the File004 and the File006. The television skips to display the first recording management page as shown in ④ in FIG. 42. When a focus lands on AAAAAA, the File004 and the File006 are displayed in the recorded file display area 2202.

The television may add the Label2 to AAAAAA according to a flow as shown in FIG. 43. The flow may include the following.

In response to a command for addition of the Label2 to AAAAAA, the television determines whether the Label2 exists in a Recording List (the Recording List includes all labels and recorded files, and based on that the Label2 does not exist in the Recording List, the Label2 does not exist in AAAAAA either), if not, the flow ends; if so, whether AAAAAA is marked with the Label2 is determined, if so, the flow ends; if not, AAAAAA is marked with the Label2, and all recorded files marked with the Label2 are added to AAAAAA and saved. The UI is notified of completion of addition of the Label2. After receiving the message, the UI updates AAAAAA, and displays the Label2 and a corresponding recorded file. (Due to the fact that a change in a label of the recorded file is not involved, the UI only needed to be notified of display update, without the need to notify other processing modules of the playlist).

In some embodiments, the flow of adding the Label2 to AAAAAA by the television as shown in FIG. 43 can include: S4301, a command for adding the Label2 to a playlist AAAAAA is received; S4302, whether the Label2 exists is determined, if not, the flow ends, if so, the flow goes to S4303; S4303, whether AAAAAA has the Label2 is determined, if so, the flow ends, otherwise, the flow goes to S4304; S4304, all recorded files marked with the Label2 are added to AAAAAA; S4305, the Label2 is saved in a user data file corresponding to AAAAAA; and S4306, the UI is notified of completion of label addition, and the UI updates an interface.

Example 7

Figure 44:
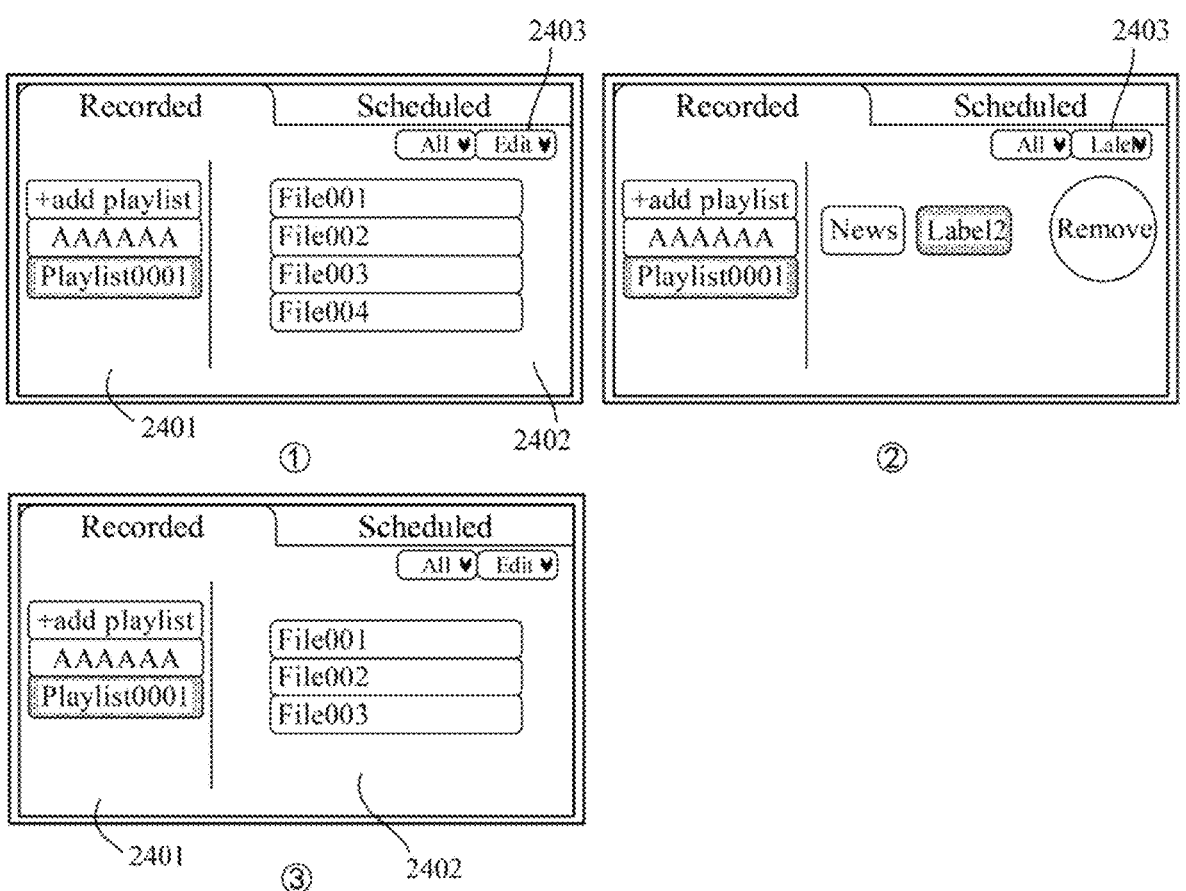
FIG. 44 is a flowchart of updating a recorded file in a playlist from which a list label is deleted by a television according to some embodiments of the disclosure.
Figure 45:
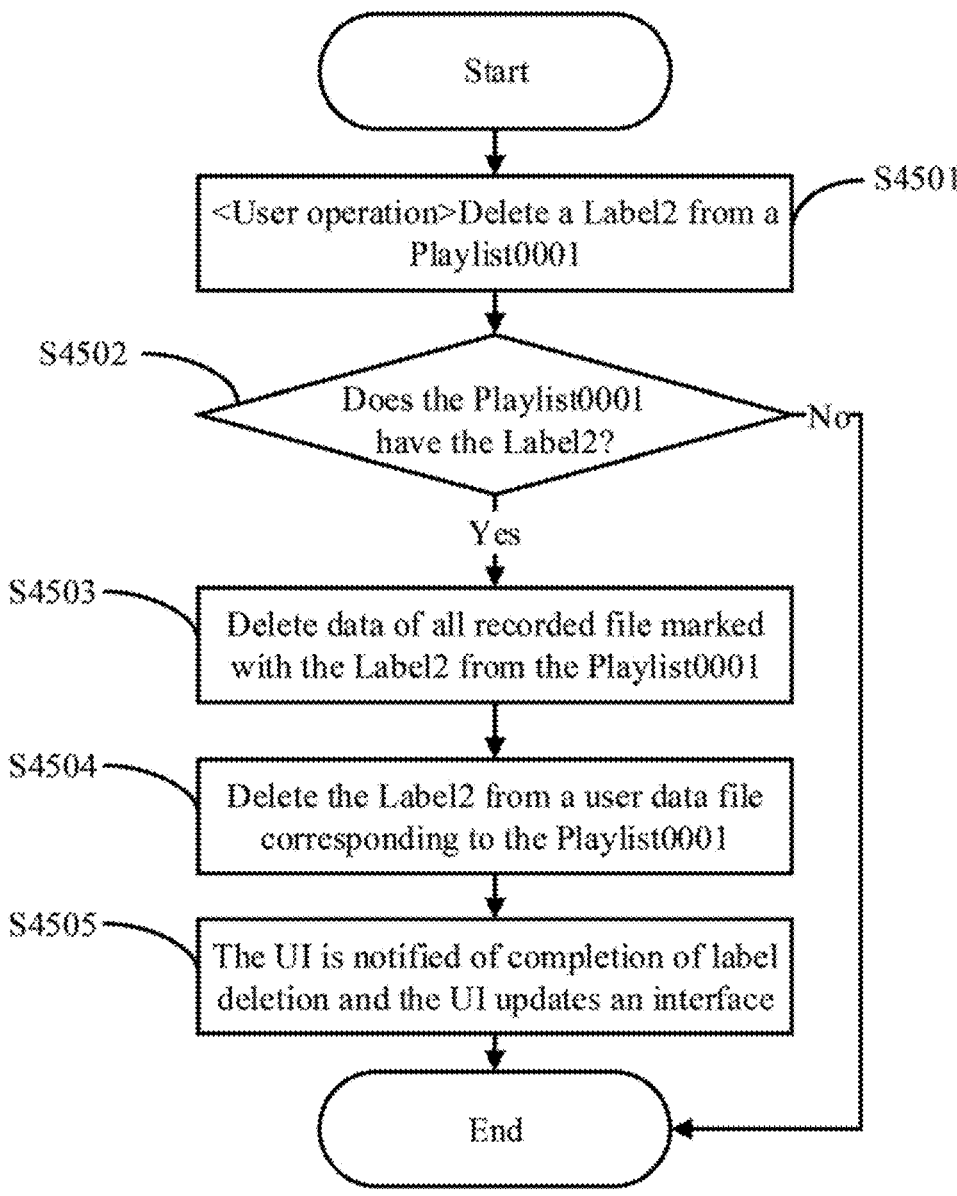
FIG. 45 shows a flow of removing a Label2 from a Playlist0001 by a television according to some embodiments of the disclosure.

With reference to FIGS. 44 and 45, a process of updating a recorded file in a playlist from which a list label is deleted by a display apparatus is described with the display apparatus being a television and a control device 100 being a remote control as an example.

The television displays a first recording management page as shown in ① in FIG. 44. Playlists that have been created, such as AAAAAA and a Playlist0001, are displayed in a playlist display area 2401. Based on that a user wants to delete the list label from the Playlist0001, as shown in ① in FIG. 44, the user moves a focus (shown in gray base color)

onto the Playlist0001 through the remote control, and the television displays the recorded files, for example, a File001, a File002, a File003 and a File004, of the Playlist0001 in the recorded file display area 2402. As shown in ① in FIG. 44, a first recording management page is configured with a list label management entry, such as an edition button 2403. The edition button 2403 has a pull-down menu, and the pull-down menu may include a Label option. The user inputs an editing command by selecting the Label option from the pull-down menu. In response to the editing command, as shown in ② in FIG. 44, the television displays list labels (such as News and a Label2) marked on the Playlist0001 in a recorded file display area 2402. The user may select at least one of the list labels, and input a removal command based on a Remove option, as shown in ② in FIG. 44. With selection of the Label2 by the user as an example, the television removes the Label2 from the list labels marked on the Playlist0001 in response to a removal command.

With the File004 marked with the Label2 as an example, the television updates the recorded files of the Playlist0001 from the File001, the File002, the File003 and the File004 to the File001, the File002 and the File003. The television displays the first recording management page as shown in ③ in FIG. 44. When a focus lands on the Playlist0001, the File001, the File002 and the File003 are displayed in the recorded file display area 2402.

The television may remove the Label2 from the Playlist0001 according to a flow as shown in FIG. 45. The flow may include the following.

In response to the removal command for removal of the Label2 from the Playlist0001, the television determines whether the Label2 exists in the Playlist0001, if not, the flow ends; and if so, all data related to the Label2 is deleted from the Playlist0001. The UI is notified of completion of removal of the Label2. After receiving the message, the UI updates the Playlist0001 and no longer displays the Label2 and a corresponding recorded file.

In some embodiments, the flow of removing the Label2 from the Playlist0001 by the television as shown in FIG. 45 can include: S4501, a command for deleting the Label2 from the Playlist0001 is received; S4502, whether the Playlist0001 has the Label2 is determined, if so, the flow goes to S4503, and if not, the flow ends; S4503, data of all recorded files marked with the Label2 is deleted from the Playlist0001; S4504, the Label2 is deleted from a user data file corresponding to the Playlist0001; and S4505, the UI is notified of completion of label deletion and the UI updates an interface.

Example 8

Figure 46:
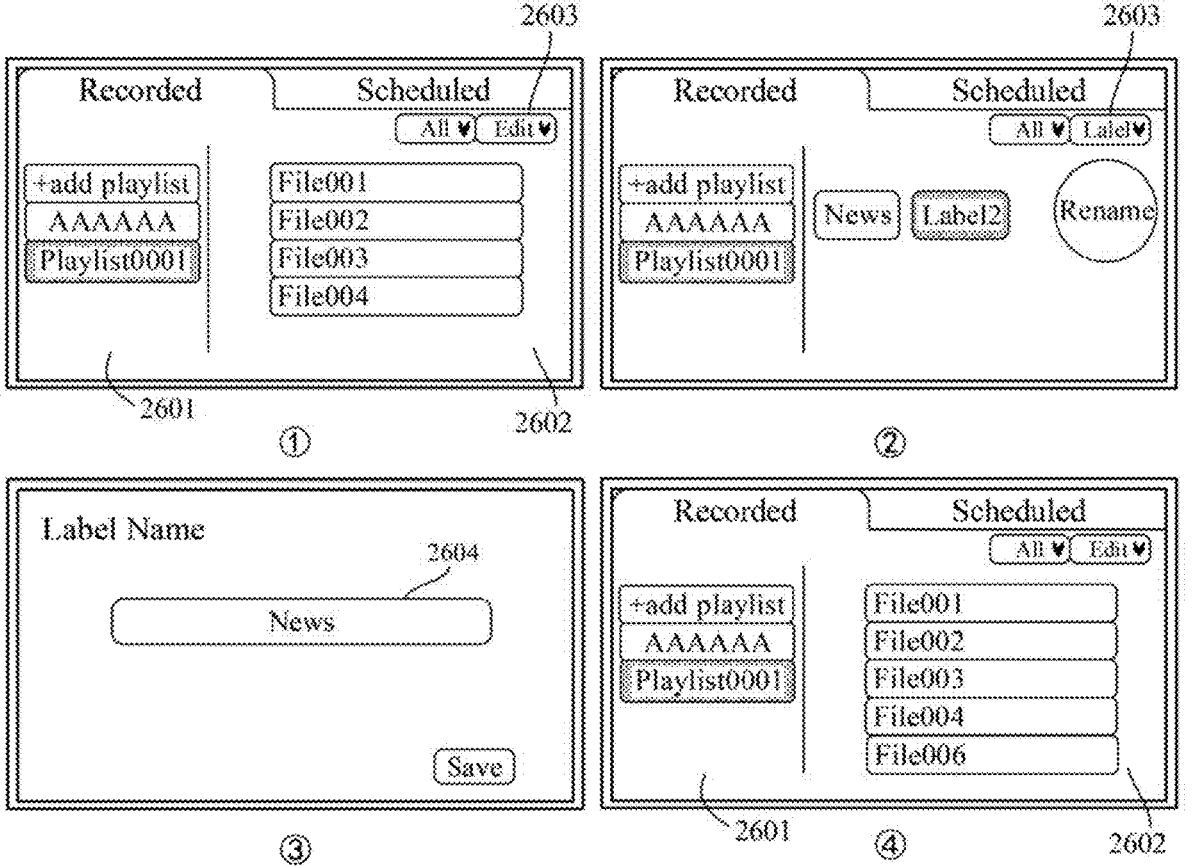
FIG. 46 is a flowchart of updating a recorded file in a playlist with a list label renamed by a television according to some embodiments of the disclosure.
Figure 47:
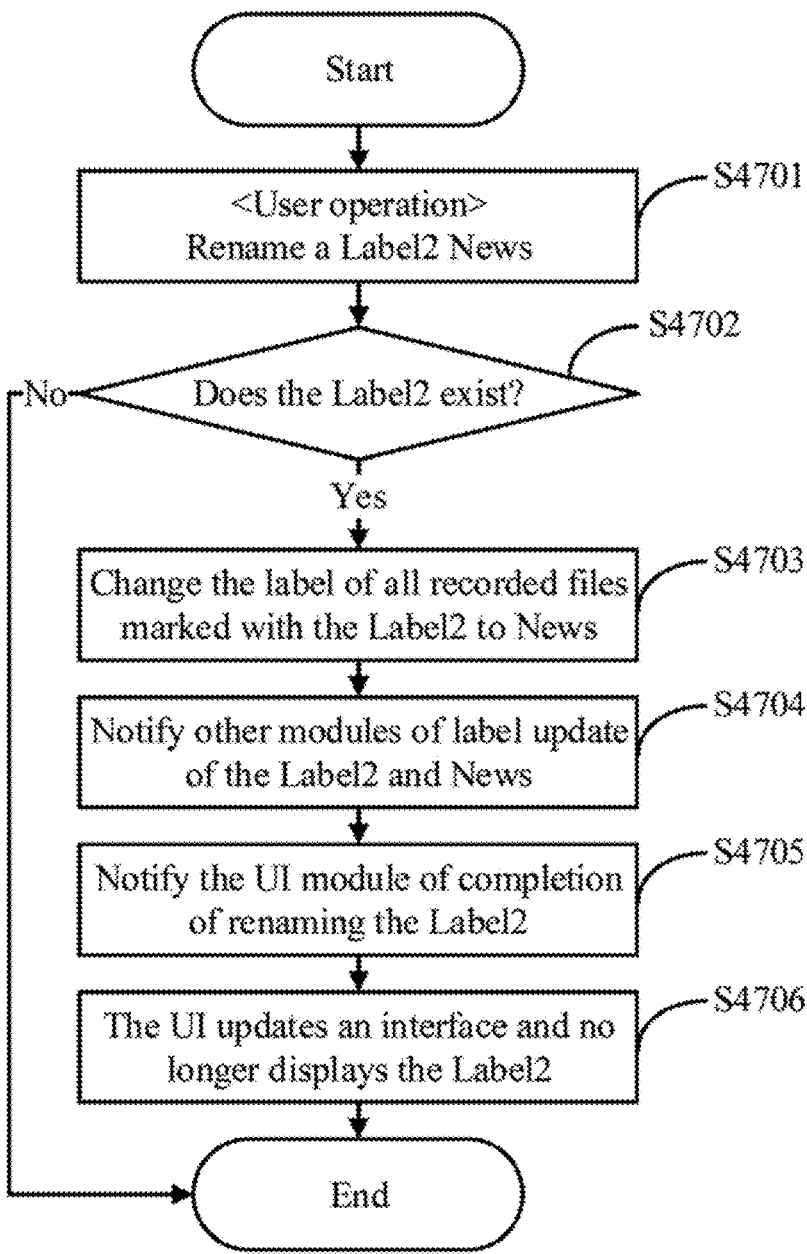
FIG. 47 shows a flow of renaming a Label2 in a Playlist0001 News by a television according to some embodiments of the disclosure.

With reference to FIGS. 46 and 47, a process of updating a recorded file in a playlist with a list label renamed by a display apparatus is described with the display apparatus being a television and a control device 100 being a remote control as an example.

The television displays a first recording management page as shown in ① in FIG. 46. Playlists that have been created, such as AAAAAA and a Playlist0001, are displayed in a playlist display area 2601. Based on that a user wants to rename the list label in the Playlist0001, as shown in ① in FIG. 46, the user moves a focus (shown in gray base color) onto the Playlist0001 through the remote control, and the television displays the recorded files, for example, a File001, a File002, a File003 and a File004, of the Playlist0001 in the recorded file display area 2602. As shown in ① in FIG. 46, a list label management entry is configured in a first recording management page, such as an edition button 2603. The edition button 2603 has a pull-down menu, and the pull-down menu may include a Label option. The user inputs an editing command by selecting the Label option from the pull-down menu. In response to the editing command, as shown in ② in FIG. 46, the television displays list labels (such as News and a Label2) marked on the Playlist0001 in a recorded file display area 2602. The user may select at least one of the list labels and input a renaming command based on a Rename option, as shown in ② in FIG. 46. With selection of the Label2 by the user as an example, the television displays a label naming page as shown in ③ in FIG. 46 in response to the renaming command. The label naming page may include a text input box 2604. According to a name (such as News) entered by the user through the text input box 2604, the television renames the list label Label2 News.

With a File006 marked with the News as an example, the television updates the recorded files of the Playlist0001 from the File001, the File002, the File003 and the File004 to the File001, the File002, the File003, File004 and File006. The television displays the first recording management page as shown in ④ in FIG. 46. When a focus lands on the Playlist0001, the File001, the File002, the File003, File004 and File006 are displayed in the recorded file display area 2602.

The television may rename the Label2 in the Playlist0001 News according to a flow as shown in FIG. 47. The flow may include the following.

In response to a renaming command for renaming the Label2 the News, the television determines whether the Label2 exists in the Recording List, if not, the flow ends; and if so, the Label2 of all recorded files marked with the Label2 is changed to News (this operation is equivalent to merging the Label2 and News into the News based on that the News exists, and this operation is equivalent to renaming the Label2 the News based on that the News does not exist, that is, a new list label is created). Other modules are notified of a message of renaming the Label2 the News. For a renaming operation on the label in any playlist, other playlists that include this label need to be notified of label update. The UI is notified of completion of a change in the Label2, and the UI updates display after receiving the message.

In some embodiments, the flow of renaming the Label2 in the Playlist0001 News by the television as shown in FIG. 47 can include: S4701, a command for renaming the Label2 the News is received; S4702, whether the Label2 exists is determined, if not, the flow ends, and if so, the flow goes to S4703; S4703, the label of all recorded files marked with the Label2 is changed to the News, S4704, other modules are notified of label update of the Label2 and the News; S4705, the UI module is notified of completion of renaming the Label2; and S4706, the UI updates an interface and no longer displays the Label2.

In some embodiments, the user may change recording labels of the recorded files, such as adding a recording label to the recorded file, removing a recording label currently marked on the recorded file, or renaming the recording label currently marked on the recorded file. For example, the user controls the display apparatus to display a recording label setting page. When the user does not select a recorded file, the setting page may include available recording labels. After the user selects at least one recording label and inputs an "add to" command based on an "Add to" option, the display apparatus displays a recording list to which a record-ing label may be added. The user may select at least one recorded file, and the display apparatus may add a recording label selected to the at least one recorded file. Based on that the user selects the recorded file, the setting page may include a recording label marked on the recorded file. The user may select at least one recording label and input a removal command based on a Remove option, to delete the at least one recording label. The user may also select at least one recording label and input a renaming command based on a Rename option, to rename the at least one recording label. After changing the recording label, the display apparatus updates a playlist to which a corresponding recorded file belongs with the changed recording label, to ensure consis-tency between the playlist and the recorded files with labels.

The user may change the recorded files in the playlist according to watching demands.

The display apparatus updates a recorded file in a fifth playlist in response to a second change command from the user based on a playlist that has been created, for example, the fifth playlist. Based on that the second change command instructs to add a designated recorded file, the designated recorded file is added into the fifth playlist. Based on that the second change command instructs to delete the designated recorded file from the fifth playlist, the designated recorded file is deleted from the fifth playlist.

Example 9

Figure 48:
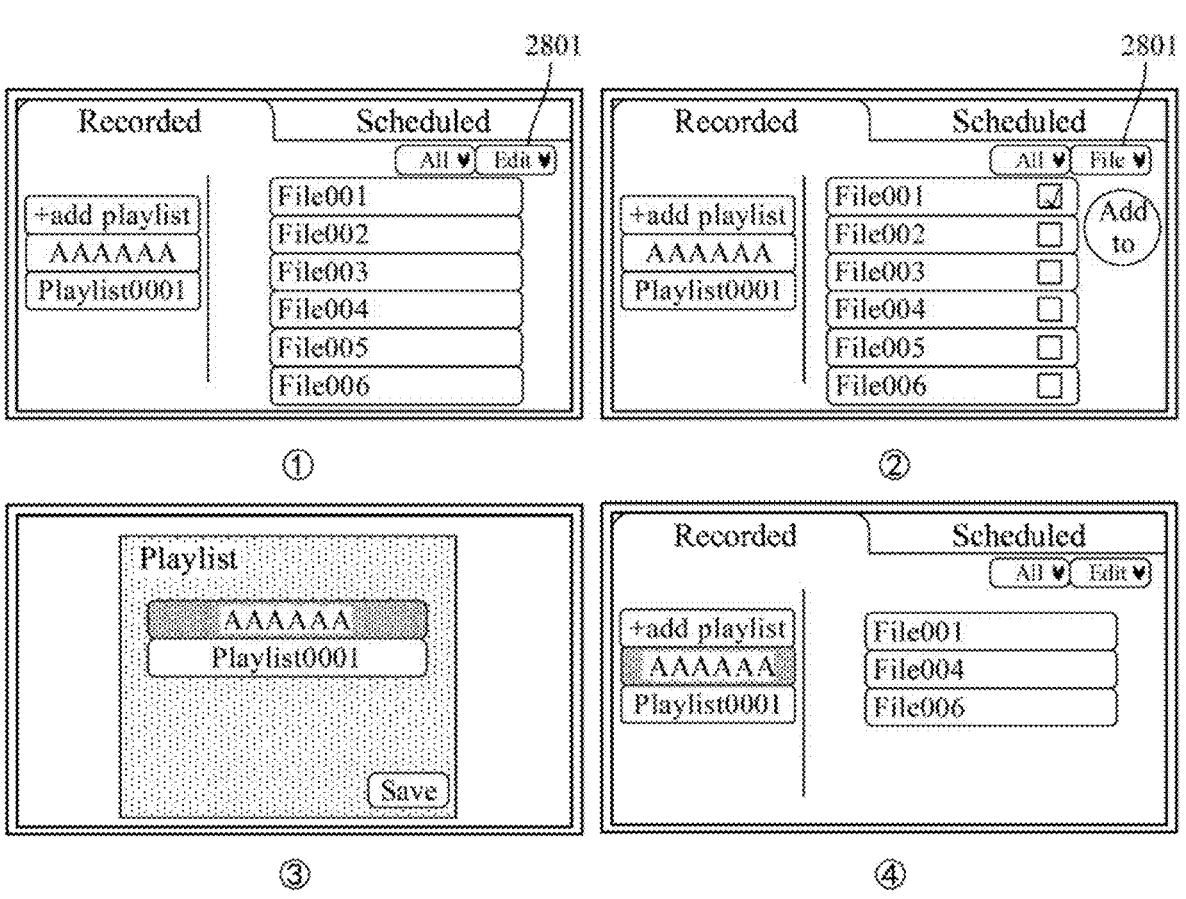
FIG. 48 is a flowchart of adding a recorded file into a playlist by a television according to some embodiments of the disclosure.
Figure 49:
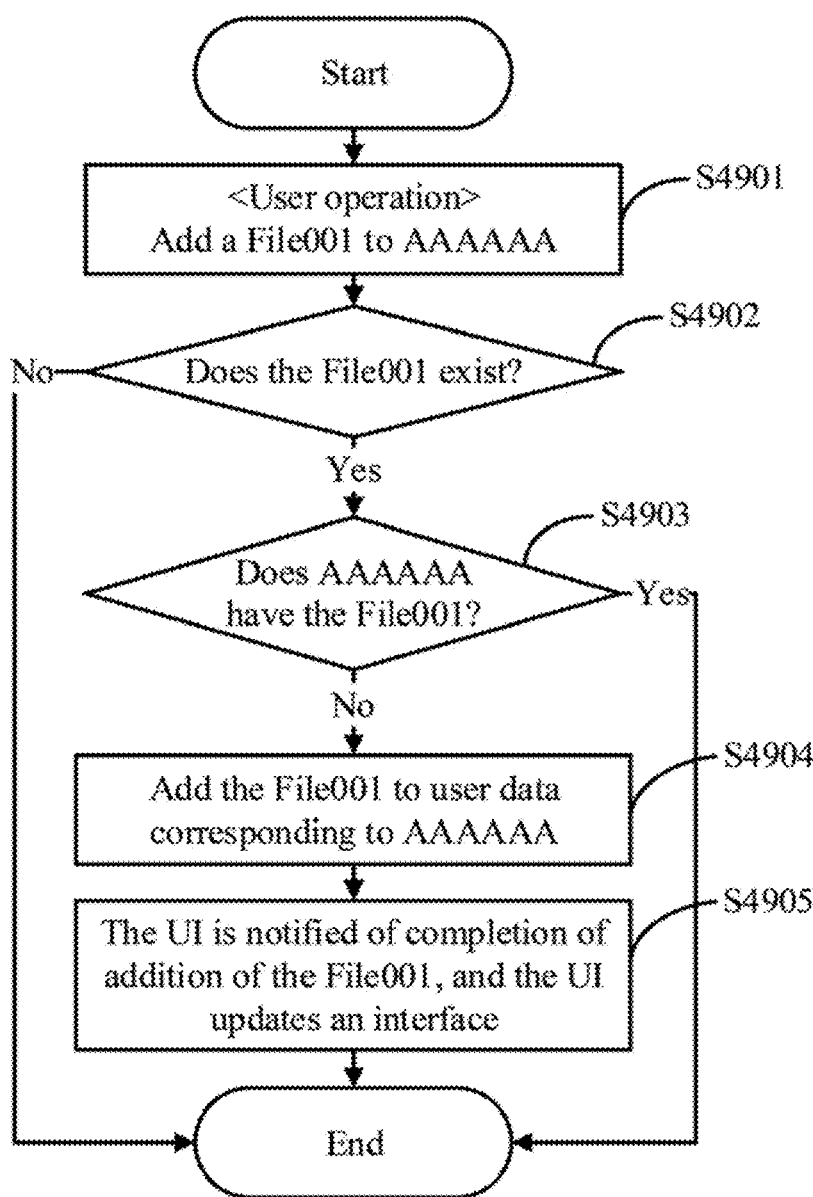
FIG. 49 shows a flow of adding a File001 to AAAAAA by a television according to some embodiments of the disclosure.

With reference to FIGS. 48 and 49, a process of adding a recorded file into a playlist by a display apparatus is described with the display apparatus being a television and a control device 100 being a remote control as an example.

The television displays a first recording management page as shown in ① in FIG. 48. A recorded file management entry is configured in the first recording management page, such as an edition button 2801. The edition button 2801 has a pull-down menu, and the pull-down menu may include a recorded file (File) option. The user inputs an editing com-mand by selecting the File option from the pull-down menu. In response to the editing command, as shown in ② in FIG. 48, the television displays available recorded files (such as a File001, a File002, a File003, File004, File005 and a File006) to be added and an "Add to" option in a recorded file display area 2802. The user may select at least one recorded file and input a selection command based on the "Add to" option, as shown in ② in FIG. 48. With selection of the File001 by the user as an example, the television displays a playlist page as shown in ③ in FIG. 48 in response to the selection command. The playlist page may include options of the playlists to which a recorded file may be added, such as AAAAAA and a Playlist0001. With a case that the user selects AAAAAA and inputs a saving command based on a Save option as an example, the television adds the File001 to AAAAAA.

With AAAAAA that may include recorded files File004 and File006 as an example, the television skips to display the first recording management page as shown in 4 in FIG. 48 after changing the recorded file of AAAAAA. When a focus lands on AAAAAA, the File001, the File004 and the File006 are displayed in the recorded file display area 2802.

The television may add the File001 to AAAAAA accord-ing to a flow as shown in FIG. 49. The flow may include the following.

In response to an "add to" command for adding the File001 to AAAAAA, the television determines whether the File001 exists in a Recording List, if not, the flow ends; if so, whether AAAAAA has the File001 is determined, if so, the flow ends; and if not, the File001 is added to AAAAAA.

The UI is notified of completion of addition of the File001, and the UI updates display after receiving the message.

In some embodiments, the flow of adding the File001 to AAAAAA by the television as shown in FIG. 49 can include: S4901, a command for adding the File001 to AAAAAA is received; S4902, whether the File001 exists is determined, if not, the flow ends, and if so, the flow goes to S4903; S4903, whether AAAAAA has the File001 is determined, if so, the flow ends, otherwise, the flow goes to S4904; S4904, the File001 is added to user data corresponding to AAAAAA; and S4905, the UI is notified of completion of addition of the File001, and the UI updates an interface.

Figure 50:
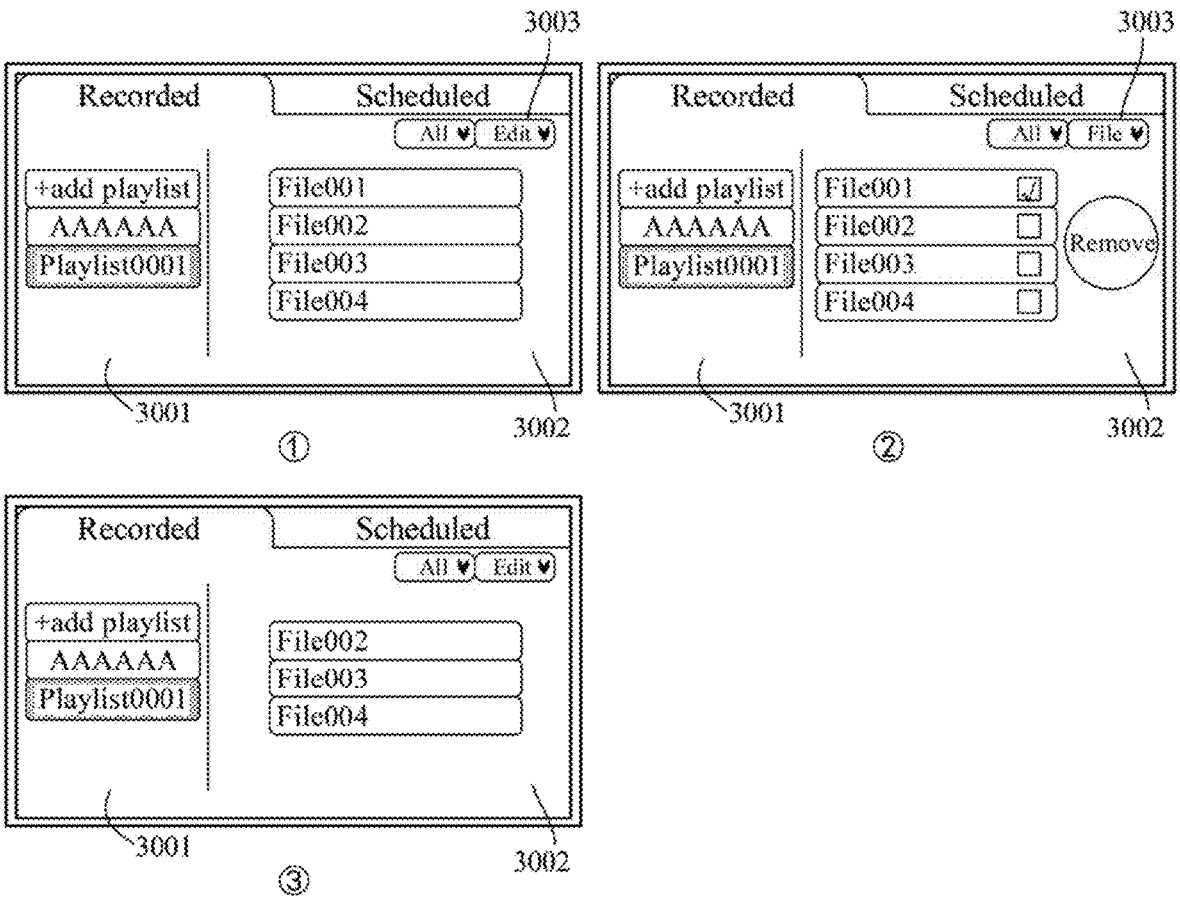
FIG. 50 is a flowchart of removing a recorded file from a playlist by a television according to some embodiments of the disclosure.
Figure 51:
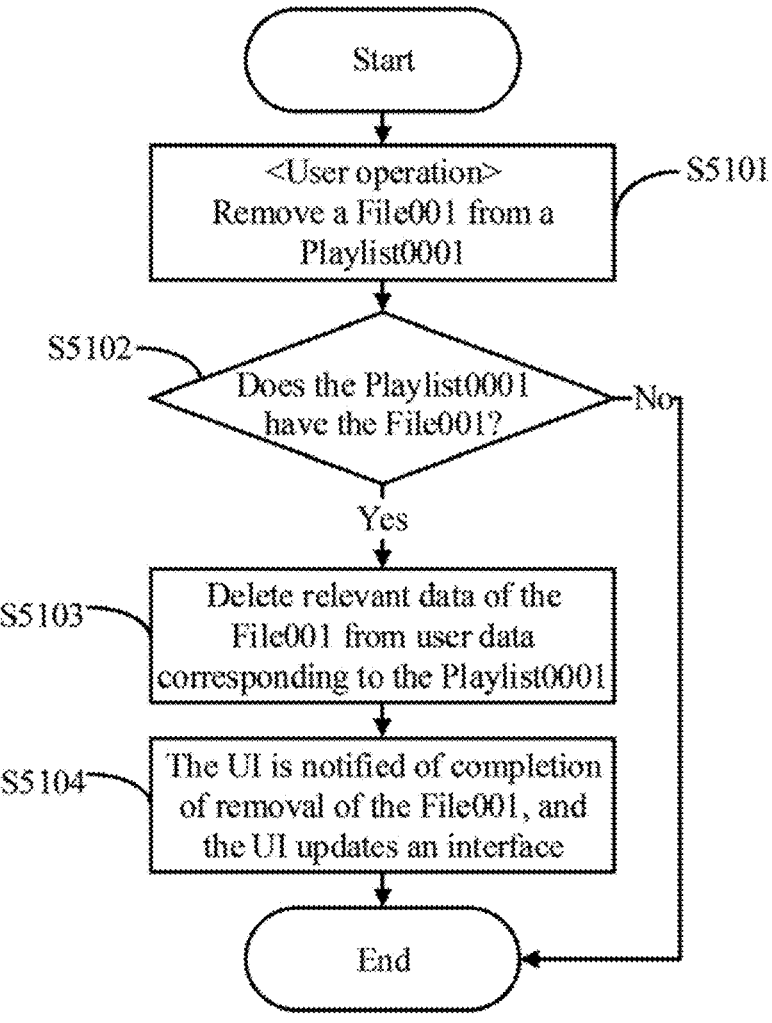
FIG. 51 shows a flow of deleting a File001 from a Playlist0001 by a television according to some embodiments of the disclosure.

With reference to FIGS. 50 and 51, a process of removing a recorded file from a playlist by a display apparatus is described with the display apparatus being a television and a control device 100 being a remote control as an example.

The television displays a first recording management page as shown in ① in FIG. 50. Playlists that have been created, such as AAAAAA and a Playlist0001, are displayed in a playlist display area 3001. Based on that a user wants to delete the list label from the Playlist0001, as shown in ① in FIG. 50, the user moves a focus (shown in gray base color) onto the Playlist0001 through the remote control, and the television displays the recorded files, for example, a File001, a File002, a File003 and a File004, of the Playlist0001 in the recorded file display area 3002. As shown in ① in FIG. 50, a recorded file management entry is configured in a first recording management page, such as an edition button 3003. The edition button 3003 has a pull-down menu, and the pull-down menu may include a File option. The user inputs an editing command by selecting the File option from the pull-down menu. In response to the editing command, as shown in ② in FIG. 50, the television displays recorded files of the Playlist0001, such as a File001, a File002, a File003 and a File004 in the recorded file display area 3002. The user may select at least one of the recorded files, and input a removal command based on a Remove option, as shown in 2) in FIG. 50. With selection of the File001 by the user as an example, the television removes the File001 from the Playlist0001 in response to the removal command.

After changing the recorded file of the Playlist0001, the television displays the first recording management page as shown in ③ in FIG. 50. When a focus lands on the Playlist0001, the File002, the File003 and the File004 are displayed in the recorded file display area 3002.

The television may remove the File001 from the Playlist0001 according to a flow as shown in FIG. 51. The flow may include the following.

In response to a removal command for removing the File001 from the Playlist0001, the television determines whether the File001 exists in the Playlist0001, if not, the flow ends; and if so, data related to the File001 is deleted from the Playlist0001. The UI is notified of completion of removal of the File001, and the UI updates display of the Playlist0001 after receiving the message.

In some embodiments, the flow of deleting the File001 from the Playlist0001 by the television as shown in FIG. 51 can include: S5101, a command for removing the File001 from the Playlist0001 is received; S5102, whether the Playlist0001 has the File001 is determined, if not, the flow ends, and if so, the flow goes to S5103; S5103, data related to the File001 is deleted from user data corresponding to the Playlist0001; and S5104, the UI is notified of completion of removal of the File001, and the UI updates an interface.

The display apparatus is further configured such that under the condition that all recorded files that have been recorded are displayed in the recorded file display area, original data of a recorded file that has a target recording label is deleted in response to a deletion command from the user based on the target recording label. Thus, recorded files scattered in different playlists can be deleted in batches by deleting the target recording label.

A default Recording List of the system includes all the recorded files, which are original data. The data generated by the user's operations of adding and deleting a playlist based on the Recording List, as well as the operation on the recording file in the playlist, are user data and saved in another user data file separately. Thus, the operations related to the playlist do not affect the original data. Thus, if the user wants to delete the recorded file from the playlist, the user needs to delete the recorded file from the default Recording List in order to remove the original data of the recording file. The user may delete the recorded files in batches from the Recording List by deleting a label, instead of deleting recorded files by selecting the recorded files one by one.

Figure 52:
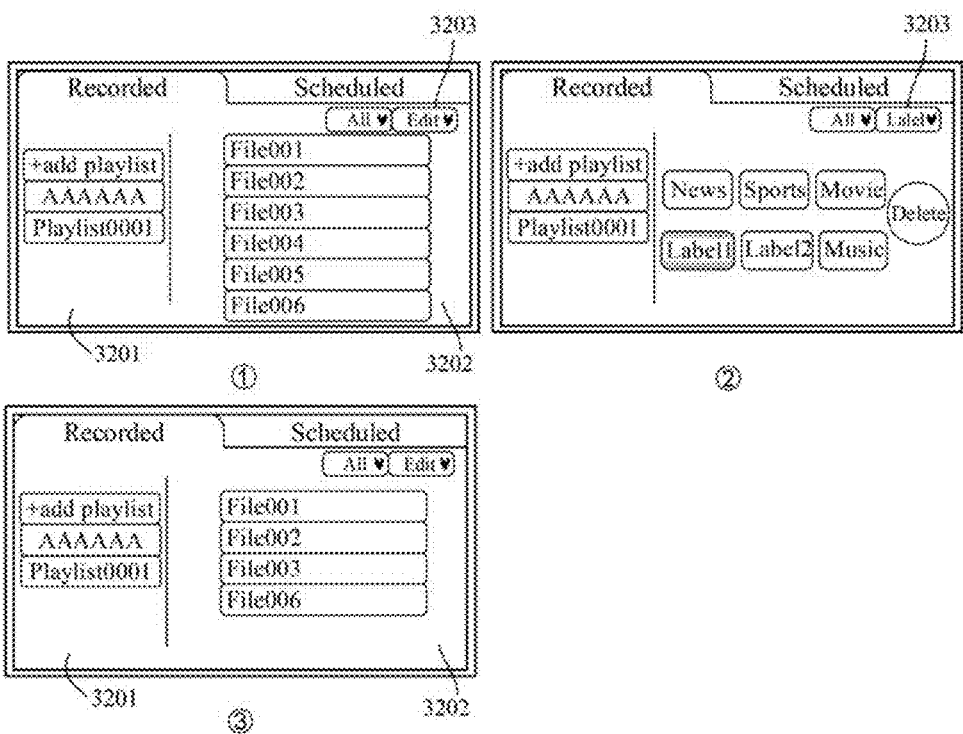
FIG. 52 is a flowchart of deleting original data by a television according to some embodiments of the disclosure.

In some embodiments, the television displays a first recording management page as shown in FIG. 52. Playlists that have been created, such as AAAAAA and a Playlist0001, are displayed in a playlist display area 3201. Based on that the user wants to delete original data marked with a Label1, the user moves a focus out of the playlist display area 3201 through the remote control as shown in ① in FIG. 52. As shown in ① in FIG. 52, a recording label management entry is configured in a first recording management page, such as an edition button 3203. The edition button 3203 has a pull-down menu, and the pull-down menu may include a Label option. The user inputs an editing command by selecting the Label option from the pull-down menu. In response to the editing command as shown in ② in FIG. 52, the television displays recording labels (such as News, Sports, Movie, Music, a Label1 and a Label2) marked in the Recording List in a recorded file display area 3202. The user may select at least one of the recording labels, and input a deletion command based on a Delete option, as shown in ② in FIG. 52. With selection of the Label1 by the user as an example, the television deletes original data of all recorded files marked with the Label1 from the Recording List in response to the deletion command. After original data of the File004 and the File005 that are marked with the Label1 is deleted, the television displays the updated recorded files, that is, the File001, the File002, the File003 and the File006, in the recorded file display area 3202 as shown in ③ in FIG. 52.

Figure 53:
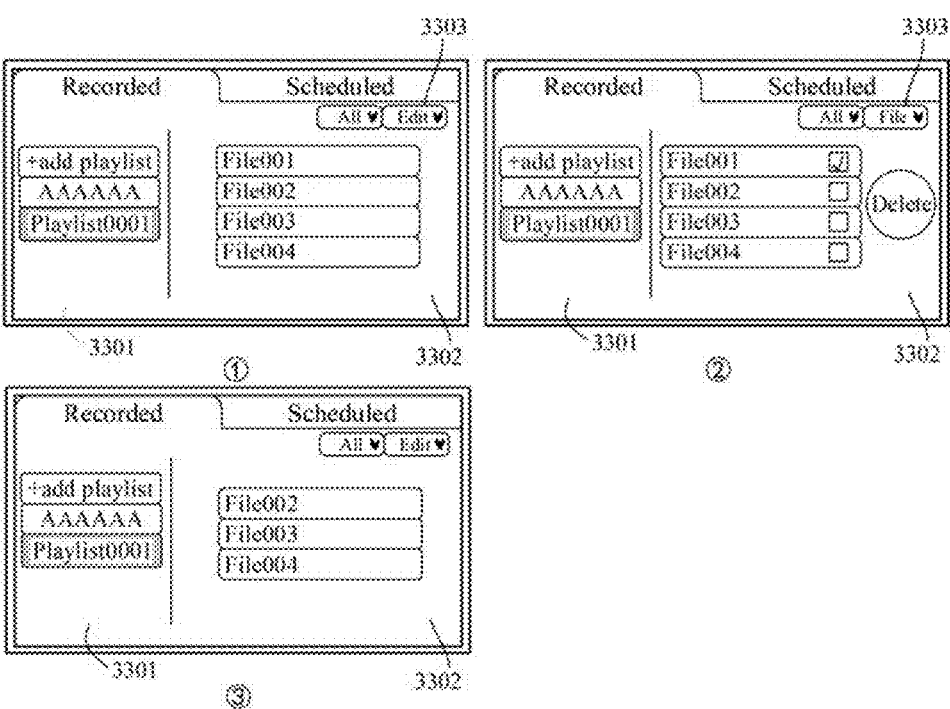
FIG. 53 is a flowchart of deleting original data by a television according to some embodiments of the disclosure.

In some embodiments, the television displays a first recording management page as shown in ① in FIG. 53. Playlists that have been created, such as AAAAAA and a Playlist0001, are displayed in a playlist display area 3301. Based on that the user wants to delete original data of the recorded file in the Playlist0001, as shown in ① in FIG. 53, the user moves a focus (shown in gray base color) onto the Playlist0001 through the remote control, and the television displays the recorded files, for example, a File001, a File002, a File003 and a File004, of the Playlist0001 in the recorded file display area 3302. As shown in ① in FIG. 53, a recorded file management entry is configured in a first recording management page, such as an edition button 3303. The edition button 3303 has a pull-down menu, and the pull-down menu may include a File option. The user inputs an editing command by selecting the File option from the pull-down menu. In response to the editing command as shown in ② in FIG. 53, the television displays recorded files of the Playlist0001, such as the File001, the File002, the File003 and the File004, in the recorded file display area 3302. The user may select at least one of the recorded files, and input a deletion command based on a Delete option, as shown in ② in FIG. 53. With selection of the File001 by the user as an example, the television deletes original data of the File001 from the Recording List in response to the deletion command. After the original data is deleted, the television displays recorded files updated, that is, the File002, the File003 and the File004, in the recorded file display area 3302 under the condition that the focus lands on the Playlist0001 as shown in ③ in FIG. 53.

Figure 54:
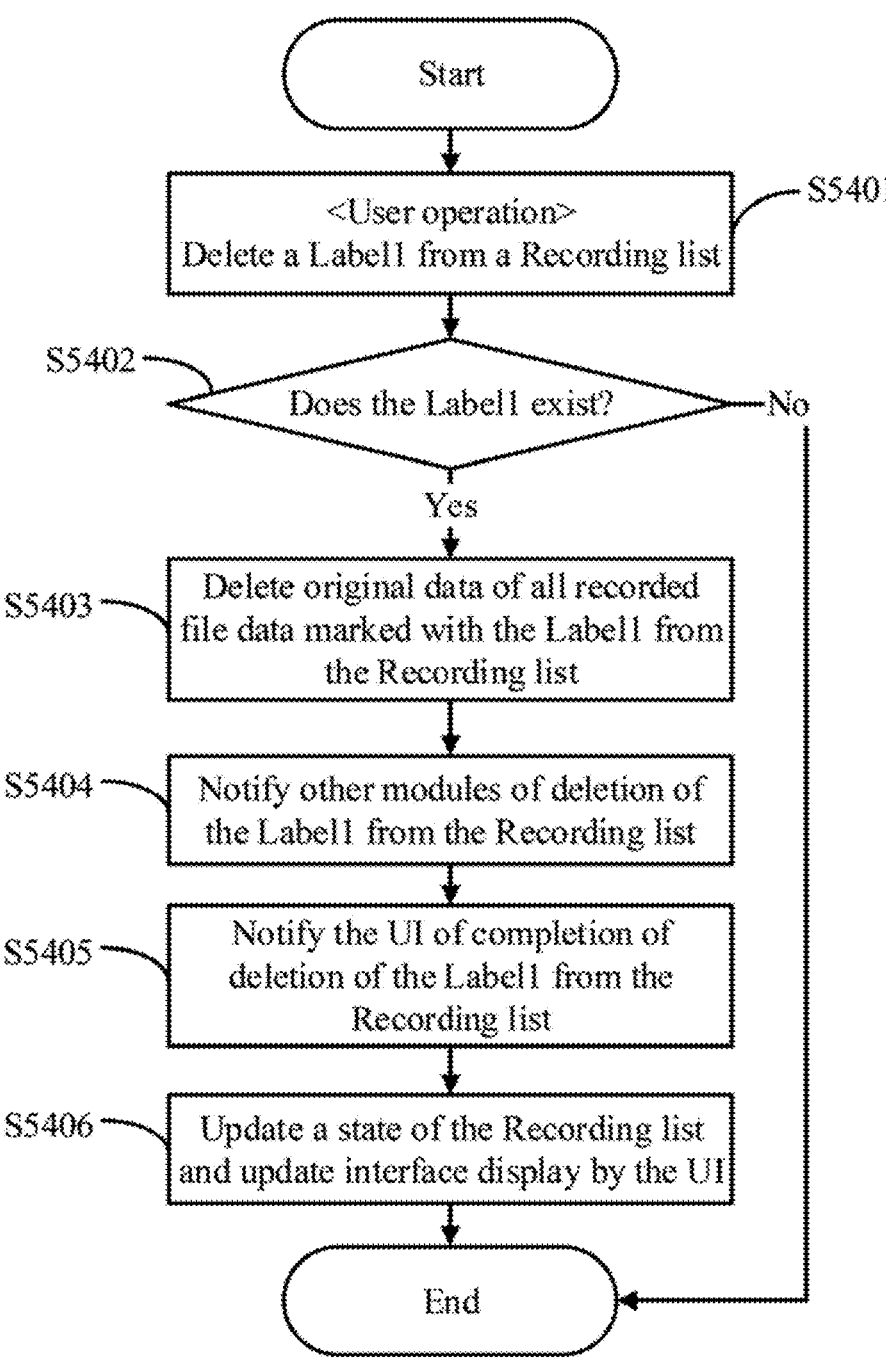
FIG. 54 shows a flow of deleting in batches original data of recorded files that have a designated label by a television according to some embodiments of the disclosure.

The display apparatus may delete in batches original data of recorded files that have a designated label (such as the Label1) according to a flow as shown in FIG. 54. The flow may include the following.

In response to a deletion command for deleting the designated label Label1 from the Recording List, the display apparatus determines whether the Label1 exists in the Recording List, if not, the flow ends; and if so, original data of all recorded files marked with the Label1 is deleted from the Recording List. Other processing modules of the playlist are notified of completion of deletion of the Label1. The other processing modules of the playlist update (deleting the related data of the Label1) the related data of the Label1 after receiving the message. The UI is notified of completion of deletion of the Label1, and the UI updates an interface after receiving the message, and no longer displays contents related to the Label1.

In some embodiments, the flow of deleting in batches the original data of the recorded files that have the designated label by the television as shown in FIG. 54 can include: S5401, a command for deleting the Label1 from the Recording list is received; S5402, whether the Label1 exists is determined, if not, the flow ends, and if so, the flow goes to S5403; S5403, original data of all recorded files marked with the Label1 is deleted from the Recording list; S5404, other modules are notified of deletion of the Label1 from the Recording list; S5405, the UI is notified of completion of deletion of the Label1 from the Recording list; and S5406, the UI updates a state of the Recording list and updates interface display.

The user may set playing parameters of recorded files in a playlist that has been created. The playing parameters may include a playing order, a playing count and playing start and end points. The playing order corresponds to an order of the recorded file in the playlist. The playing count refers to a repeated playing count of the recorded file. The playing start and end points refer to a playing start point and a playing end point of the recorded file. Clips of the recorded file correspond to a period between the playing start point and the playing end point. Based on that the recorded file has merely one playing start point and one playing end point, the recorded file has merely the playing start point and has an end point being an end point of the recorded file.

The user may set at least one recorded file simultaneously or sequentially. For example, the display apparatus simultaneously sets corresponding playing parameters for N recorded files in response to a setting command from the user based on the N recorded files in a first playlist that has been created, where N is a positive integer greater than 0.

Example 10

Figure 55:
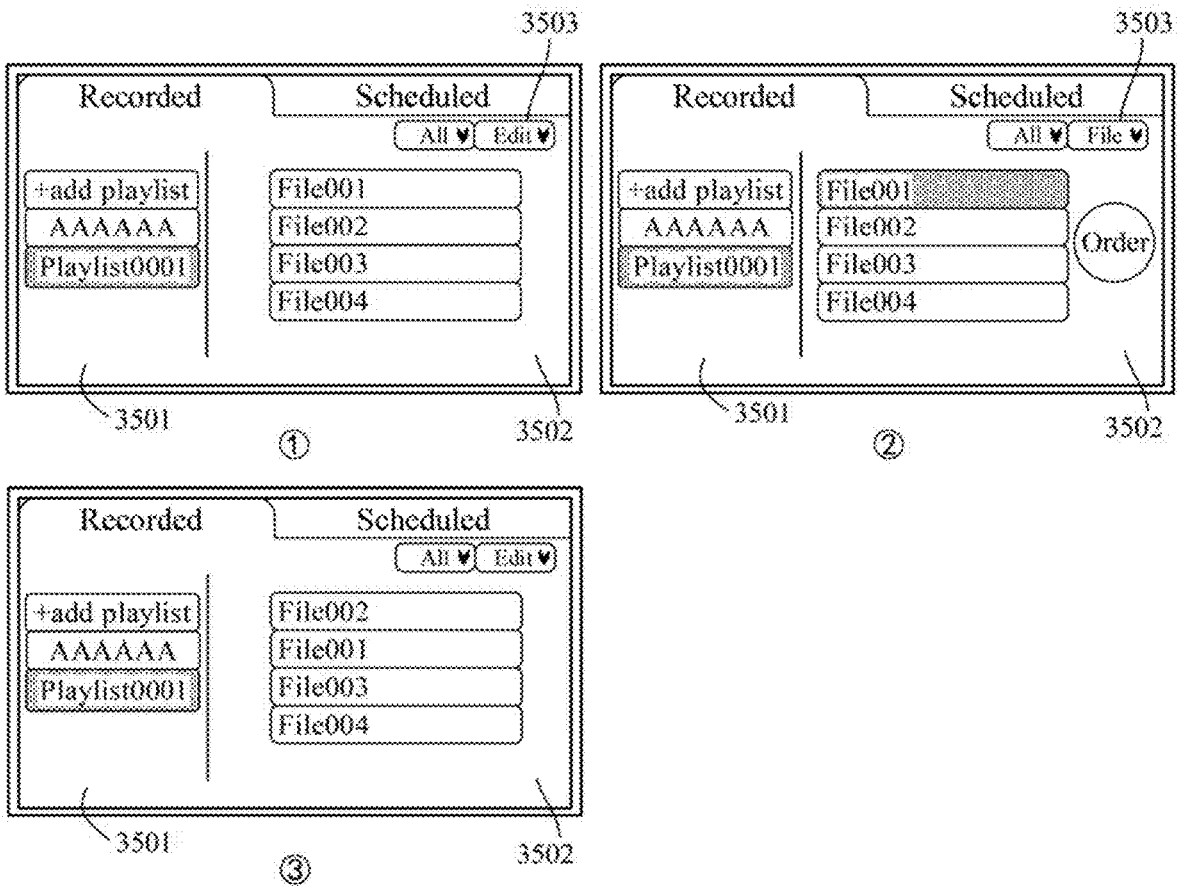
FIG. 55 is a flowchart of adjusting a playing order of recorded files by a television according to some embodiments of the disclosure.
Figure 56:
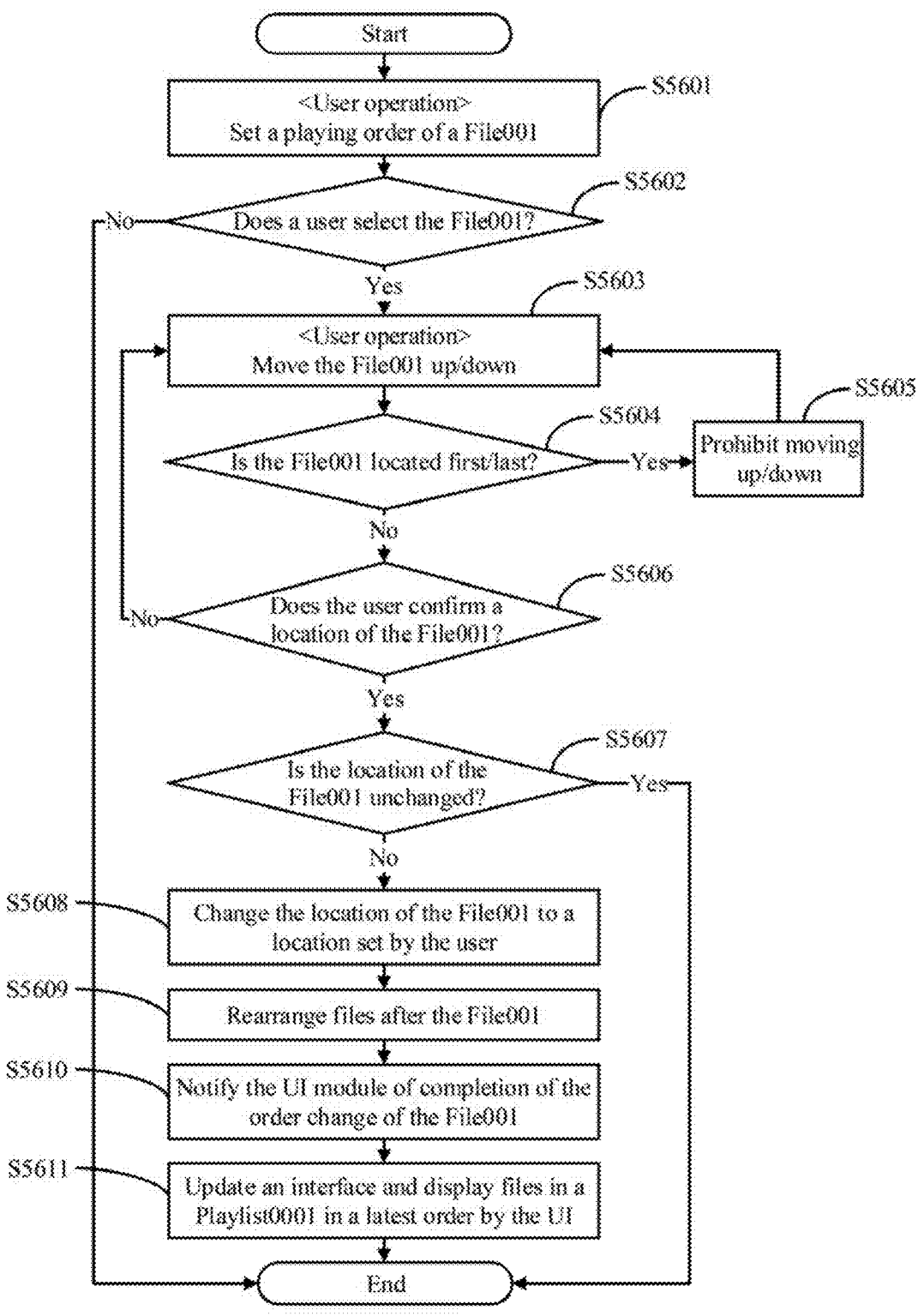
FIG. 56 shows a flow of adjusting a playing order of a File001 by a television according to some embodiments of the disclosure.

With reference to FIGS. 55 and 56, a process of adjusting a playing order of recorded files by a display apparatus is described with the display apparatus being a television and a control device 100 being a remote control as an example.

The television displays a first recording management page as shown in ① in FIG. 55. Playlists that have been created, such as AAAAAA and a Playlist0001, are displayed in a playlist display area 3501. Based on that a user wants to adjust a playing parameter of a recorded file in the Playlist0001, as shown in ① in FIG. 55, the user moves a focus (shown in gray base color) onto the Playlist0001 through the remote control, and the television displays the recorded files, for example, a File001, a File002, a File003 and a File004, of the Playlist0001 in a recorded file display area 3502. As shown in ① in FIG. 55, a recorded file management entry is configured in the first recording management page, such as an edition button 3503. The edition button 3503 has a pull-down menu, and the pull-down menu may include a File option. The user inputs an editing command by selecting the File option from the pull-down menu. In response to the editing command, as shown in ② in FIG. 55, the television displays recorded files of the Playlist0001, such as the File001, the File002, the File003 and the File004, in recorded file display area 3502. The user may select at least one of the recorded files, such as the File001, and input an order adjustment command based on an Order option. The television adjusts the File001, the File002, the File003 and the File004 into a movable state in response to the order adjustment command. The user may input a movement command through direction keys on the remote control, such as a down key. With selection of the File001 by the user as an example, the television moves the File001 to a position below the File002 in response to the movement command, as shown in ③ in FIG. 55. In this case, a playing order of the recorded files in the Playlist0001 is: File002→File001→File003→File004.

The television may adjust the playing order of the File001 according to a flow as shown in FIG. 56. The flow may include the following.

The television determines whether the user selects the File001 in response to the setting command for setting the playing order of the File001, if not, the order may not be set, and the flow ends; and if so, the File001 is moved in response to the movement command from the user. Whether the File001 is in a first/last position in the Playlist0001 is determined, if so, the file 001 may not be moved up/down further; and if not, the file 001 may be moved up/down. A position of the File001 after movement is confirmed. Whether the position of the File001 after movement is the same as a position before movement is determined, if so, it means that the position is unchanged and the flow ends; and if not, the position of the File001 is changed to the position after movement. After the position change of the File001 is completed, files after the File001 are rearranged. The UI module is notified of completion of the position change of the File001. The UI updates the Playlist0001 page after receiving the message and displays the same in a latest file order.

In some embodiments, the flow of adjusting the playing order of the File001 by the television as shown in FIG. 56 can include: S5601, a command for setting the playing order of the File001 is received; S5602, whether the user selects the File001 is determined, if not, the flow ends, and if so, the flow goes to S5603; S5603, a command for moving up/down the File001 is received; S5604, whether the File001 is in the first/last position is determined, if so, the flow goes to S5605, and if not, the File001 is moved up/down and then the flow goes to S5606; S5605, moving up/down is prohibited; S5606, whether the user confirms the position of the File001 is determined, if so, the flow goes to S5607, if not, the flow goes to S5603; S5607, whether the position of the File001 is unchanged is determined, if so, the flow ends, and if not, the flow goes to S5608; S5608, the position of the File001 is changed to a position set by the user; S5609, the files after the File001 are rearranged; S5610, the UI module is notified of completion of the order change of the File001; and S5611, the UI updates an interface and displays the files in the Playlist0001 in the latest order.

Example 11

Figure 57:
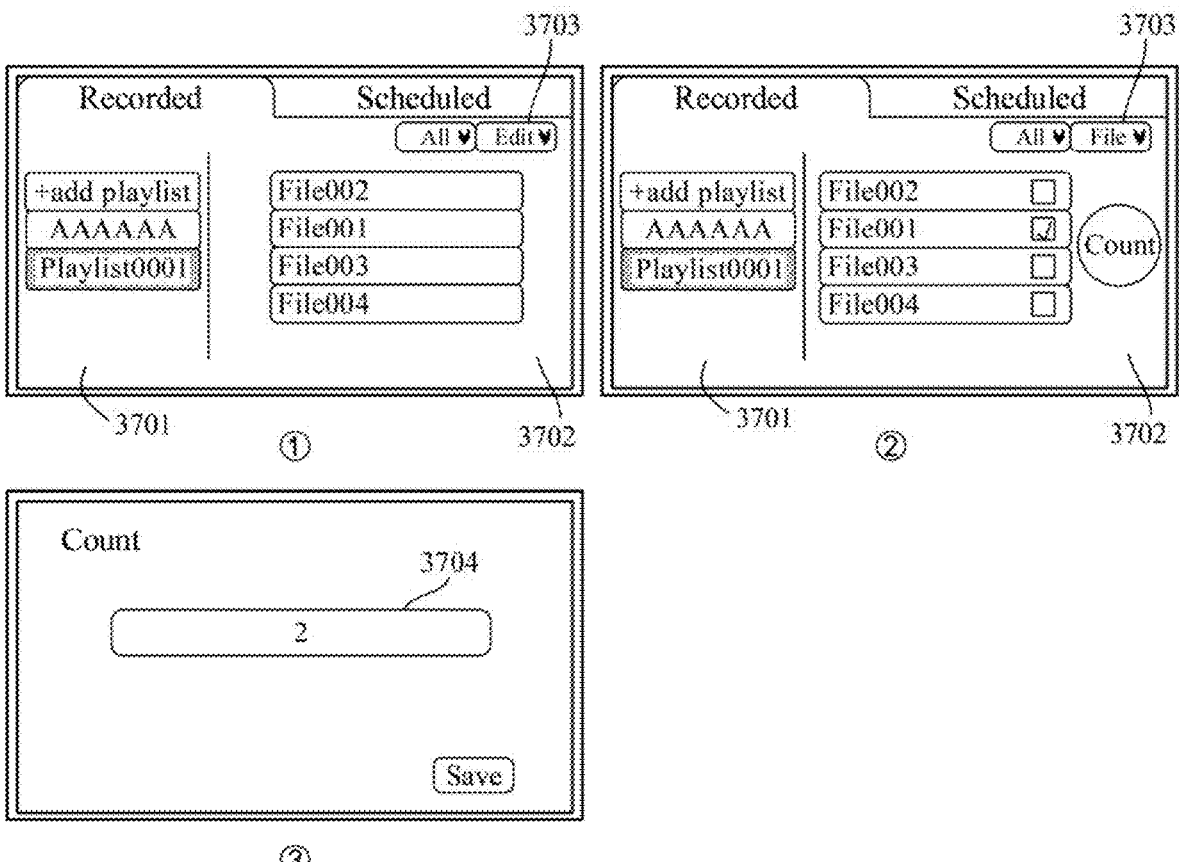
FIG. 57 is a flowchart of setting a playing count of a recorded file by a television according to some embodiments of the disclosure.
Figure 58:
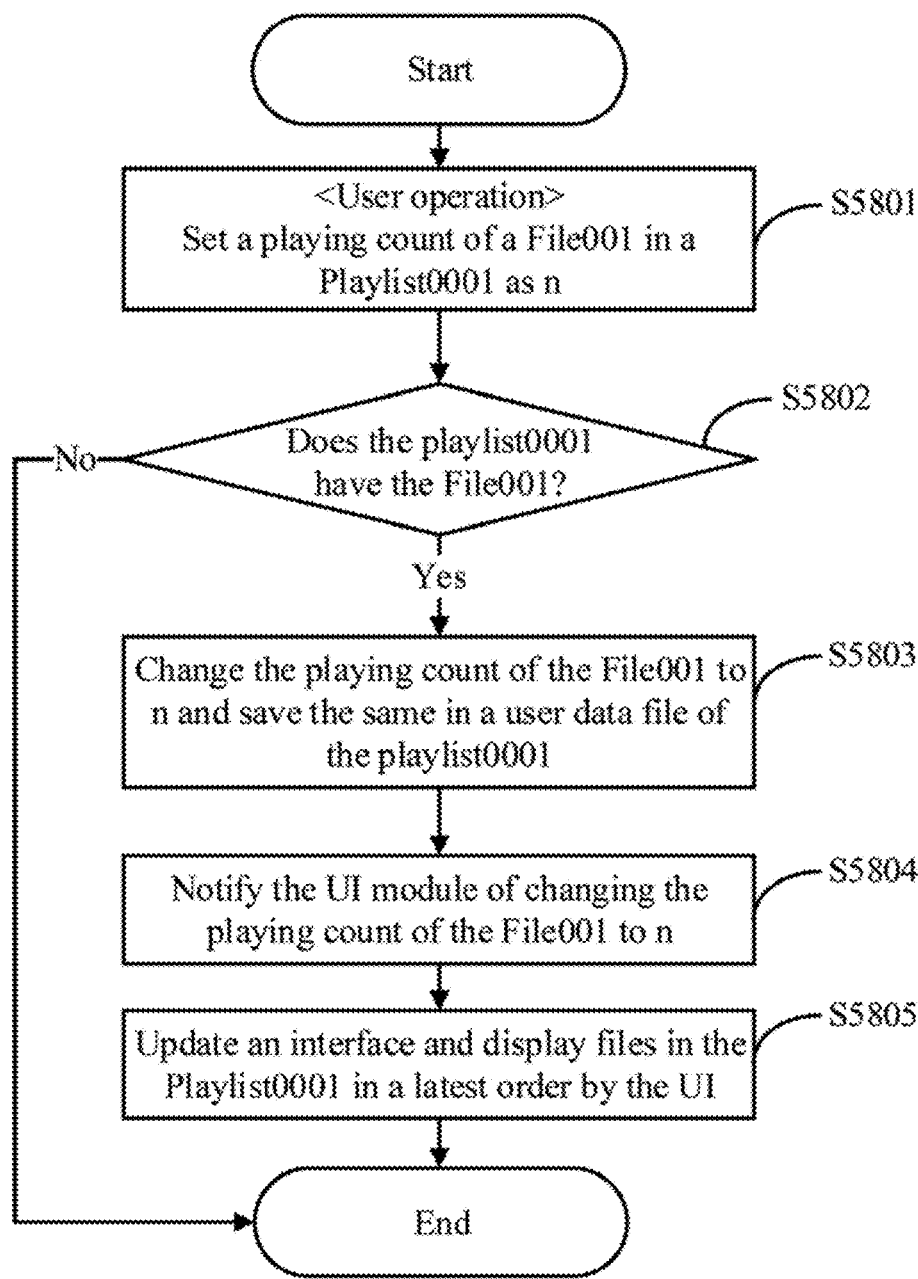
FIG. 58 shows a flow of setting a playing count of a File001 by a television according to some embodiments of the disclosure.

With reference to FIGS. 57 and 58, a process of setting a playing count of a recorded file by a display apparatus is described with the display apparatus being a television and a control device 100 being a remote control as an example.

The television displays a first recording management page as shown in ① in FIG. 57. Playlists that have been created, such as AAAAAA and a Playlist0001, are displayed in a playlist display area 3701. Based on that a user wants to adjust playing parameters of a recorded file in the Playlist0001, as shown in ① in FIG. 57, the user moves a focus (shown in gray base color) onto the Playlist0001 through the remote control, and the television displays the recorded files, for example, a File001, a File002, a File003 and a File004, of the Playlist0001 in a recorded file display area 3702. As shown in ① in FIG. 57, a recorded file management entry is configured in the first recording management page, such as an edition button 3703. The edition button 3703 has a pull-down menu, and the pull-down menu may include a File option. The user inputs an editing command by selecting the File option from the pull-down menu. In response to the editing command, as shown in ② in FIG. 57, the television displays recorded files of the Playlist0001, such as the File001, the File002, the File003 and the File004, in the recorded file display area 3702. The user may select at least one of the recorded files, for example, the File001, and input a setting command based on a Count option. The television displays a playing count setting page as shown in ③ in FIG. 57 in response to the setting command. The playing count setting page may include a text input box 3704. With selection of the File001 by the user as an example, the television sets a corresponding playing count for the File001 according to a number entered by the user through the text input box 3704. For example, the playing count for the File001 is set as 2, that is, the File001 is played twice continuously.

The television may set the playing count of the File001 according to a flow as shown in FIG. 58. The flow may include the following.

In response to a request for setting the playing count of the File001 as n, the television determines whether the File001 exists in the Playlist0001, if not, the flow ends; and if so, the playing count of the File001 is set as n and saved in a user data file. The UI module is notified of completion of the playing count of the File001.

In some embodiments, the flow of setting the playing count of the File001 by the television as shown in FIG. 58 can include: S5801, a command for setting the playing count of the File001 in the Playlist0001 as n is received; S5802, whether the File001 exists in the Playlist0001 is determined, if not, the flow ends, and if so, the flow goes to S5803; S5803, the playing count of the File001 is changed to n and saved in a user data file of the Playlist0001; S5804, the UI module is notified of changing the playing count of the File001 to n; and S5805, the UI updates an interface, and displays files in the Playlist0001 according to a latest order.

Example 12

Figure 59:
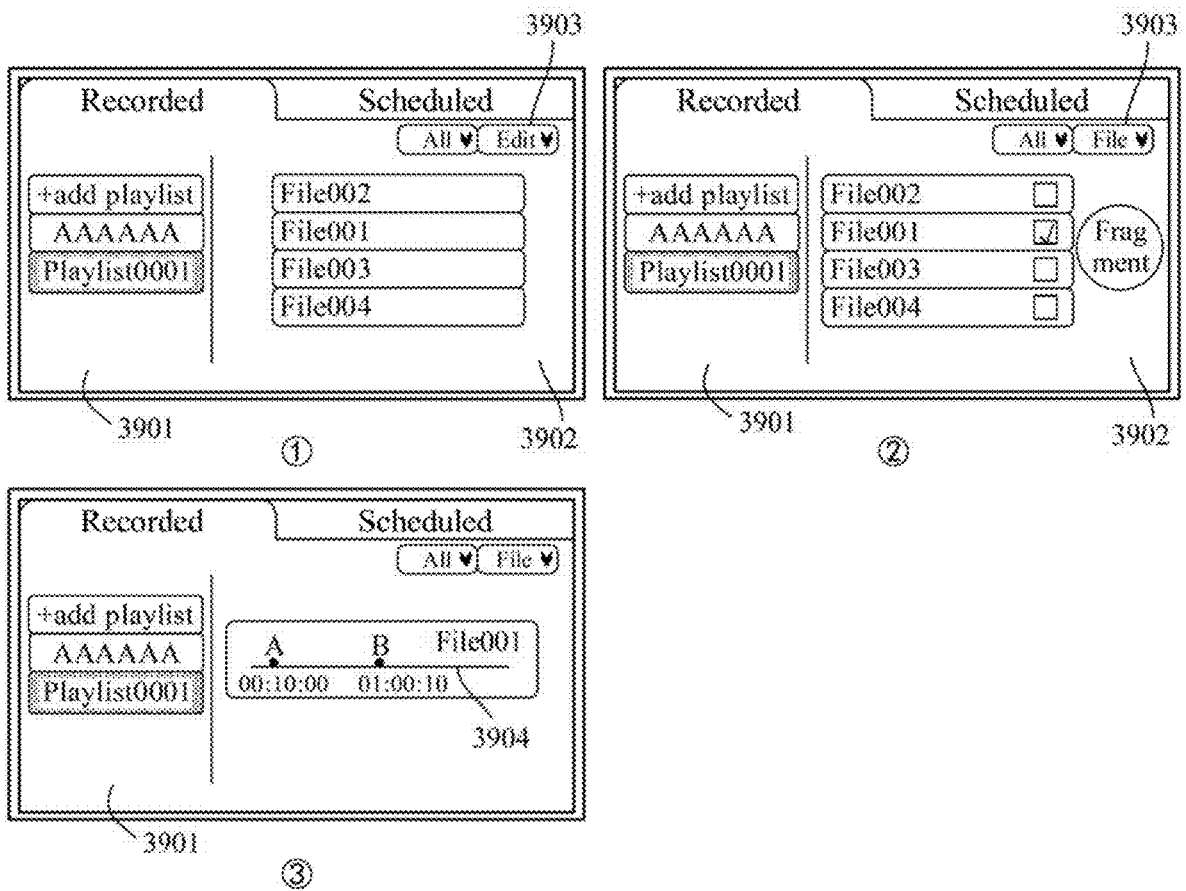
FIG. 59 is a flowchart of setting playing start and end points of a recorded file by a television according to some embodiments of the disclosure.
Figure 60:
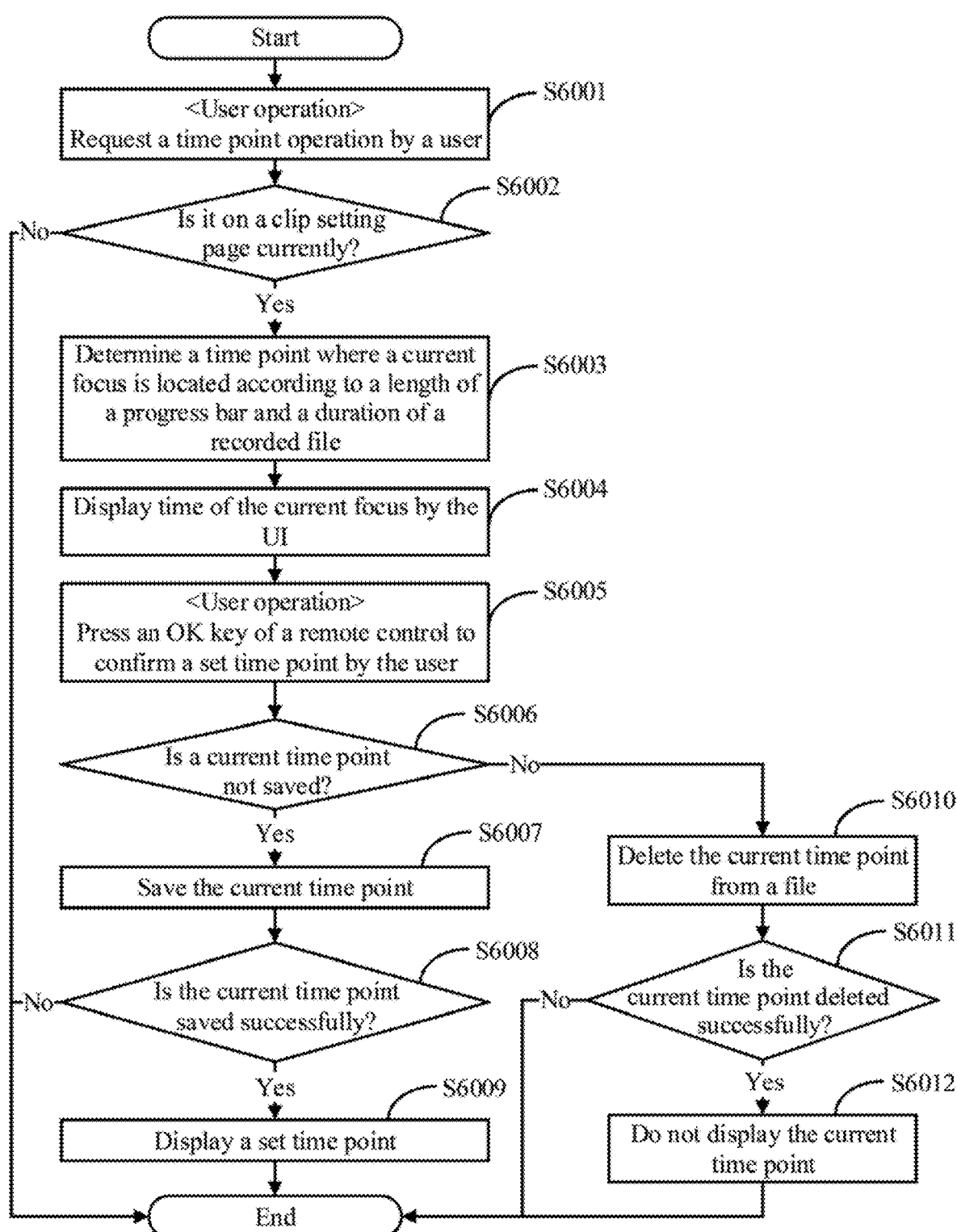
FIG. 60 shows a flow of setting playing start and end points of a File001 by a television according to some embodiments of the disclosure.

With reference to FIGS. 59 and 60, a process of setting playing start and end points of a recorded file by a display apparatus is described with the display apparatus being a television and a control device 100 being a remote control as an example.

The television displays a first recording management page as shown in ① in FIG. 59. Playlists that have been created, such as AAAAAA and a Playlist0001, are displayed in a playlist display area 3901. Based on that a user wants to adjust a playing parameter of a recorded file in the Playlist0001, as shown in ① in FIG. 59, the user moves a focus (shown in gray base color) onto the Playlist0001 through the remote control, and the television displays the recorded files, for example, a File001, a File002, a File003 and a File004, of the Playlist0001 in a recorded file display area 3902. As shown in ① in FIG. 59, a recorded file management entry is configured in the first recording management page, such as an edition button 3903. The edition button 3903 has a pull-down menu, and the pull-down menu may include a File option. The user inputs an editing command by selecting the File option from the pull-down menu. In response to the editing command, as shown in ② in FIG. 59, the television displays recorded files of the Playlist0001, such as the File001, the File002, the File003 and the File004, in the recorded file display area 3902. The user may select at least one of the recorded files, for example, the File001, and input a fragment command based on a Fragment option. The television displays a clip setting page as shown in ③ in FIG. 59 in response to the fragment command. The clip setting page may include a clip setting area. With selection of the File001 by the user as an example, the clip setting area may include a progress bar 3904 of the File001. When displaying the clip setting page, the television displays a focus on the progress bar of the first recorded file by default. For example, as shown in ③ in FIG. 59, the focus is displayed on the progress bar 3904. The user may set the playing start and end points of the recorded file where the focus is located. The user may control the focus to move on the progress bar through direction keys of the remote control, and time corresponding to the focus may be displayed below the focus. The user may set a time point at a position without a time point on the progress bar through an OK key on the remote control, or delete an existing time point. When the user sets time points at 00:10:00 and 01:00:00 of the File001 as shown in ③ in FIG. 59, the television displays an identifier of a time point A at 00:10:00 and an identifier of a time point B at 01:00:00 on the progress bar 3904, and the identifier is shown with a solid circle. In this case, the time point A and the time point B are the playing start and end points of the File001. The time point A is a playing start point and the time point B is a playing end point. When playing the File001, the television starts playing from the time point A and ends at the time point B.

Since two time points are needed when playing each clip, an entire file is played by default when the number of time points set by the user is an odd number other than 1. When the user sets one time point, playback starts from this time point and stops at the end of the recorded file by default.

The television may set the playing start and end points of the File001 according to a flow as shown in FIG. 60. The flow may include the following.

The television determines whether it is currently on the clip setting page in response to a command for setting the time point, if not, the time point may not be set, and the flow ends; and if so, the UI module may determine a time point of a current focus and display the same according to the progress bar and a length of the recorded file. In response to a time point operation by the user by pressing the OK key of the remote control, whether a current time point exists is determined, if so, the time point is deleted from the file and the UI is notified of such an operation, the UI no longer displays the current time point and notifies the user of successful deletion of the time point after receiving the message that the deletion of the time point is completed, and the flow ends; and if not, a current position is saved as a new time point, the UI is notified of successful addition of the time point, the UI highlights the time point position and notifies the user of successful setting of the time point after receiving the message, and the flow ends.

In some embodiments, the flow of setting the playing start and end points of the File001 by the television as shown in FIG. 60 can include: S6001, a command for operation on the time point is received; S6002, whether it is currently on the clip setting page is determined, if so, the flow goes to S6003, and if not, the flow ends; S6003, the time point where the current focus is located is determined according to the length of the progress bar and a duration of the recorded file; S6004, the UI displays time of the current focus; S6005, a command via pressing the OK key of the remote control is received, to confirm a set time point; S6006, whether current time point is not saved is determined, if so, the flow goes to S6007, otherwise, the flow goes to S6010; S6007, the current time point is saved; S6008, whether the current time point is saved successfully is determined, if so, the flow goes to S6009, otherwise, the flow ends; S6009, a time point set is displayed; S6010, the current time point is deleted from the file; S6011, whether the current time point is deleted successfully is determined, if so, the flow goes to S6012, otherwise, the flow ends; and S6012, the current time point is no longer displayed.

After setting playing parameters for N recorded files in a first playlist, when playing the recorded files in the first playlist, the display apparatus continuously plays the recorded files related to the first playlist from a first recorded file according to a corresponding playing order of each recorded file. For each recorded file, the recorded file is played repeatedly according to a corresponding playing count, and corresponding clips in the recorded file are played according to corresponding playing start and end points.

With the playing parameters set for the File001 in Examples 9-12 as an example, when the user completes setting of the playing parameters for the File001, a playing order of the recorded files in the Playlist0001 is File002→File001→File003→File004. A playing count of the File001 is 2, and playing counts of other recorded files are 1. The playing start and end points of the File001 are 00:10:00 and 01:00:00 respectively, playing start and end points are not set for other recorded files, and a total duration of each recorded file is 2 hours. Based on that the user instructs to start playback from the File002 when the television plays back the Playlist0001, the television plays the recorded files in a flow as follows: File002 (00:00:00-02:00:00)→File001 (00:10:00-01:00:00)→File001 (00:10:00-01:00:00)→File003 (00:00:00-02:00:00)→File004 (00:00:00-02:00:00).

Figure 61:
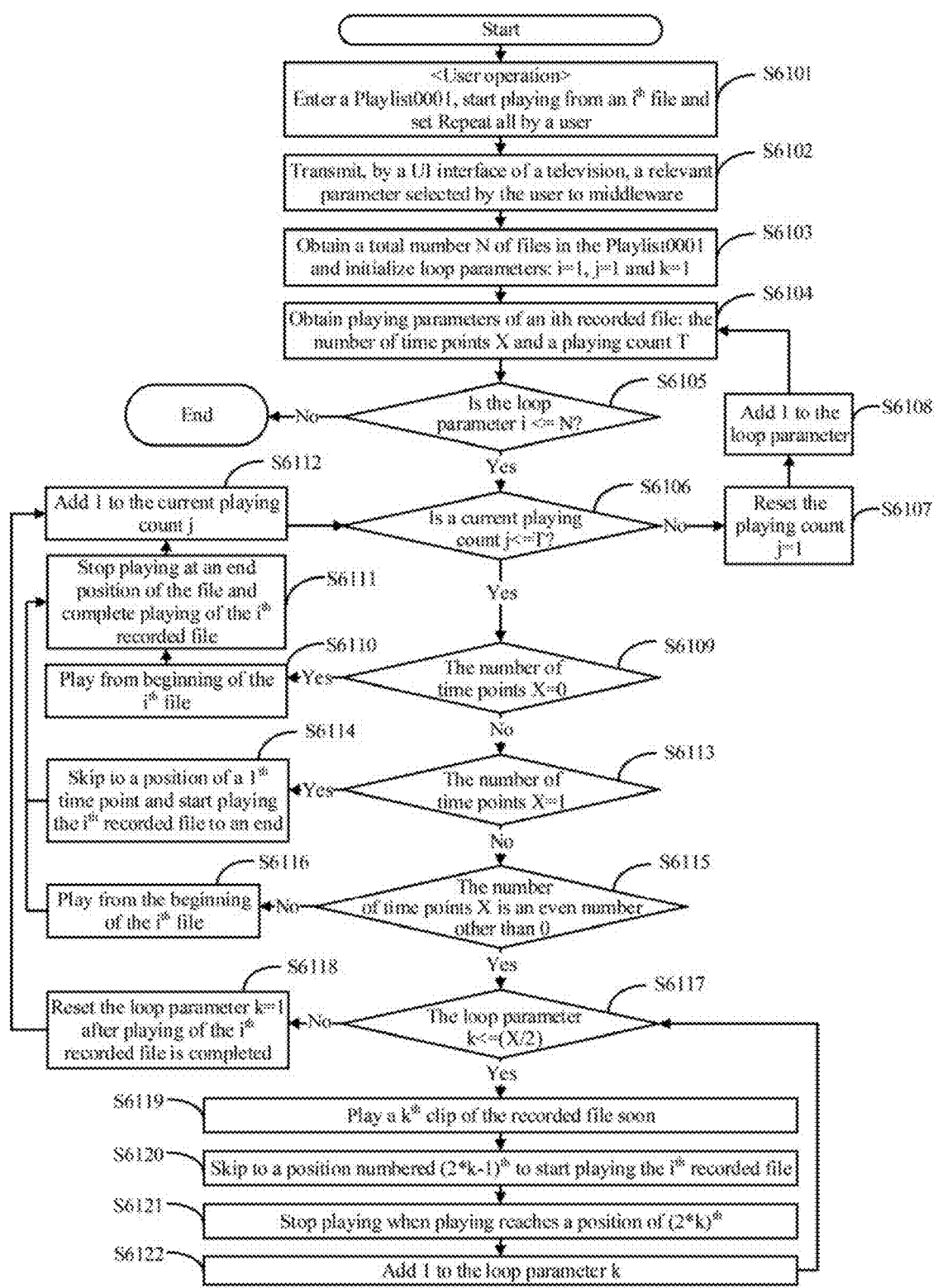
FIG. 61 shows a flow of playing recorded files in a playlist by a television according to some embodiments of the disclosure.

The display apparatus may play the recorded files in the playlist according to a flow as shown FIG. 61. With the playlist being a Playlist0001 and the Playlist0001 that may include N recorded files as an example, the flow may include the following.

The display apparatus responds to a command for starting playing from the first recorded file, and the UI interface transmits data related to a user operation to middleware layer.

A total number N of the recorded files in the Playlist0001 is obtained and the system initializes loop parameters as follows: i=1, j=1 and k=1. The loop parameters i, j and k denote a kth clip of an $i^{th}$ recorded file being played for the $j^{th}$ time, where i denotes the $i^{th}$ recorded file, j denotes a playing count of each file, and k denotes the number of clips of a file. Based on that the user starts playing from the $n^{th}$ file, i should be initialized to i=n.

The playing parameters of the $i^{th}$ file are obtained from the user data of the Playlist0001: the number of time points set for the $i^{th}$ file is X, and the playing count is T.

Whether the loop parameter i is less than or equal to N is determined. Based on that i>N, it means that playing of all the files in the Playlist0001 is completed, and the flow ends. Based on that i<=N, whether the current playing count j is less than or equal to the playing count T of the $i^{th}$ file.

Based on that j>T, it means that the $i^{th}$ file has been played for T times, the playing count j is reset to 1 and i is added by 1, and the playing parameters of the $i^{th}$ file are re-obtained from the user data of the Playlist0001 as follows: the number of time points set for the $i^{th}$ file is X, and the playing count is T. Based on that j<=T, it means that a playing count of the $i^{th}$ file has not been reached, and whether the total number of time points X of the $i^{th}$ file is 0 is determined.

Based on that X=0, it means that no time point is set for the $i^{th}$ recorded file, playing starts directly from beginning of the $i^{th}$ file and stops at the end of the file. After playing, j is set by adding 1, and whether the current playing count j is less than or equal to the playing count T of the $i^{th}$ file is re-determined. Based on that X is unequal to 0, whether the total number X of time points of the $i^{th}$ file is 1 is determined.

Based on that X=1, it means that merely one time point is set for the $i^{th}$ recorded file, playing starts after skipping to a first time point is done and stops at the end of the file. After playing, j is set by adding 1, and whether the current playing count j is less than or equal to the playing count T of the $i^{th}$ file is re-determined. Based on that X is unequal to 1, whether the total number of time points of the $i^{th}$ file X is an even number other than 0 is determined.

If not, it means that an odd number (other than 1) of time points are set for the $i^{th}$ recorded file, and two time points are needed for playing each clip. Thus, when X is the odd number other than 1, the entire file is played by default, that is, playing starts from beginning of the $i^{th}$ file and stops at the end of the file. After playing, the playing count j is set by adding 1, and whether the current playing count j is less than or equal to the playing count T of the $i^{th}$ file is re-determined. Based on that X is an even number other than 0, whether the loop parameter k is less than or equal to (X/2) is determined. Here, (X/2) denotes a total number of clips to be played in the $i^{th}$ recorded file. It is assumed that the number of time points in the $i^{th}$ recorded file is set to X=10, 5 program clips of the $i^{th}$ file need to be played based on the fact that two time points are needed for playing one program clip.

Based on that k>(X/2), it means that all clips of the $i^{th}$ recorded file have been played, the playing count j is set by adding 1, and whether the current playing count j is less than or equal to the playing count T of the $i^{th}$ file is re-determined. Based on that k<=(X/2), playing of the $i^{th}$ recorded file starts after skipping to a position of a $(2k-1)^{th}$ time point is done and stops at a position of a $(2k)^{th}$ time point, a clip playing parameter k is added by 1, and whether a loop parameter k is less than or equal to (X/2) is re-determined.

In some embodiments, the flow of playing the recorded files in the playlist by the television as shown in FIG. 61 can include: S6101, a command for entering the Playlist0001, starting to play from the $i^{th}$ file and setting of Repeat all is received; S6102, the UI interface of the television transmits the relevant parameters selected by the user to the middleware; S6103, the total number N of files in the Playlist0001 is obtained, and the loop parameters are initialized as follows: i=1, j=1, and k=1; S6104, the playing parameters of the $i^{th}$ recorded file are obtained as follows: the number of time points X and the playing count T; S6105, whether the loop parameter i is less than or equal to N is determined, if not, the flow ends, and if so, the flow goes to S6106; S6106, whether the current playing count j is less than or equal to T, if so, the flow goes to S6109, and if not, the flow goes to S6107; S6107, the playing count j is reset to 1; S6108, the loop parameter i is added by 1; S6109, whether the number of time points X is equal to 0, if so, the flow goes to S6110, and if not, the flow goes to S6113; S6110, playing starts from a start position of the $i^{th}$ file; S6111, playing of the $i^{th}$ recorded file stops at the end position of the file, and is completed; S6112, the current playing count j is added by 1; S6113, whether the number of time points X is equal to 1 is determined, if so, the flow goes to S6114, and if not, the flow goes to S6115; S6114, skipping to a position of a $1^{st}$ time point is done to start playing the $i^{th}$ recorded file to an end; S6115, whether the number of time points X is an even number other than 0 is determined, if so, the flow goes to S6117, and if not, the flow goes to S6116; S6116, playing starts from a start position of the $i^{th}$ file; S6117, whether the loop parameter k is less than or equal to X/2 is determined, if so, the flow goes to S6119, and if not, the flow goes to S6118; S6118, the loop parameter k is reset to 1 after playing of the $i^{th}$ recorded file is completed; S6119, a kth clip of the recorded file is to be played soon; S6120, skipping to a position numbered $(2*k-1)^{th}$ is done to start playing the $i^{th}$ recorded file; S6121, playing stops when playing reaches a position of $(2*k)^{th}$; and S6122, the loop parameter k is added by 1.

The user may add favorite programs and store the recorded files of favorite programs in a favorite playlist separately, to make it easier to quickly find the recorded files of favorite programs during playback. The display apparatus may add the recorded file of the favorite program according to a flow shown in FIG. 62. The flow may include the following.

S4201, in a live broadcasting state, in response to a fourth addition command from a user, a favorite identifier is added to a live broadcasting program.

The user has a higher preference for some programs and a higher playback probability of these programs, and these programs are favorite programs of the user. In order to make it easier for the user to quickly find the recorded file of the favorite program from all the recorded files, the user may add an identifier to the favorite program during a live broadcast of the favorite program, to mark the program as the favorite program and distinguish the program from other ordinary programs. The favorite program may also have a recording label.

S4202, in response to a recording command from the user, the live broadcasting program is recorded, and the favorite identifier is added to a recorded file of the live broadcasting program after obtaining the recorded file of the live broadcasting program.

After recording the live broadcasting program with the favorite identifier and obtaining a corresponding recorded file, the display apparatus marks the favorite identifier on the recorded file, to distinguish the recorded file from the recorded files of ordinary programs.

The display apparatus may also be configured to have a favorite playlist. The favorite playlist includes recorded files of all favorite programs, and the recorded files of these favorite programs may have completely different recording labels.

S4203, the recorded file of the live broadcasting program is added to a favorite playlist.

The favorite playlist may include the recorded file with the favorite identifier. Based on the favorite playlist, the user can quickly find and re-watch the recorded files of favorite programs.

Example 13

Figure 64:
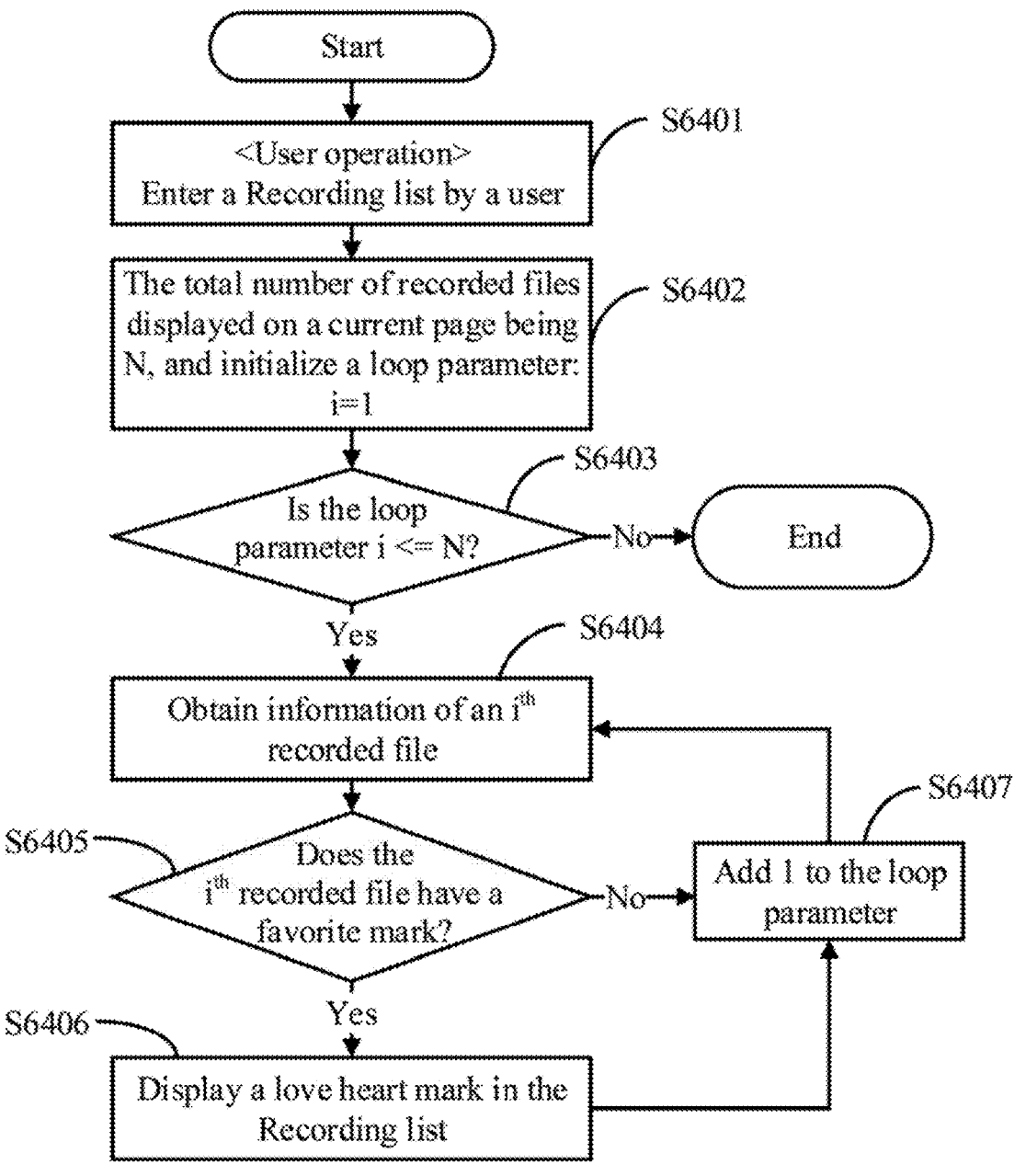
FIG. 64 shows a flow of managing a recorded file of a favorite program by a television according to some embodiments of the disclosure.

With reference to FIGS. 63 and 64, a process of setting a favorite program and a favorite playlist in a display apparatus is described with the display apparatus being a television and a control device 100 being a remote control as an example.

The television displays a live broadcasting page as shown in ① in FIG. 63. The live broadcasting page may include a live broadcasting program list 4301. The live broadcasting program list 4301 may include items of various live broadcasting programs, such as Movie1, News2, Sport3 and Music4. Based on that a user inputs a command for adding a favorite identifier based on the Movie1, the television marks Movie1 as a favorite program in response to the command, for example, adding a favorite identifier (such as a shape of a love heart) to an item of the Movie1. Based on that the user sets recording schedule of the Movie1, and gets recorded files File001 and File002, the television add the File001 and the File002 to the favorite playlist. When the television displays a first recording management page as shown in ② in FIG. 63, a favorite playlist (Favorite List) and other playlists created such as AAAAAA and a Playlist0001 are displayed in a playlist display area 4302. In this case, all recorded files, such as a File001, a File002, a File003 and a File004, are displayed in a recorded file display area 4303. The File001 and the File002 have a favorite identifier (such as a shape of a love heart). Thus, the user can quickly locate the recorded file of the favorite program according to the favorite identifier from all the recorded files. When a focus lands on the Favorite List, the television shows the recorded files File001 and File002 in the recorded file display area 4303 as shown in ③ in FIG. 63.

The television may manage the recorded file of the favorite program according to a flow as shown in FIG. 64. The flow may include the following.

The television starts to record a current program, and determines whether the current program is a favorite program, if not, the flow ends; and if so, the favorite identifier is added to the recorded file and saved.

The first recording management page is displayed, a total number N of recorded files displayed on the current page is obtained, and a loop parameter is initialized as follows: i=1. The loop parameter i is used for determining whether the recorded files have the favorite identifier one by one.

Whether the loop parameter i is less than or equal to N is determined. Based on that i>N, it means that searching of all the files on the current page is completed, and the flow ends. Based on that i<=N, information of an $i^{th}$ recorded file is obtained.

Whether the $i^{th}$ recorded file has the favorite identifier is determined, if so, the favorite identifier is displayed in the first recording management page; and if not, the favorite identifier is not displayed.

The loop parameter i is added by 1, and whether the loop parameter i is less than or equal to N is re-determined.

In some embodiments, the flow of managing the recorded file of the favorite program by the television as shown in FIG. 64 can include: S6401, a command for entering a Recording list is received; S6402, the total number of recorded files displayed on the current page is N and the loop parameter is initialized as follows: i=1; S6403, whether the loop parameter i is less than or equal to N is determined, if so, the flow goes to S6404, and if not, the flow ends; S6404, the information of the i$^{th}$ recorded file is obtained; S6405, whether the i$^{th}$ recorded file has the favorite identifier is determined, if so, the flow goes to S6406, and if not, the flow goes to S6407; S6406, a love heart mark is displayed in the Recording list; and S6407, the loop parameter i is added by 1.

For the convenience of explanation, the above description has been made in conjunction with specific implementations. However, the above discussion in some embodiments is not intended to be exhaustive or to limit the implementation to the specific forms disclosed above. Various modifications and variations can be made based on the above teachings. The above implementations are chosen and described to better explain contents of the disclosure, such that those skilled in the art can make better use of the implementations.

What is claimed is:

1. A display apparatus, comprising:

a display configured to display an image and/or a user interface;

a memory configured to store computer instructions and media resource data; and at least one processor in connection with the display and the memory and configured to execute the computer instructions to cause the display apparatus to perform:

in response to a recording command for a target program, detecting a media resource type of the target program; wherein the media resource type comprises a network media resource and a non-network media resource, the network media resource comprises Internet protocol information, and the Internet protocol information comprises resource locator addresses of programs;

based on that the media resource type is the network media resource, downloading media resource data of the target program according to the resource locator address and writing the media resource data onto the memory; and based on that the media resource type is the non-network media resource, searching for a target network media resource corresponding to the target program, and based on that the target program has the target network media resource, downloading media resource data of the target program according to the resource locator address and writing the media resource data onto the memory;

wherein the at least one processor is further configured to execute the computer instructions to cause the display apparatus to perform:

detecting program information of the target program, wherein the program information comprises a transmission protocol of the media resource data;

marking the media resource type as the network media resource based on that the transmission protocol is an Internet protocol; and marking the media resource type as the non-network media resource based on that the transmission protocol is a broadcast network protocol;

wherein the at least one processor is further configured to execute the computer instructions to cause the display apparatus to perform:

in response to a command from a user, controlling the display to display a first recording management page in a first playback mode; wherein the first recording management page comprises a playlist display area and a recorded file display area, the playlist display area is configured to display options of playlists, and the recorded file display area is configured to display a recorded file; wherein all recorded files that have been recorded are displayed in the recorded file display area based on that a focus does not land on a playlist, and a recorded file related to a playlist is displayed based on that the focus lands on the playlist; and in response to a first playback command based on a first recorded file in a first playlist, playing, from a first recorded file, recorded files related to a first playlist;

wherein the recorded file is a file generated by recording a media resource played by the display apparatus.

2. The display apparatus according to claim 1, wherein the at least one processor is further configured to execute the computer instructions to cause the display apparatus to perform:

receiving a display command for displaying a program list;

in response to the display command, controlling the display to display the program list; wherein the program list comprises tabs of programs, and each of the tabs comprises a recording control; and generating the recording command based on that the recording control is in a selected state.

3. The display apparatus according to claim 1, wherein the at least one processor is further configured to execute the computer instructions to cause the display apparatus to perform:

switching the display apparatus to a signal source corresponding to the target program based on that the target program does not have the target network media resource;

receiving a broadcast signal of the target program provided by the signal source;

forming a media resource data stream of the target program by decoding the broadcast signal; and copying the media resource data stream, and writing the media resource data stream copied onto the memory.

4. The display apparatus according to claim 3, further comprising a tuner configured to adjust a frequency of the display apparatus;

wherein the at least one processor is further configured to execute the computer instructions to cause the display apparatus to perform:

obtaining channel information of the target program;

parsing a target frequency of the target program in the channel information; and tuning the signal source to the target frequency through the tuner.

5. The display apparatus according to claim 4, wherein the at least one processor is further configured to execute the computer instructions to cause the display apparatus to perform:

detecting a use state of the tuner, wherein the use state comprises a working state and an idle state;

obtaining a quantity of tuners in the idle state;

controlling the display to display a prompt message of recording failure based on that the quantity of tuners in the idle state is equal to 0; and tuning the signal source to the target frequency through the tuner in the idle state based on that the quantity of tuners in the idle state is greater than or equal to 1.

6. The display apparatus according to claim 1, wherein the at least one processor is further configured to execute the computer instructions to cause the display apparatus to perform:

accessing a webpage address corresponding to the resource locator; and obtaining resource data of the webpage address and loading the resource data, wherein the resource data comprises the media resource data of the target program.

7. The display apparatus according to claim 1, wherein the at least one processor is further configured to execute the computer instructions to cause the display apparatus to perform:

detecting a characteristic value of the display apparatus, wherein the characteristic value comprises identifier information for characterizing the display apparatus;

setting a key according to the characteristic value, encrypting the media resource data based on an encryption algorithm, and forming encrypted recording data of the target program; wherein the key is used for encryption of the media resource data; and writing the encrypted recording data onto the memory.

8. The display apparatus according to claim 7, wherein the at least one processor is further configured to execute the computer instructions to cause the display apparatus to perform:

in response to a playback command for the target program, extracting the media resource data from the memory; and decrypting the media resource data based on the characteristic value, and controlling the display to display an image from the media resource data.

9. The display apparatus according to claim 1, wherein the at least one processor is further configured to execute the computer instructions to cause the display apparatus to perform:

in response to a playing command for playing a recorded file, obtaining the recorded file;

obtaining program information of the recorded file by parsing the recorded file, wherein the program information comprises playing start time information of the program, program duration information, and total duration information of the recorded file;

determining a duration progress of the program relative to the recorded file according to the playing start time information, the program duration information and the total duration information;

placing program identifiers on a progress bar of the recorded file according to the duration progress; and determining a quantity of programs comprised in the recorded file, a playing progress of the target program, and playing start time and playing end time of the target program according to the program identifiers, and locating the target program according to the playing start time.

10. The display apparatus according to claim 9, wherein the program information further comprises a program name; wherein the at least one processor is further configured to execute the computer instructions to cause the display apparatus to perform:

obtaining a identifier position of the program identifier on the progress bar;

associating the program name with the identifier position; and in response to reaching to a time point for switching to another program in the recorded file, displaying the program name at the identifier position.

11. The display apparatus according to claim 10, wherein the at least one processor is further configured to execute the computer instructions to cause the display apparatus to perform:

generating an image thumbnail according to the program information;

associating the image thumbnail with the identifier position; and in response to reaching to a time point for switching to another program in the recorded file, displaying the image thumbnail at the identifier position.

12. The display apparatus according to claim 10, wherein the at least one processor is further configured to execute the computer instructions to cause the display apparatus to perform:

traversing the program names;

generating a program list according to the program names; and in response to a view command for viewing a program, displaying a program list display page, wherein the program list display page is configured to display the program list.

13. The display apparatus according to claim 9, wherein the at least one processor is further configured to execute the computer instructions to cause the display apparatus to perform:

identifying data categories of the recorded files by traversing the recorded files;

obtaining a category number of the data categories, and creating category items based on the category number and the data categories; and dividing programs in the recorded files into the category items according to the data categories, and displaying the programs in the recorded files according to different categories.

14. The display apparatus according to claim 9, wherein the at least one processor is further configured to execute the computer instructions to cause the display apparatus to perform:

in response to a first addition command from the user, adding a recording label to a recorded file being currently recorded or a recorded file being currently played back in a recording state or a playback state;

wherein based on that the display displays the first recording management page, the at least one processor is further configured to execute the computer instructions to cause the display apparatus to perform:

in response to a second addition command from the user, creating a second playlist, adding a list label to the second playlist and adding a related recorded file into the second playlist; wherein recording labels comprised by the recorded file related to the second playlist have at least one same label as the list label of the second playlist; and controlling the display to add an option of the second playlist into the playlist display area, and based on that the second playlist is selected, displaying the recorded file related to the second playlist in the recorded file display area.

15. The display apparatus according to claim 14, wherein the at least one processor is further configured to execute the computer instructions to cause the display apparatus to perform:

controlling the display to display a recorded file addition page after determining that the related recorded file is added into the second playlist, wherein the recorded file addition page comprises a recorded file unrelated to the second playlist, and a recording label of the unrelated recorded file is different from the list label of the second playlist; and in response to a third addition command from the user based on the target unrelated recorded file, adding a target unrelated recorded file into the second playlist.

16. The display apparatus according to claim 14, wherein the at least one processor is further configured to execute the computer instructions to cause the display apparatus to perform:

in response to a switch command from the user based on a switch button on the first recording management page, controlling the display to display a recorded file that has a designated recording label in the recorded file display area;

in response to no playlist being selected, controlling the display to display all recorded files that have been recorded in the recorded file display area based on that the switch command indicates all the recorded files, and controlling the display to display the recorded file that has the designated recording label in all recorded files that have been recorded in the recorded file display area based on that the switch command indicates the designated recording label; and in response to a third playlist being selected, controlling the display to display all recorded files in the third playlist in the recorded file display area based on that the switch command indicates all the recorded files, and controlling the display to display the recorded file that has the designated recording label in the third playlist in the recorded file display area based on that the switch command indicates the designated recording label.

17. The display apparatus according to claim 16, wherein the at least one processor is further configured to execute the computer instructions to cause the display apparatus to perform:

in response to a deletion command from the user based on a target recording label, deleting original data of a recorded file that has the target recording label.

18. A data processing method for a display apparatus, comprising:

in response to a recording command for a target program, detecting a media resource type of the target program, wherein the media resource type comprises a network media resource and a non-network media resource, the network media resource comprises Internet protocol information, and the Internet protocol information comprises resource locator addresses of programs;

based on that the media resource type is the network media resource, downloading media resource data of the target program according to the resource locator address and writing the media resource data onto the memory; and based on that the media resource type is the non-network media resource, searching for a target network media resource corresponding to the target program, and based on that the target program has the target network media resource, downloading media resource data of the target program according to the resource locator address and writing the media resource data onto the memory;

wherein the method further comprises:

detecting program information of the target program, wherein the program information comprises a transmission protocol of the media resource data;

marking the media resource type as the network media resource based on that the transmission protocol is an Internet protocol; and marking the media resource type as the non-network media resource based on that the transmission protocol is a broadcast network protocol;

wherein the method further comprises:

in response to a command from a user, controlling the display to display a first recording management page in a first playback mode; wherein the first recording management page comprises a playlist display area and a recorded file display area, the playlist display area is configured to display options of playlists, and the recorded file display area is configured to display a recorded file; wherein all recorded files that have been recorded are displayed in the recorded file display area based on that a focus does not land on a playlist, and a recorded file related to a playlist is displayed based on that the focus lands on the playlist; and in response to a first playback command based on a first recorded file in a first playlist, playing, from a first recorded file, recorded files related to a first playlist;

wherein the recorded file is a file generated by recording a media resource played by the display apparatus.

19. The method according to claim 18, further comprising:

receiving a display command for displaying a program list;

in response to the display command, controlling the display to display the program list; wherein the program list comprises tabs of programs, and each of the tabs comprises a recording control; and generating the recording command based on that the recording control is in a selected state.

20. The method according to claim 18, further comprising:

switching the display apparatus to a signal source corresponding to the target program based on that the target program does not have the target network media resource;

receiving a broadcast signal of the target program provided by the signal source;

forming a media resource data stream of the target program by decoding the broadcast signal; and copying the media resource data stream, and writing the media resource data stream copied onto the memory.

* * * * *